US012697280B2

(12) United States Patent
Heiz et al.

(10) Patent No.: US 12,697,280 B2
(45) Date of Patent: Aug. 4, 2026

(54) GLASS CONTAINER AND GLASS CONTAINER SYSTEM

(71) Applicants: SCHOTT Pharma AG & Co. KGaA, Mainz (DE); SCHOTT Pharma Schweiz AG, St. Gallen (CH)

(72) Inventors: Benjamin Heiz, St. Gallen (CH); Claudia Santini, Zürich (CH); Sebastian Brechler, Flawil (CH); Stephanie Mangold, Schornsheim (DE); Ugljesa Babic, Winterthur (CH)

(73) Assignees: SCHOTT Pharma AG & Co. KGaA, Mainz (DE); SCHOTT Pharma Schweiz AG, St. Gallen (CH)

( * ) Notice: Subject to any disclaimer, the term of this patent is extended or adjusted under 35 U.S.C. 154(b) by 574 days.

(21) Appl. No.: 18/323,910

(22) Filed: May 25, 2023

(65) Prior Publication Data

US 2023/0390157 A1 Dec. 7, 2023

(30) Foreign Application Priority Data

Jun. 2, 2022 (EP) .................................... 22177077

(51) Int. Cl.

*A61J 1/14* (2023.01)
*A61J 1/06* (2006.01)

(Continued)

(52) U.S. Cl.

CPC ............. *A61J 1/1468* (2015.05); *A61J 1/065* (2013.01); *B65D 23/02* (2013.01); *B65D 25/14* (2013.01);

(Continued)

(58) Field of Classification Search

CPC ... C03C 17/004; C09D 183/04; A61M 5/3129

(Continued)

(56) References Cited

U.S. PATENT DOCUMENTS 7,332,227 B2 * 2/2008 Hardman .............. A61L 29/085 526/279
8,323,166 B2 * 12/2012 Haines .................... A61L 31/10 493/110

(Continued)

FOREIGN PATENT DOCUMENTS

| | | | | |
|---|---|---|---|---|
| DE | 10000505 C1 * | 4/2001 | | C03C 17/004 |
| EP | 3 569 272 A1 | 11/2019 | | |
| WO | 2021/074423 A2 | 4/2021 | | |

OTHER PUBLICATIONS

"An Innovative Solution to Address Silicone—Realted Concepts", Christian Herget, BD Advancing the world of health, 2016 (4 pages).

(Continued)

*Primary Examiner* — Michael C. Romanowski
(74) *Attorney, Agent, or Firm* — TAYLOR & EDELSTEIN, PC

(57) ABSTRACT

A glass container for pharmaceutical compositions includes a hollow cylindrical body having at least one open end. At least a part of a surface of the glass container includes a coating. The coating has a crystallization temperature range and a melting temperature range determined using differential scanning calorimetry at a temperature change rate of 10° C./min. The crystallization temperature range and the melting temperature range overlap at a temperature of from −75° C. to −100° C.

21 Claims, 4 Drawing Sheets

(51) Int. Cl.

| | |
|---|---|
| ***B65D 23/02*** | (2006.01) |
| ***B65D 25/14*** | (2006.01) |
| ***C09D 183/04*** | (2006.01) |
| *C03C 17/00* | (2006.01) |
| *C03C 17/30* | (2006.01) |

(52) U.S. Cl.
CPC .......... *C09D 183/04* (2013.01); *C03C 17/004* (2013.01); *C03C 17/30* (2013.01); *C03C 2217/70* (2013.01)

(58) Field of Classification Search
USPC ....................... 428/34.1–36.92; 427/230–239
See application file for complete search history.

(56) References Cited

U.S. PATENT DOCUMENTS

| | | | | |
|---|---|---|---|---|
| 11,701,471 | B2 | 7/2023 | Mangold et al. | |
| 2005/0250668 | A1* | 11/2005 | Serobian ............... | D06M 23/04 510/466 |
| 2011/0276005 | A1* | 11/2011 | Hioki .................. | A61M 5/3129 604/187 |
| 2013/0122314 | A1* | 5/2013 | Ou ........................ | C10M 139/06 427/2.12 |
| 2017/0182252 | A1* | 6/2017 | Hamel ................... | A61K 39/00 |
| 2020/0078523 | A1* | 3/2020 | Mangold ............. | A61M 5/3134 |
| 2021/0154409 | A1* | 5/2021 | Mangold .............. | C10M 107/50 |
| 2021/0154413 | A1* | 5/2021 | Mangold ........... | A61M 5/31548 |
| 2024/0307632 | A1* | 9/2024 | Pouget .................... | A61M 5/31 |

OTHER PUBLICATIONS

"Metallic materials—Instrumented indentation test for hardness and materials parameters—Part 1: Test method", ISO 14577-1:2015-11, Nov. 2015 (53 pages).
"Metallic materials—Instrumented indentation test for hardness and materials parameters—Part 4: Test method for metallic and non-metallic coatings", ISO 14577-4:2016, Apr. 2017 (28 pages).

* cited by examiner

GLASS CONTAINER AND GLASS CONTAINER SYSTEM

CROSS REFERENCE TO RELATED APPLICATIONS

This application claims priority to European Patent No. EP 22177077.9 filed on Jun. 2, 2022, which is incorporated in its entirety herein by reference.

BACKGROUND OF THE INVENTION

1. Field of the Invention

The disclosure relates to glass containers, glass container systems including the container, a stopper and/or a cap; as well as methods of making containers and systems.

2. Description of the Related Art

Pharmaceutical compositions of biological preparations such as protein and nucleic acid formulations are prone to degradation. In order to reduce their tendency to degrade during storage or transport sophisticated measures are needed. This is particularly important in aqueous compositions that allow for the occurrence of enzymatic degradation as well as a broad range of chemical processes, including hydrolysis.

New and complex drug delivery systems like liposomes, or lipid nanoparticles add to the number of ingredients in the compositions, making it even more difficult to predict and prevent possible routes of undesired deterioration.

Furthermore, drug makers are under enormous pressure to supply the public with new and powerful therapeutic principles without the time to optimize or even test storage behavior of new drug products in a long-term setting. Thus, there is a constant need for ways to securely package and store even the most complex pharmaceutical compositions in a way that prevents degradation, or—if timing is of the essence—can be safely assumed to prevent degradation for a sufficient period.

Freeze-drying (also called "lyophilization") has been applied to address some of the problems. It is a well-known method that produces an environment hostile to enzymatic activity preventing hydrolysis as well. However, freeze-drying is an expensive method and finding the best excipients and re-dispersion protocol can be difficult and time-consuming. Further, lyophilization does not produce a ready-to-use composition. Lyophilized compositions must be re-dispersed before use, a procedure that involves risks of human error and thus incomplete or incorrect dissolution, which may harm patients and decrease acceptance.

What is needed in the art is a solution to the above-described problems.

SUMMARY OF THE INVENTION

In some exemplary embodiments provided according to the present disclosure, a glass container for pharmaceutical compositions includes a hollow cylindrical body having at least one open end. At least a part of a surface of the glass container includes a coating. The coating has a crystallization temperature range and a melting temperature range determined using differential scanning calorimetry at a temperature change rate of 10° C./min. The crystallization temperature range and the melting temperature range overlap at a temperature of from −75° C. to −100° C.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
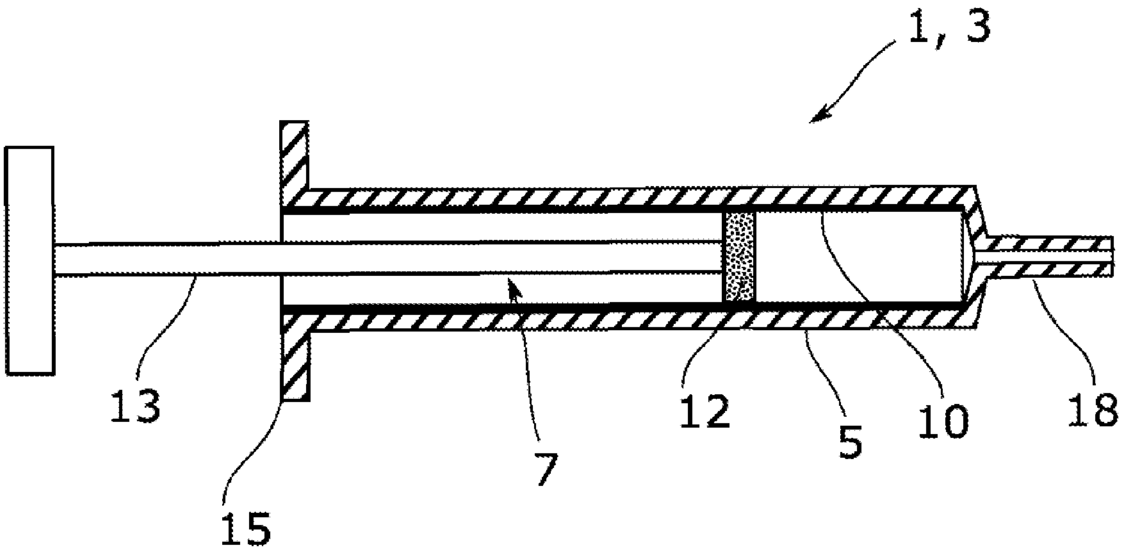
FIG. 1 illustrates a glass container with a coating.

In some embodiments, the disclosure relates to a glass container for pharmaceutical compositions, comprising a hollow cylindrical body having at least one open end wherein at least a part of a surface of the glass container comprises a coating, the coating having a glass transition temperature at −60° C. or below.

It was found that a coating having a glass transition temperature at −80° C. or below allows for a particularly tight seal at very low storage temperatures. Maintaining a tight seal at such low temperatures has been a challenge. For example, a conventional silicon oil coating will compromise seal tightness at very low temperatures, allowing extraneous matter to enter the hollow body, which may react with or change the composition inside the container or system, and compromise sterility. Containers and systems of the disclosure allow for very low temperature storage of even the most delicate pharmaceutical compositions, including those hosting protein or nucleic acid active principles. Freezing to and storing pharmaceutical compositions at very low temperatures, e.g. −80° C., excludes undesired degradation by slowing down or stopping chemical and enzymatic reactions. Above all, storage at −80° C. is suitable for ready-to-use compositions, for example in pre-filled syringes. The inventors hypothesize that a coating having a glass transition temperature at −60° C. or below maintains sufficient elasticity at low temperatures to form a tight seal between a surface of the container and a container closure device, such as a stopper or a cap. For example, the coating may be present on at least a part of an inner surface of the hollow cylindrical body so as to form a tight seal between the inner surface and a stopper. Additionally or alternatively, glass containers of the disclosure may be configured for being closed by a cap and having a nestling surface at an open end B, the nestling surface configured to fit snugly against a surface of a cap, wherein at least a part of the nestling surface comprises the coating.

In some embodiments, the disclosure relates to a glass container for pharmaceutical compositions, comprising a hollow cylindrical body having at least one open end; wherein at least a part of a surface of the glass container comprises a coating, the coating having a hardness such that a hardness value measured on the coated surface according to DIN EN ISO 14577-1:2015-11 and DIN EN ISO 14577-4:2017-04 differs from the hardness value measured on an uncoated surface of the glass container by less than 10%.

It has been found that a coating having a low hardness allows for a tight seal to be maintained even at very low storage temperatures. In a hardness test, soft thin layers yield a hardness value very close to the substrate. In other words, the coating is softer than the substrate, i.e. the glass of the glass container. Maintaining a tight seal at such low temperatures has been a challenge. For example, a conventional silicon oil coating will compromise seal tightness at very low temperatures, allowing extraneous matter to enter the hollow body, which may react with or change the composition inside the container or system, and compromise sterility. Containers and systems of the disclosure allow for very low temperature storage of even the most delicate pharmaceutical compositions, including those hosting protein or nucleic acid active principles. Freezing to and storing pharmaceutical compositions at very low temperatures, e.g. −80° C., excludes undesired degradation by slowing down or stopping chemical and enzymatic reactions. Above all, storage at −80° C. is suitable for ready-to-use compositions, for example in pre-filled syringes. It has been found that a coating having a suitable hardness at 20° C. can maintain sufficient elasticity to form a tight seal between a surface of the container and a container closure device, such as a stopper or a cap. For example, the coating may be present on at least a part of an inner surface of the hollow cylindrical body so as to form a tight seal between the inner surface and a stopper. Additionally or alternatively, glass containers of the disclosure may be configured for being closed by a cap and having a nestling surface at an open end B, the nestling surface configured to fit snugly against a surface of a cap, wherein at least a part of the nestling surface comprises the coating.

In some embodiments, the disclosure relates to a glass container for pharmaceutical compositions, comprising a hollow cylindrical body having at least one open end; wherein at least a part of a surface of the glass container has a coating, the container having a standard ethanol-modified dye-ingress tested container closure integrity of at least 150 hours at −80° C. The standard ethanol-modified dye-ingress tested container closure integrity may be stopper and/or tip related.

A glass container that has this standard ethanol-modified dye-ingress tested container closure integrity can be safely assumed to provide for a tight seal even under very low temperature storage conditions. Sterile compositions remain sterile, extraneous matter may not leach into the composition within the container or system.

In some embodiments, the disclosure relates to a glass container for pharmaceutical compositions, comprising a hollow cylindrical body having at least one open end; wherein at least a part of a surface of the glass container has a coating, wherein a thickness of the coating is at least 400 nm and the coating was cured at less than 150° C., particularly at from 50 to <110° C.

It has been found that both coating thickness and curing temperature influence performance of a seal at very low temperatures. Particularly, curing temperatures should not be too high in order to avoid undesired chemical reactions, for example excessive crosslinking or polymerization. In some instances, a coating cured at very high temperatures was not sufficiently elastic at low temperatures in order to maintain a tight seal, further the glide force is increased at high curing temperatures.

In some embodiments, the disclosure relates to a glass container for pharmaceutical compositions, comprising a hollow cylindrical body having an open end A, open end A being configured for receiving a stopper that is slidable relative to the hollow cylindrical body from open end A; wherein at least a part of an inner surface of the hollow cylindrical body has a coating, wherein a ratio of a total inner diameter variation along the coated part of the inner surface relative to a thickness of the coating is less than 500.

High variations of inner diameters in the hollow cylindrical body make it more difficult to seal any gaps between a stopper and an inner surface of the body. Keeping the ratio at low values allows for a tight seal even at low temperatures. If inner diameter variations are not particularly low, an additional coating thickness of an appropriate coating material helps seal the gaps tightly even at low storage temperatures.

In some embodiments, the disclosure relates to a glass container for pharmaceutical compositions, comprising a hollow cylindrical body having at least one open end wherein at least a part of a surface of the glass container comprises a coating, the coating having a crystallization temperature range and a melting temperature range determined using differential scanning calorimetry at temperature change rate of 10° C./min, wherein the crystallization temperature range and the melting temperature range overlap at a temperature of from −75° C. to −100° C., particularly at −80° C.

Without wishing to be bound by this theory, it is hypothesized that, within the range of overlap, both crystalline and molten portions of the coating exist. This is believed to give the coating the properties in terms of mechanical resistance and elasticity needed to form a tight seal at low temperatures.

In some embodiments, the disclosure relates to a glass container for pharmaceutical compositions, comprising a hollow cylindrical body having at least one open end wherein at least a part of a surface of the glass container comprises a coating, the coating comprising one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00, and optionally at least 0.40.

The non-cross-linked polysiloxane structural units may help achieve the desired elasticity and low temperature seal functionality that may be preferred for the containers and systems of the disclosure. The inventors consider that the cross-linked polysiloxane provides for a polymeric network within which the non-cross-linked polysiloxane remains embedded such that a hybrid coating structure results that combines properties of a cured polymeric network and a liquid silicone oil. This is believed to help achieve a tight seal at low temperatures.

In some embodiments, the disclosure provides for a system comprising the previously described glass container, a stopper and/or a cap wherein the system has a specific ethanol-modified dye-ingress tested container closure integrity of at least 150 hours at −80° C. The specific ethanol-modified dye-ingress tested container closure integrity may be stopper and/or tip related.

A system that has this specific ethanol-modified dye-ingress tested container closure integrity can be safely assumed to provide for a tight seal even under very low temperature storage conditions. Sterile compositions remain sterile, extraneous matter may not leach into the composition within the system.

In some embodiments, the disclosure relates to a system comprising a previously described glass container, and a stopper, wherein a ratio of (I) a difference of an average linear coefficient of thermal expansion of the material of the stopper and of the glass container, and (II) a thickness of the coating is less than 0.5 ppm/nm.

Coefficients of thermal expansion of stopper material may be far higher than those of the glass container. It was found that choosing coating thickness with a view to the difference of thermal expansion of stopper material and container material safeguards a tight seal even a very low storage temperatures.

In some embodiments, the disclosure relates to a method of making a glass container, comprising melting a batch of raw materials to prepare a glass, forming the glass into glass containers, applying a coating composition and curing the composition at a curing temperature of less than 150° C., particularly at from 50 to <110° C. Equally, by adding the further step of inserting a stopper, and optionally a plunger rod, into the hollow cylindrical body, methods of making a system are provided.

In some embodiments, the disclosure relates to a glass container or a system also comprising a pharmaceutical composition.

In some embodiments, the disclosure relates to a use of a coating composition for preparing a coating on a surface of a glass container, wherein the coated glass container is subsequently stored at a low temperature within a range of −60° C. or below, particularly at about −80° C., for at least 150 h, wherein the coating composition has the following composition in percent by weight

| | |
|---|---|
| one or more cross-linkable polysiloxane compounds | 3.0 to 20.0% |
| one or more non-cross-linkable polysiloxane compounds | 2.0 to 25.0% |
| one or more cross-linking polysiloxane compounds | 0.10 to 1.50% |
| one or more catalysts | 0.03 to 0.50% |
| one or more diluents | 55.0 to 92.0% |

In some embodiments, the disclosure relates to a use of a glass container or a system for storing pharmaceutical compositions at low temperatures of −60° C. or below, particularly at about 80° C., for at least 150 h.

As set out above, some embodiments provided according to the disclosure relate to a glass container for pharmaceutical compositions, comprising a hollow cylindrical body having at least one open end wherein at least a part of a surface of the glass container comprises a coating of the disclosure. Generally, the glass container for pharmaceutical compositions of the disclosure may comprise a hollow cylindrical body having a first open end, or open end A, open end A being configured for receiving a stopper that is slidable relative to the hollow cylindrical body from open end A. At least a part of an inner surface of the hollow cylindrical body may comprise the coating in order to establish a tight seal between the inner surface of the hollow cylindrical body and the stopper. Additionally or alternatively, the glass containers of the disclosure may have an open end that is closable by a cap. In syringes, this second open end, or open end B (the first open end, or open end A, being the opening that receives the stopper), is typically the tip side, i.e. the part of the syringe where the needle will be attached. Open end B will usually be at the opposite end of the container compared to open end A. Open end A may be referred to as the "stopper side", i.e. the side where a stopper can be inserted. It has been found that providing the coating on the tip side will improve a tight seal even at extremely low temperatures.

In some embodiments, the hollow cylindrical body described in the disclosure as part of a glass container or system may have an essentially constant inner diameter in order to allow for a stopper to expel essentially all of a composition present in the body. In this context, "essentially constant" includes inner diameter variations of not more than 200 μm, not more than 100 μm or not more than 50 μm.

The coating may have a hardness such that a hardness value measured on the coated surface according to DIN EN ISO 14577-1:2015-11 and DIN EN ISO 14577-4:2017-04 differs from the hardness value measured on an uncoated surface of the glass container by less than 10%, less than 7.0%, less than 5.0% or less than 3.0%. Optionally, the hardness value of the coated surface is lower than the hardness value of the uncoated surface, optionally by less than 10%, less than 7.0%, less than 5.0% or less than 3.0%. In some embodiments, the hardness value of the coated surface is at least 0.1%, at least 0.5%, at least 1.0% or at least 2.0% lower than the hardness value of the uncoated surface. Optionally, the hardness value is Martens hardness and the hardness of the glass is from 3000 to 3500 MPa, or from 3100 to 3300 MPa. Optionally, hardness may be measured at different indentation depths and indentation forces, with an indentation depth of 0.30 μm and/or an indentation force of 2 mN.

The glass container may be any type of container, including a vial, a syringe, or a cartridge. In some embodiments, the glass container is a pre-filled syringe or cartridge.

The glass container for pharmaceutical compositions of the disclosure may comprise a hollow cylindrical body having an open end A, open end A being configured for receiving a stopper that is slidable relative to the hollow cylindrical body from open end A, wherein at least a part of an inner surface of the hollow cylindrical body comprises a coating, the coating having a glass transition temperature at −60° C. or below.

The glass container for pharmaceutical compositions of the disclosure may comprise a hollow cylindrical body having an open end A, open end A being configured for receiving a stopper that is slidable relative to the hollow cylindrical body from open end A, wherein at least a part of an inner surface of the hollow cylindrical body comprises a coating, the coating having a hardness such that a hardness value measured on the coated surface according to DIN EN ISO 14577-1:2015-11 and DIN EN ISO 14577-4:2017-04 differs from the hardness value measured on an uncoated surface of the glass container by less than 10%.

The glass container for pharmaceutical compositions of the disclosure may comprise a hollow cylindrical body having an open end A, open end A being configured for receiving a stopper that is slidable relative to the hollow cylindrical body from open end A, wherein at least a part of an inner surface of the hollow cylindrical body comprises a coating, the container having a standard ethanol-modified dye-ingress tested container closure integrity of at least 150 hours at −80° C. The standard ethanol-modified dye-ingress tested container closure integrity may be stopper-related.

The glass container for pharmaceutical compositions of the disclosure may comprise a hollow cylindrical body having an open end A, open end A being configured for receiving a stopper that is slidable relative to the hollow cylindrical body from open end A, wherein at least a part of an inner surface of the hollow cylindrical body comprises a coating, wherein the thickness of the coating is at least 400 nm and the coating was cured at less than 150° C.

It has been found that both coating thickness and curing temperature influence performance of a seal at very low temperatures. Particularly, curing temperatures should not be too high in order to avoid undesired chemical reactions, for example excessive crosslinking or polymerization. In some instances, a coating cured at very high temperatures was not sufficiently elastic at low temperatures in order to maintain a tight seal.

The glass container for pharmaceutical compositions of the disclosure may have an open end B, open end B being configured for being closed by a cap, open end B having a nestling surface, configured to fit snugly against a surface of a cap, wherein at least a part of the nestling surface comprises a coating, the coating having a glass transition temperature at −60° C. or below. A coating on the tip side can help provide for a tight seal even under very low temperature storage conditions. Sterile compositions remain sterile, extraneous matter may not leach into the composition within the container or system.

The glass container for pharmaceutical compositions of the disclosure may have an open end B, open end B being configured for being closed by a cap, open end B having a nestling surface, configured to fit snugly against a surface of a cap, wherein at least a part of the nestling surface comprises a coating, the coating having a hardness such that a hardness value measured on the coated surface according to DIN EN ISO 14577-1:2015-11 and DIN EN ISO 14577-4:2017-04 differs from the hardness value measured on an uncoated surface of the glass container by less than 10%.

The glass container for pharmaceutical compositions of the disclosure may have an open end B, open end B being configured for being closed by a cap, open end B having a nestling surface, configured to fit snugly against a surface of a cap, wherein at least a part of the nestling surface comprises a coating, wherein the thickness of the coating is at least 400 nm and the coating was cured at less than 150° C.

The glass container for pharmaceutical compositions of the disclosure may have an open end B, open end B being configured for being closed by a cap, open end B having a nestling surface, configured to fit snugly against a surface of a cap, wherein at least a part of the nestling surface comprises a coating, the coating having a crystallization temperature range and a melting temperature range determined using differential scanning calorimetry at temperature change rate of 10° C./min, wherein the crystallization temperature range and the melting temperature range overlap at a temperature of from −75° C. to −100° C., particularly at −80° C.

The glass container for pharmaceutical compositions of the disclosure may have an open end B, open end B being configured for being closed by a cap, open end B having a nestling surface, configured to fit snugly against a surface of a cap, wherein at least a part of the nestling surface comprises a coating, the coating comprising one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00, and optionally at least 0.40.

The glass container for pharmaceutical compositions of the disclosure may have an open end B, open end B being configured for being closed by a cap, open end B having a nestling surface, configured to fit snugly against a surface of a cap, wherein at least a part of the nestling surface comprises a coating, the container having a standard ethanol-modified dye-ingress tested container closure integrity of at least 150 hours at −80° C. The standard ethanol-modified dye-ingress tested container closure integrity may be tip-related. A glass container that has a coating on the tip side and this standard ethanol-modified dye-ingress tested container closure integrity can be safely assumed to provide for a tight seal even under very low temperature storage conditions. Sterile compositions remain sterile, extraneous matter may not leach into the composition within the container or system.

The glass container for pharmaceutical compositions of the disclosure may comprise a hollow cylindrical body having an open end A, open end A being configured for receiving a stopper that is slidable relative to the hollow cylindrical body from open end A; wherein at least a part of an inner surface of the hollow cylindrical body has a coating, wherein a ratio of a total inner diameter variation along the coated part of the inner surface relative to a thickness of the coating is less than 500.

The glass container for pharmaceutical compositions of the disclosure may comprise a hollow cylindrical body having an open end A, open end A being configured for receiving a stopper that is slidable relative to the hollow cylindrical body from open end A; wherein at least a part of an inner surface of the hollow cylindrical body has a coating, the coating having a crystallization temperature range and a melting temperature range determined using differential scanning calorimetry at temperature change rate of 10° C./min, wherein the crystallization temperature range and the melting temperature range overlap at a temperature of from −75° C. to −100° C., particularly at −80° C.

The glass container for pharmaceutical compositions of the disclosure may comprise a hollow cylindrical body having an open end A, open end A being configured for receiving a stopper that is slidable relative to the hollow cylindrical body from open end A; wherein at least a part of an inner surface of the hollow cylindrical body has a coating, the coating comprising one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00, and optionally at least 0.40.

The glass container for pharmaceutical compositions of the disclosure may comprise a hollow cylindrical body having an open end A, open end A being configured for receiving a stopper that is slidable relative to the hollow cylindrical body from open end A, wherein at least a part of an inner surface of the hollow cylindrical body comprises a coating, the container further having an open end B, open end B being configured for being closed by a cap, open end B having a nestling surface, configured to fit snugly against a surface of a cap, wherein at least a part of the nestling surface comprises the coating, the coating having a glass transition temperature at −60° C. or below.

The glass container for pharmaceutical compositions of the disclosure may comprise a hollow cylindrical body having an open end A, open end A being configured for receiving a stopper that is slidable relative to the hollow cylindrical body from open end A, wherein at least a part of an inner surface of the hollow cylindrical body comprises a coating, the container further having an open end B, open end B being configured for being closed by a cap, open end B having a nestling surface, configured to fit snugly against a surface of a cap, wherein at least a part of the nestling surface comprises the coating, the coating having a hardness such that a hardness value measured on the coated surface according to DIN EN ISO 14577-1:2015-11 and DIN EN ISO 14577-4:2017-04 differs from the hardness value measured on an uncoated surface of the glass container by less than 10%.

The glass container for pharmaceutical compositions of the disclosure may comprise a hollow cylindrical body having an open end A, open end A being configured for receiving a stopper that is slidable relative to the hollow cylindrical body from open end A, wherein at least a part of an inner surface of the hollow cylindrical body comprises a coating, the container further having an open end B, open end B being configured for being closed by a cap, open end B having a nestling surface, configured to fit snugly against a surface of a cap, wherein at least a part of the nestling surface comprises the coating, the container having a standard ethanol-modified dye-ingress tested container closure integrity of at least 150 hours at −80° C. The standard ethanol-modified dye-ingress tested container closure integrity may be tip- and stopper-related.

The glass container for pharmaceutical compositions of the disclosure may comprise a hollow cylindrical body having an open end A, open end A being configured for receiving a stopper that is slidable relative to the hollow cylindrical body from open end A, wherein at least a part of an inner surface of the hollow cylindrical body comprises a coating, the container further having an open end B, open end B being configured for being closed by a cap, open end B having a nestling surface, configured to fit snugly against a surface of a cap, wherein at least a part of the nestling surface comprises the coating, wherein the thickness of the coating is at least 400 nm and the coating was cured at less than 150° C.

The glass container for pharmaceutical compositions of the disclosure may comprise a hollow cylindrical body having an open end A, open end A being configured for receiving a stopper that is slidable relative to the hollow cylindrical body from open end A, wherein at least a part of an inner surface of the hollow cylindrical body comprises a coating, the container further having an open end B, open end B being configured for being closed by a cap, open end B having a nestling surface, configured to fit snugly against a surface of a cap, wherein at least a part of the nestling surface comprises the coating, the coating having a crystallization temperature range and a melting temperature range determined using differential scanning calorimetry at temperature change rate of 10° C./min, wherein the crystallization temperature range and the melting temperature range overlap at a temperature of from −75° C. to −100° C., particularly at −80° C.

The glass container for pharmaceutical compositions of the disclosure may comprise a hollow cylindrical body having an open end A, open end A being configured for receiving a stopper that is slidable relative to the hollow cylindrical body from open end A, wherein at least a part of an inner surface of the hollow cylindrical body comprises a coating, the container further having an open end B, open end B being configured for being closed by a cap, open end B having a nestling surface, configured to fit snugly against a surface of a cap, wherein at least a part of the nestling surface comprises the coating, the coating comprising one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00, and optionally at least 0.40.

Coating

The coating may be disposed on an inner surface of the hollow cylindrical body of the glass container and/or on one or more other surfaces of the glass container, including surfaces at the tip of a syringe, such as the nestling surface at the tip side of a syringe. The coatings and coating compositions described herein help achieve a tight seal at low temperatures.

The coating may have a thickness of 350 nm or more, 400 nm or more, 450 nm or more, or 500 nm or more. Optionally, the coating may have a thickness of up to 1500 nm, up to 1250 nm or up to 1000 nm. A suitable coating thickness contributes to a tight seal at low temperatures. In some embodiments, coating thickness may be from 350 nm to 1500 nm, from 400 nm to 1250 nm, or from 450 nm to 1000 nm. Optionally, the indication of a coating thickness means that at least 90%, at least 95% or at least 99% of the coated area has a coating thickness in the indicated range. In some embodiments, the coating thickness is larger than 400 nm, particularly at least 450 nm or at least 500 nm. Exemplary ranges for the coating thickness are from >400 nm to 1500 nm, from 450 nm to 1250 nm, or from 500 nm to 1000 nm.

The coating may contain one or more silicon-organic polymers. A "silicon-organic polymer" is a polymeric material comprised of monomeric units, the monomeric units comprising both silicon (Si) and carbon (C) atoms. An example of a silicon-organic polymer is a polysiloxane. In some embodiments, the coating comprises one or more polysiloxane structural units. "Polysiloxane structural units" may refer to polysiloxane structures within a larger molecule (e.g. covalently bonded to a larger molecule, or part of a larger molecule) or to polysiloxane molecules per se. For example, cross-linked polysiloxane structural units are part of (covalently attached to) a polymeric network, whereas non-cross-linked polysiloxane structural units are present in the coating as molecules without being covalently attached to other molecules in the coating. Thus, the coating may comprise cross-linked polysiloxane structural units and/or non-cross-linked polysiloxane structural units. In this context, "cross-linked" means that the polysiloxane structural units are covalently attached to a polymeric network.

Specifically, the term "cross-linked" includes the exemplary case that a polysiloxane structure is covalently linked to other polysiloxane structures, e.g. through a polymeric backbone.

Optionally, the cross-linked polysiloxane structural units are covalently bonded to other polysiloxane structures as a result of a hydrosilylation reaction. The polymeric backbone may for example be formed by polymerizing a polysiloxane carrying a polymerizable functional group such as a vinyl group. In contrast, "non-cross-linked" means that the polysiloxane is not covalently linked to other polysiloxane structures through a polymeric backbone, or optionally not covalently linked to other polysiloxanes of the coating at all.

In some embodiments, the cross-linked polysiloxane structural units are cross-linked via one or more, e.g. two, end groups. The end groups may be selected from vinyl, acryl, methacryl, styrene, and combinations thereof. In some embodiments, the coating comprises a hydrosilylation reaction product of a cross-linkable polysiloxane compound and a cross-linking polysiloxane compound, such as a vinyl-polysiloxane compound and a polysiloxane having at least two Si—H groups. The cross-linking polysiloxane may cross-link the cross-linkable polysiloxane by reaction of its plurality of Si—H groups with vinyl groups of the cross-linkable polysiloxane. The reaction may be platinum catalyzed.

In the disclosure, "polysiloxane" or "polysiloxane structural unit" may refer to polyalkylsiloxane structural units, such as polydialkylsiloxane structural units. Optionally, one or more of the alkyl groups in the polyalkylsiloxane or polydialkylsiloxane are independently selected from branched or unbranched C1 to C8 alkyl groups. The alkyl groups may be linear alkyl groups. For example, the alkyl groups may be independently selected from methyl, ethyl, propyl, butyl, pentyl, hexyl, heptyl and octyl groups. Optionally, the alkyl groups are independently selected from methyl and ethyl.

In some embodiments, the coating comprises both cross-linked polydialkylsiloxane structural units, and non-cross-linked polysiloxane structural units. Specifically, the coating may comprise cross-linked polydialkylsiloxane structural units, and non-cross-linked polysiloxane structural units, wherein the non-cross-linked polysiloxane structural units may be one or more silicone oils, i.e. polydialkylsiloxane structural units, such as polydimethylsiloxane silicone oil.

Optionally, a ratio of a weight amount of cross-linked polysiloxane structural units and a weight amount of non-cross-linked polysiloxane structural units in the coating is less than 3.00, less than 2.50, less than 1.80, or less than 1.20. The ratio of a weight amount of cross-linked polysiloxane structural units and a weight amount of non-cross-linked polysiloxane structural units in the coating may be at least 0.40, at least 0.60, or at least 0.70. In some embodiments, this ratio ranges from 0.40 to 3.00, from 0.60 to 2.50, or from 0.70 to 1.80. The non-cross-linked polysiloxane structural units may help achieve the desired elasticity and low temperature seal functionality that may be preferred for the containers and systems of the disclosure.

The coating may comprise more than one type of non-cross-linked polysiloxane structural units, such as at least two types, or at least three types. The types may differ in their viscosities. In some embodiments, the coating comprises high viscosity non-cross-linked polysiloxane structural units having a viscosity of more than 10,000 cSt, and/or low viscosity non-cross-linked polysiloxane structural units having a viscosity of 10,000 cSt, or less. Viscosity may be determined according to DIN EN ISO 3219:1993 using a coaxial-cylinder system at 23° C. and a shear rate of 10 $s^{-1}$. Optionally, the high viscosity non-cross-linked polysiloxane structural units have a viscosity of at least 15,000 cSt, and/or the low viscosity non-cross-linked polysiloxane structural units have a viscosity of 5,000 cSt, or less.

In some embodiments, the coating comprises the high viscosity non-cross-linked polysiloxane structural units but not necessarily the low viscosity non-cross-linked polysiloxane structural units.

A ratio of a weight amount of the low viscosity non-cross-linked polysiloxane structural units and the high viscosity non-cross-linked polysiloxane structural units ($mass_{high}$: $mass_{low}$) may be at least 0.10, at least 0.50, at least 1.00, at least 1.50 or at least 2.00. In some embodiments, this ratio may range up to 5.00, up to 4.00 or up to 3.00. For example, the ratio of a weight amount of the low viscosity non-cross-linked polysiloxane structural units and the high viscosity non-cross-linked polysiloxane structural units may range from 0.10 to 5.00, from 0.50 to 4.00, or from 1.00 to 3.00.

The cross-linked polysiloxane structural units, the low viscosity non-cross-linked polysiloxane structural units, and/or the high viscosity non-cross-linked polysiloxane structural units, may comprise or consist of dialkylsiloxane monomeric units, in particular dimethylsiloxane monomeric units.

Optionally, the low viscosity non-cross-linked polysiloxane structural units have a weight average molecular weight of 1,200 to 30,000 g/mol, and/or the high viscosity non-cross-linked polysiloxane structural units have a weight average molecular weight of 15,000 to 300,000 g/mol. In some embodiments, the high viscosity non-cross-linked polysiloxane structural units have a weight average molecular weight of 32,000 to 210,000 g/mol, or from 100,000 to 150,000 g/mol. In some embodiments, the low viscosity non-cross-linked polysiloxane structural units have a weight average molecular weight of 5,000 to 25,000 g/mol, or from 10,000 to 20,000 g/mol.

In some embodiments, the low viscosity non-cross-linked polysiloxane structural units have a weight average molecular weight of at least 1,200 g/mol, at least 5,000 g/mol, or at least 10,000 g/mol. The weight average molecular weight may range up to 30,000 g/mol, up to 25,000 g/mol, or up to 20,000 g/mol.

In some embodiments, the high viscosity non-cross-linked polysiloxane structural units have a weight average molecular weight of at least 15,000 g/mol, at least 32,000 g/mol, or at least 100,000 g/mol. The weight average molecular weight may range up to 300,000 g/mol, up to 210,000 g/mol, or up to 150,000 g/mol.

Without wishing to be bound by this theory, the inventors consider curing temperature of the coating composition relevant for achieving a tight seal. The coating may be cured at a curing temperature below 150° C., below 125° C., or below 110° C. Too high a curing temperature may yield a coating having a low elasticity. On the other hand, too low a curing temperature may not be sufficient for a good sealing performance either. Thus, in some embodiments, the curing temperature may be 50° C. or more, 60° C. or more, or 70° C. or more. Notably, the curing temperature is the effective temperature at the coating composition. It must not be confused with a nominal oven temperature. The oven temperature may be much higher than the curing temperature because there may be insufficient time for the whole oven to equilibrate at the nominal temperature during curing time. Optionally, the coating may be cured at 50° C. to below 150° C., from 60° C. to below 125° C., or from 70° C. to below 110° C. An exemplary range is from 50° C. to $<$110° C.

In some embodiments, the coating is obtainable or obtained by applying a coating composition as disclosed herein to at least parts of a surface of the container (e.g. an inner surface and/or a nestling surface), and curing the coating composition on the surface, wherein a curing temperature of the coating composition is less than 150° C., particularly at from 50° C. to $<$110° C.

Optionally, the curing temperature may be held for at least 10 seconds, at least 30 seconds, at least 45 seconds or at least 60 seconds. In some embodiments, the curing temperature is held for up to 3000 seconds, up to 300 seconds, or up to 180 seconds. Too long a curing time may impair elasticity and glide force.

For a suitable sealing efficacy, it will often be sufficient to apply the coating on an area where a tight seal is desired, i.e. a contact are of inner surface and stopper, and/or of nestling surface and cap. The coating may be disposed on at least 25%, or at least 50% of the inner surface of the hollow cylindrical body (area by area). However, the coating may also have a beneficial effect on the gliding properties of a stopper on the inner surface of the hollow cylindrical body. Therefore, in some embodiments, the coating is disposed on at least 65%, or at least 85% of the inner surface of said hollow cylindrical body (area by area). Optionally, the coating is disposed on at least 90%, or essentially all of the inner surface of said hollow cylindrical body. Alternatively or additionally, the coating is disposed on at least 65%, or at least 85% of the nestling surface of the glass container (area by area). Optionally, the coating is disposed on at least 90%, or essentially all of the nestling surface.

The coating may have a glass transition temperature at −60° C. or below, optionally at −70° C. or below, such as at −75° C. or below, or at −80° C. or below. Optionally, the glass transition temperature may be at −200° C. or higher, at −150° C. or higher, or at −120° C. or higher, or at −100° C. or higher. Glass transition temperature may be measured using differential scanning calorimetry (DSC), or thermo-mechanical analysis (TMA). An exemplary way of determining a coating's glass transition temperature includes thermomechanical analysis in expansion mode, for example using a Q400 thermomechanical analyzer by TA Instruments. The sample may be prepared by coating a glass container according to the disclosure, scraping off the coating using a scalpel and performing thermomechanical analysis in expansion mode, i.e. measuring the sample's expansion or contraction as a function of temperature. In some embodiments, a glass transition temperature of the coating is in a range from −200° C. to −60° C., from −150° C. to −70° C., from −120° C. to −75° C., or from −80° C. to −100° C. In some embodiments, the glass transition temperature is from −80° C. to −90° C.

The coating may be amorphous, or partially crystalline at room temperature. Optionally, the coating has a crystallinity of less than 20% (v/v) at 20° C.

In some embodiments, the coating may have a crystallization temperature range and a melting temperature range determined using differential scanning calorimetry at temperature change rate of 10° C./min, wherein the crystallization temperature range and the melting temperature range overlap at a temperature of from −75° C. to −100° C., particularly at −80° C. For example, DSC may be performed in a temperature range of −120° C. to −60° C. A suitable instrument is a DSC Q2000 (TA Instruments).

Without wishing to be bound by this theory, the inventors hypothesize that, within the range of overlap, both crystalline and molten portions of the coating exist. This is believed to give the coating the properties in terms of mechanical resistance and elasticity needed to form a tight seal at low temperatures. Crystallization temperature range and melting temperature range are considered to overlap, if the crystallization and melting peak areas extend into the same temperature range. For example, crystallization may start at −55° C. and end at −95° C., i.e. an exothermal crystallization peak area may range from −55° C. to −95° C.; melting may start at −90° C. and end at −40° C., i.e. an endothermal melting peak area may range from −90° C. to −40° C. In this example, the temperature range of overlap is −90° C. to −55° C. This example fulfills the requirement of an overlap at a temperature from −75° C. to −100° C. because there is an overlap at at least one temperature within the indicated range.

Container Closure Integrity

Glass containers and systems of the disclosure may have remarkable container closure integrity even at very low temperatures. In particular, a standard ethanol-modified dye-ingress tested container closure integrity may be at least 150 hours at −80° C. This means that a closure integrity at open end A (stopper-related) and/or open end B (tip-related) of the glass container or system provides for a very tight seal even at −80° C. for at least 150 hours. The time indicates the interval—from immersion until equilibration is complete—that the container may undergo the corresponding test without failing, i.e. without dye-ingress.

Optionally, the standard ethanol-modified dye-ingress tested container closure integrity is at least 300 hours, at least 600 hours or at least 1200 hours at −80° C. These times and temperature are considered sufficient to safely produce, distribute and store pharmaceutical compositions in the glass container or system.

The glass container provided according to the disclosure may have a standard ethanol-modified dye-ingress tested container closure integrity at −80° C. of at least 150 hours, at least 600 hours, or at least 1200 hours. Optionally, the glass container provided according to the disclosure has a standard ethanol-modified dye-ingress tested container closure integrity at −80° C. of at least 1500 hours, or at least 6000 hours. Depending on the shelf-life necessary for a pharmaceutical product, the standard ethanol-modified dye-ingress tested container closure integrity at −80° C. does not necessarily have to be very high, e.g. in some embodiments, it may be up to 12000 hours, up to 10000 hours, or up to 8000 hours. The standard ethanol-modified dye-ingress tested container closure integrity may be stopper and/or tip related, depending on which interface is subjected to the test. In an exemplary embodiment, both interfaces—inner surface/stopper and nestling surface/cap—are tested and pass the test. If only one interface is to be tested the other open end may be sealed by melting.

The system provided according to the disclosure may have a specific ethanol-modified dye-ingress tested container closure integrity at −80° C. of at least 150 hours, at least 600 hours, or at least 1200 hours. Optionally, the system provided according to the disclosure has a specific ethanol-modified dye-ingress tested container closure integrity at −80° C. of at least 1500 hours, or at least 6000 hours. Depending on the shelf-life necessary for a pharmaceutical product, the specific ethanol-modified dye-ingress tested container closure integrity at −80° C. does not necessarily have to be very high, e.g. in some embodiments, it may be up to 12000 hours, up to 10000 hours, or up to 8000 hours. The specific ethanol-modified dye-ingress tested container closure integrity may be stopper and/or tip related, depending on which interface is subjected to the test. In an exemplary embodiment, both interfaces—inner surface/stopper and nestling surface/cap—are tested and pass the test. If only one interface is to be tested the other open end may be sealed by melting.

Structural Features of Container

Generally, the disclosure relates to glass containers for pharmaceutical compositions, comprising a hollow cylindrical body having at least one open end, i.e. an open end suitable to fill, remove or expel the contents of the container. The container may be configured for receiving a stopper that is slidable relative to the hollow cylindrical body from an open end towards an opposite end of the container, e.g. open end B. The stopper can be useful to close open end A and/or to expel contents of the hollow cylindrical body through open end B. In some embodiments, the container has at least two open ends. One open end is such that a stopper can be inserted, also called "open end A" in the disclosure. Another open end may be on an opposite side of the container, e.g. in the case of a syringe, the side of the tip.

In some embodiments, the glass container has an open end B, optionally disposed at an opposite end of the container relative to open end A, open end B being configured for being closed by a cap. Open end B may comprise portions with a conical shape, or a conical surface, such that a cap, having a fitting conical shape, can be applied to close open end B. The conical shape may be an inner or outer cone. The disclosure is not limited to cone shaped open ends, other geometries may be used as well, as long as they are suitable for achieving a tight seal between open end B and a corresponding cap. The surface of the open end B that corresponds to a surface of a cap so as to form a tight seal, is called "nestling surface". Open end B and/or a nestling surface thereof may be configured to fit snugly against a surface of a cap. Optionally, the nestling surface has a conical shape.

In some embodiments, at least a part of open end B, or a nestling surface thereof is coated with the coating described in the disclosure. Optionally, the coating is disposed on at least 25%, at least 35%, or at least 50% of the nestling surface (area/area). In some embodiments, the coating is disposed on at least 65%, at least 75%, at least 85% or at least 95% of the nestling surface. For example, the coating is disposed on essentially all of the nestling surface.

The disclosure is not particularly limited to container volumes. In some embodiments, the hollow cylindrical body encloses a volume of at least 0.10 ml, at least 0.50 ml, or at least 1.00 ml. Optionally, the volume may be up to 1,000 ml, up to 200 ml, up to 100 ml, or up to 25 ml. In embodiment, the volume ranges from 0.1 ml to 1,000 ml, from 0.50 ml to 200 ml, or from 1.00 ml to 25 ml. In some embodiments, the hollow cylindrical body encloses a volume of less than 10.0 ml.

The hollow cylindrical body has a lumen surrounded by a glass wall, wherein the glass wall may have a wall thickness of at least 0.50 mm, at least 0.80 mm, or at least 1.00 mm. Optionally, the glass wall thickness may range up to 10.0 mm, up to 8.0 mm, up to 5.0 mm, or up to 4.0 mm. In some embodiments, glass wall thickness is from 0.50 to 10.0 mm, from 0.80 mm to 8.0 mm, or from 1.00 mm to 4.00 mm. The term "wall thickness" as used herein describes the shortest distance between an inner surface and an outer surface of the hollow cylindrical body.

The term "outer diameter" as used herein refers to the maximum distance between two points on the outer surface of the hollow cylindrical body, wherein the two points are connected by a straight line, which is perpendicular to and intersects with the longitudinal axis of the hollow cylindrical body. The term "inner diameter" as used herein refers to the maximum distance between two points on the inner surface of the hollow cylindrical body, wherein the two points are connected by a straight line, which is perpendicular to and intersects with the longitudinal axis of the hollow cylindrical body.

The hollow cylindrical body of the container may have an essentially constant inner diameter. This means that a total inner diameter variation is low. The "total inner diameter variation" is the difference between the largest inner diameter of a hollow cylindrical body and the smallest inner diameter of the same hollow cylindrical body. For example, a total inner diameter variation of a hollow cylindrical body may be less than 200 μm, less than 100 μm, less than 50 μm, or less than 25 μm. Optionally, a total inner diameter variation may be 0.01 μm or more, 0.10 μm or more, or 1.0 μm or more.

In some embodiments, a ratio of a total inner diameter variation along the coated part of the inner surface of the hollow cylindrical body relative to a thickness of the coating is less than 500, less than 400, less than 250, or less than 150. In some embodiments, this ratio is at least 1.0, at least 5.0, or at least 10.0. For example, this ratio may range from 1.0 to 500, from 5.0 to 250, or from 10.0 to 150.

Break Loose and Glide Forces

The glass container according to some embodiments of the disclosure may have a standardized glide force of not more than 5.0 N.

The glide force indicates the force needed to push a stopper in the hollow cylindrical body, whereas the break loose force indicates the forces needed to cause an initial movement of the stopper within the hollow cylindrical body. A "standardized glide force" is a glide force (GF) measured at standard conditions. Likewise, a "standardized break loose force" is a break loose force (BLF) measured at standard conditions. Standard conditions include a standard stopper, i.e. a Datwyler FM257/2 stopper made of bromobutyl rubber having a hardness of 52 Shore A, and density of 1.355 g/cm$^3$, available from Datwyler Pharma Packaging International NV, Industrieterrein Kolmen 1519, BE-3570 Alken, Belgium). BLF and GF can be measured in one take. A test for BLF and GF may be referred to as "BLGF" test. Any reference to a break loose force or glide force in the disclosure means the standardized break loose or glide force, if it relates to a glass container. In cases of doubt, any reference to BLF or GF relating to a system designates the system's specific BLF or GF, respectively. A "specific" BLF or GF relates to the break loose or glide force measured in the system, i.e. including the system's stopper, instead of the standard stopper. Other than that, the measurement is the same as for the standard test.

The standardized BLGF test is conducted on a universal testing machine at room temperature, i.e. 20° C. A standardized BLGF testing device with a 50 N test cup is used for this purpose. The samples were fixed in vertical orientation in a universal testing machine model 106, 2 kN from TesT AG, CH-6331 Hünenberg, Switzerland.

The BLF is the force needed to move the stopper from its original position. The GF is the force needed to keep the stopper moving after breaking it loose.

The containers are filled with water for injection. After filling the specimen they are either stored or tested immediately, depending on the test purpose. The specimen is tested without needles.

The specimen is inserted into the holder and the pressure stamp is moved towards the stopper at a rate of 20 mm/min. Once a force of 0.25 N is measured the machine switches to the test rate of 100 mm/min and starts recording the data. The experiment ends when the measured force exceeds 35 N, which is usually the case when the distal end of the hollow cylindrical body is reached (typically close to open end B).

The BLF is the highest force measured within the first 4 mm of stopper movement. The GF values are measured within a test range starting after 4 mm of movement and ending 10 mm before reaching the distal end of the barrel, the GF according to the disclosure is the highest glide force measured in this experiment.

The glass containers of this invention may exhibit a standardized BLF of not more than 12.0 N. In some embodiments, the standardized BLF may be limited to upper limits of 9.0 N, 8.0 N, 7.0 N, 6.0 N, 5.0 N or even 4.0 N. The standardized BLF may be at least 0.1 N, at least 0.5 N, or at least 1.0 N so as to avoid any unintended movement of the stopper.

The glass container exhibits a ratio of the standardized BLF relative to the standardized GF of BLF/GF>1.30. Optionally, the ratio of the standardized BLF relative to the standardized GF is characterized by BLF/GF≤3.0, in particular even after storing the glass container at −80° C. for 150 hours. In some embodiments, the ratio BLF/GF is >1.40, >1.50 or even >1.60 for the containers of the disclosure. In some embodiments, the ratio BLF/GF may be <2.5, <2.2, <2.0, or even <1.9 for the containers of this invention after storing the glass container at −80° C. for 150 hours ("low temperature stored container"). Particularly, the relative difference in the ratios BLF/GF of low temperature stored containers, and non-stored containers ($BLF/GF_{-80° C.}-BLF/GF_0)/BLF/GF_{-80° C.}$ may be less than 10%, optionally less than 5%. This means that the impact of a freeze-thaw cycle on the ratio BLF/GF is low. On the other hand, a BLF/GF ratio as discussed above is rather high, which means that it is comparably difficult to break loose the stopper from its initial position. This may be due to an interaction between coating and stopper. A higher BLF is useful for the stopper to stay in its initial position at low temperatures, i.e. when the pharmaceutical composition expands due to freezing.

The standardized GF of the glass containers of the disclosure may be <7.5 N, <6.5 N, <5.5 N, <4.5 N, <3.5 N, or even <2.5 N. Optionally, the relative difference in the standardized BLF of low temperature stored containers and non-stored containers ($(BLF_{-80° C.}-BLF_0)/BLF_{-80° C.}$ is less than 25%, <20%, <15%, <10% or even <5%. The relative difference in the GF of low temperature stored containers, and non-stored containers ($(GF_{-80° C.}-GF_0)/GF_{-80° C.}$ is less than 25%, <20%, <15%, <10% or even <5%. Keeping GLF comparably low helps fully expel the contents of the container with the stopper after low temperature storage.

A suitable glide force and break loose force is relevant for a convenient use of glass containers and systems of the disclosure. Generally, a tight seal corresponds to a high break loose and/or glide force. Some glass containers of the disclosure exhibit standardized break loose and glide forces that are remarkably low. However, a sufficiently high break loose force may be beneficial for inhibiting undesired stopper movement during storage.

Optionally, the glass container according to the disclosure has a standardized glide force of at least 0.5 N.

In order to safeguard a tight seal by inhibiting stopper movement during low temperature storage, glass containers of the disclosure may have a standardized break loose force that exceeds the container's standardized glide force by at least 30%, at least 60%, at least 100%, or at least 200%.

In some embodiments, a system provided according to the disclosure has a specific break loose force that is at least 600% larger than a specific glide force and the specific break loose force is at least 4.0, or at least 4.9.

In some embodiments, the disclosure relates to a glass container or system as described herein, comprising a pharmaceutical composition. The pharmaceutical composition may comprise more than 60% by weight of water. Optionally, the pharmaceutical composition comprises a protein or nucleic acid therapeutically active agent.

Systems

In some embodiments, the disclosure relates to systems comprising the glass container provided according to the disclosure and optionally a stopper and/or a cap. The stopper may close open end A and/or the cap may close open end B.

In some embodiments, a system comprises the glass container of embodiments of the disclosure and a stopper wherein the system has a specific ethanol-modified dye-ingress tested container closure integrity of at least 150 hours at −80° C.

The specific ethanol-modified dye-ingress tested container closure integrity may be stopper-related and/or tip-related. "Stopper-related" means that the seal formed by the stopper sitting in the hollow cylindrical body is examined for its closure integrity, i.e. sealing open end A. "Tip-related" means that the seal formed by a cap sitting on a tip-sided opening is examined for its closure integrity, i.e. sealing open end B. Unlike a standard container closure integrity test, which relies on a standard stopper, plunger and/or cap, the specific ethanol-modified dye-ingress tested container closure integrity is measured using the stopper and/or cap that is part of the system under test.

Optionally, the system may have a specific ethanol-modified dye-ingress tested container closure integrity of at least 300 hours, at least 600 hours, or at least 1200 hours at −80° C.

Stopper

The system provided according to the disclosure may comprise a stopper.

The stopper may have a body having at least one annular protrusion, and a circumferential surface. The "circumferential surface" is the surface of the stopper that faces towards the inner surface of the hollow cylindrical body when the stopper is disposed in the hollow cylindrical body, e.g. inserted through open end A. The circumferential surface includes the surface of any annular protrusions. If the stopper is coated, the surface of the coating that faces the inner surface of the hollow cylindrical body is part of or constitutes the circumferential surface. The "contact surface" is the part of the circumferential surface that touches the inner surface of the hollow cylindrical body when the stopper is inserted in the hollow cylindrical body (e.g. at 20° C.). In the disclosure, it may be beneficial if the stopper is not coated. It was found that non-coated stoppers may form a tighter seal at low temperatures than a coated stopper. In some embodiments, the stopper does not comprise a fluorinated polymer coating.

An "annular protrusion" is a portion of the stopper that has a greater than average diameter, measured perpendicular to the longitudinal axis of the hollow cylindrical body. The annular protrusions touch the inner surface of the hollow cylindrical body so as to seal the junction between stopper and hollow cylindrical body. Any portion of the stopper having a greater than average diameter, but not touching the inner surface of the hollow cylindrical body to an extent of at least 80%, 90%, 99.9% or 100% during movement of the stopper in distal direction is not considered an "annular protrusion". Annular protrusions help keep the stopper in the intended position within the hollow cylindrical body, stabilize its orientation in the proximal-distal direction, and thereby influence the BLF and GF values of the container. Further, the annular protrusions seal the junction between stopper and inner surface of the hollow cylindrical body. In some embodiments, the stopper has two, three, or four annular protrusions. Optionally, the stopper may have exactly three annular protrusions.

The stopper may optionally feature one or more trailing ribs. A "trailing rib" is a portion of the stopper that has a greater than average diameter, measured perpendicular to the longitudinal axis of the hollow cylindrical body. However, the trailing rib has a smaller diameter than an annular protrusion so that it does not touch the hollow cylindrical body's inner surface to a significant extent, when the stopper is moved in the proximal-distal direction. Such trailing ribs may serve the purpose of stabilizing the stoppers orientation within the hollow cylindrical body, without effectively sealing the junction between stopper and inner surface.

The stopper may be coated with a coating. The coating may be a polymer. In some embodiments, the coating comprises a resin, such as a fluorinated polymer such as a polymer selected from the group consisting of polytetrafluoroethylene (PTFE), densified expanded polytetrafluoroethylene (ePTFE), tetrafluoroethylene (TFE), tetrafluoroethylene-perfluoroethylene copolymer, tetrafluoroethylene-hexafluoropropylene copolymer, tetrafluoroethylene-ethylene copolymer, trichlorotrifluoroethylene, polyvinylidene fluoride, polyvinyl fluoride, perfluoropropylvinylether, perfluoroalkoxy polymers, as well as copolymers, blends and combinations thereof. The coating may also be formed by layers comprising polyethylene, polypropylene, polyparaxylxylene, polylactic acid, as well as copolymers, blends and combinations thereof. A PTFE coating is an exemplary coating option. These coatings reduce the coefficient of friction of the stopper's circumferential surface on the inner surface of the hollow cylindrical body. In some embodiments, at least the parts of the stopper's circumferential surface that are supposed to be in contact with the hollow cylindrical body's inner surface will be coated.

The stopper may have an elastomeric body with an at least 10 MPa yield stress measured according ISO 527-2:2012(E) and/or a low coefficient of sliding friction below 0.23 against steel measured according to DIN EN ISO 8295/2004-10. The stopper may be made of thermoplastic elastomers and/or rubbers, such as natural or synthetic rubbers. Suitable rubber materials may be selected from the group consisting of butyl rubbers, halogenated butyl rubbers, acrylonitrile-butadiene rubbers, isoprene rubbers, neoprene rubbers, butadiene rubbers, styrene-butadiene rubbers, ethylene-propylene rubbers, isoprene-isobutylene rubbers, nitrile rubbers, and combinations and mixtures thereof. In some embodiments, the stopper is made of bromobutyl rubber. Particularly, the body of the stopper may be made of the above-listed rubbers and/or thermoplastic elastomers.

The body may be coated with a resin as described previously. The stopper coating may have a thickness of less than 1 mm, particularly from 0.5 μm to 200 μm, particularly from 10 μm to 125 μm, or from 30 to 100 μm. These thicknesses have been proven to be easily applied and sufficient for the desired effect on the friction.

The circumferential surface of the stopper may have a water contact angle of at least 100°, or even at least 110°. The circumferential surface of the stopper may be superhydrophobic. Using superhydrophobic stoppers in the containers of this invention contributes to the beneficial BLGF values due to the low coefficient of sliding friction in combination of a low adhesion disposition.

The circumferential surface of the stopper and the inner surface of the hollow cylindrical body may at least partially contact each other in a contact area. The contact area is sometimes also referred to as the sealing area. In some embodiments, the contact area will be at least 8 $mm^2$ and at most 48 $mm^2$. The contact area may be 8-48 $mm^2$ or 10-40 $mm^2$, 15-30 $mm^2$, 16-24 $mm^2$. In the case of plural annular protrusions each protrusion contributes to the contact area. A minimum contact area will be useful to achieve sufficient sealing. If the contact area is too high, BLGF values may increase too much.

The system may comprise a stopper having a Shore A hardness of not more than 70. Shore A hardness may be tested using the method of ISO 7619-1 (2012 February, 1 sec indentation). Shore A hardness may be at least 35, at least 40, or at least 45. Optionally, it may be up to 65, or up to 60. In some embodiments, Shore A hardness reaches from 35 to 70, from 40 to 65, or from 45 to 60.

The stopper may have a density of at least 1.200 $g/cm^3$, at least 1.250 $g/cm^3$, or at least 1.300 $g/cm^3$. Optionally, the density is at most 1.450 $g/cm^3$, at most 1.400 $g/cm^3$, or at most 1.385 $g/cm^3$. In some embodiments, the density ranges from 1.200 $g/cm^3$ to 1.450 $g/cm^3$, from 1.250 $g/cm^3$ to 1.400 $g/cm^3$, or from 1.300 $g/cm^3$ to 1.385 $g/cm^3$ In order to ensure a tight seal, the stopper may have a compression set of at most 20%, less than 18%, or less than 16%. Optionally, compression set may be at least 5%, at least 7%, or at least 10%. Compression set may be measured according to ISO 815-1 (2016-09). Optionally, compression set ranges from 5% to 20, from 7% to 18% or from 10% to 16%.

In some embodiments, the disclosure relates to a system comprising a glass container having an open end B, optionally disposed at an opposite end of the container relative to open end A, open end B being closed by a cap, open end B having a nestling surface, configured to fit snugly against a surface of the cap.

Cap

The system may comprise a cap having a Shore A hardness of not more than 80. Shore A hardness may be tested using the method of ISO 7619-1 (2012 February, 1 sec indentation). Shore A hardness may be at least 50, at least 55, or at least 60. Optionally, it may be up to 75, or up to 70. In some embodiments, Shore A hardness reaches from 50 to 80, from 55 to 75, or from 60 to 70.

The cap may have a density of at least 1.300 $g/cm^3$, at least 1.330 $g/cm^3$, or at least 1.350 $g/cm^3$. Optionally, the density is at most 1.500 $g/cm^3$, at most 1.450 $g/cm^3$, or at most 1.400 $g/cm^3$. In some embodiments, the density ranges from 1.300 $g/cm^3$ to 1.500 $g/cm^3$, from 1.330 $g/cm^3$ to 1.450 $g/cm^3$, or from 1.350 $g/cm^3$ to 1.400 $g/cm^3$.

In order to ensure a tight seal, the cap may have a compression set of at most 18%, less than 16%, or less than 14%. Optionally, compression set may be at least 5%, at least 7%, or at least 10%. Compression set may be measured according to ISO 815-1 (2016-09). Optionally, compression set ranges from 5% to 18%, from 7% to 16% or from 10% to 14%.

The cap may be a rigid needle cap, a rigid cap (e.g. as disclosed in EP 3 569 272 A1) or a tip cap. The cap may be made of a polymer material. The polymer material may be a rubber. In some embodiments, the polymer material is synthetic isoprene-bromobutyl blend. The cap may have an elastomeric body with an at least 10 MPa yield stress measured according ISO 527-2:2012(E) and/or a low coefficient of sliding friction below 0.23 against steel measured according to DIN EN ISO 8295/2004-10. The cap may be made of thermoplastic elastomers and/or rubbers, such as natural or synthetic rubbers. Suitable rubber materials may be selected from the group consisting of butyl rubbers, halogenated butyl rubbers, acrylonitrile-butadiene rubbers, isoprene rubbers, neoprene rubbers, butadiene rubbers, styrene-butadiene rubbers, ethylene-propylene rubbers, isoprene-isobutylene rubbers, nitrile rubbers, and combinations and mixtures thereof. In some embodiments, the cap is made of synthetic isoprene-bromobutyl rubber. Particularly, the body of the cap may be made of the above-listed rubbers and/or thermoplastic elastomers. In some embodiments, the material of the cap has a higher density or higher Shore A hardness than the stopper. Optionally, the material of the cap has a lower compression set compared to the material of the stopper.

The disclosure includes a system wherein at least a part of the nestling surface is coated with the coating described herein. For a suitable sealing efficacy, it will often be sufficient to apply the coating on an area where a tight seal is desired. Thus, the coating may be disposed on at least 25%, or at least 50% of the nestling surface (area by area). In some embodiments, the coating is disposed on at least 65%, or at least 85% of the nestling surface (area by area). Optionally, the coating is disposed on essentially all of the nestling surface.

The disclosure includes a system comprising the glass container as described herein and a stopper, wherein a ratio of (I) a difference of an average linear coefficient of thermal expansion of the material of the stopper and of the glass container, and (II) a thickness of the coating is less than 0.5 ppm/nm. In some embodiments, this ratio is less than 0.45 ppm/nm, less than 0.35 ppm/nm, or less than 0.30 ppm/nm. Optionally, this ratio may be at least 0.01 ppm/nm, at least 0.05 ppm/nm, or at least 0.10 ppm/nm. The average linear coefficient of thermal expansion may be measured from 20 to 300° C. The ratio of (I) a difference of an average linear coefficient of thermal expansion of the material of the stopper and of the glass container, and (II) a thickness of the coating may range from 0.01 ppm/nm to less than 0.5 ppm/nm, from 0.05 ppm/nm to less than 0.45 ppm/nm, or from 0.10 ppm/nm to less than 0.30 ppm/nm, A ratio of an uncompressed outer diameter of the stopper and an inner diameter of the hollow cylindrical body is more than 1.100 or more than 1.185. Generally, a higher ratio will provide for a tighter seal. However, too high a ratio will strongly increase break loose and glide forces. Optionally, this ratio is limited to not more than 1.400, not more than 1.350, or not more than 1.300.

In some embodiments, the system comprises a syringe with a staked needle and a rigid needle cap.

In some embodiments, the system comprises a syringe having a rigid cap as disclosed in EP 3 569 272 A1. EP 3 569 272 A1 is incorporated by reference as if fully set forth herein. The rigid cap may be attached to the syringe using a Luer lock adapter.

In some embodiments, the system comprises a syringe with a tip cap.

Glass Composition

The glass of the glass element is not particularly limited. Optionally, the glass is a borosilicate glass, an aluminosilicate glass, or a lithium-aluminosilicate (LAS) glass.

In some embodiments, the composition of the glass comprises, in mass-%:

- $SiO_2$: 30 to 98%, optionally 50 to 90%, optionally 70.0 to 74.0%; and/or
- $B_2O_3$: 0 to 30%, optionally 3 to 20%, optionally 7.0 to 16.0%; and/or
- $Al_2O_3$: 0 to 30%, optionally 1 to 15%, optionally 3.0 to 6.5%; and/or
- $X_2O$: 0 to 30%, optionally 1 to 15%, optionally 2.0 to 7.2%, wherein X is selected from Na, K, Li, optionally X is Na and/or K; and/or
- YO: 0 to 30%, optionally 0.1 to 5%, optionally 0.5 to 1.0%, wherein Y is selected from Ca, Mg, Ba, optionally Y is Ca and/or Mg.

Optionally, the composition of the glass consists of, in mass-%:

- $SiO_2$: 30 to 98%, optionally 50 to 90%, optionally 70.0 to 74.0%;
- $B_2O_3$: 0 to 30%, optionally 3 to 20%, optionally 7.0 to 16.0%;
- $Al_2O_3$: 0 to 30%, optionally 1 to 15%, optionally 3.0 to 6.5%;
- $X_2O$: 0 to 30%, optionally 1 to 15%, optionally 2.0 to 7.2%, wherein X is selected from Na, K, Li, optionally X is Na and/or K;
- YO: 0 to 30%, optionally 0.1 to 5%, optionally 0.5 to 1.0%, wherein Y is selected from Ca, Mg, Ba, optionally Y is Ca and/or Mg.

In some embodiments, the composition of the glass comprises, in mass-%:

- $SiO_2$: 20 to 98%, optionally 40 to 75%, optionally 50 to 65%; and/or
- $B_2O_3$: 0 to 30%, optionally 1 to 15%, optionally 3 to 9%; and/or
- $Al_2O_3$: 0 to 30%, optionally 10 to 20%, optionally 13 to 18; and/or
- $X_2O$: 0 to 30%, optionally 0 to 5%, optionally 0 to 3%, wherein X is selected from Na, K, Li, optionally X is Na and/or K; and/or
- YO: 0 to 50%, optionally 0.1 to 40%, optionally 10 to 35, wherein Y is selected from Ca, Mg, Ba, optionally Y is Ca and/or Mg.

Optionally, the composition of the glass consists of, in mass-%:

- $SiO_2$: 20 to 98%, optionally 40 to 75%, optionally 50 to 65%;
- $B_2O_3$: 0 to 30%, optionally 1 to 15%, optionally 3 to 9%;
- $Al_2O_3$: 0 to 30%, optionally 10 to 20%, optionally 13 to 18;
- $X_2O$: 0 to 30%, optionally 0 to 5%, optionally 0 to 3%, wherein X is selected from Na, K, Li, optionally X is Na and/or K;
- YO: 0 to 50%, optionally 0.1 to 40%, optionally 10 to 35, wherein Y is selected from Ca, Mg, Ba, optionally Y is Ca and/or Mg.

The volume of the glass container is not particularly limited. Optionally, the brimful volume of the container is 0.1 ml to 1000 ml, optionally, 0.5 ml to 500 ml, optionally 1 ml to 250 ml, optionally 2 ml to 30 ml, optionally 2 ml to 15 ml, optionally about 1 ml, 2 ml, 3 ml, 4, ml, 5 ml, 6 ml, 7 ml, 8 ml, 9 ml, 10 ml, 11 ml, 12 ml, 13 ml, 14 ml or 15 ml; optionally 5 to 15 ml.

In some embodiments, the glass of the glass container has a glass composition comprising 50 to 90 wt. % $SiO_2$, and 3 to 25 wt. % $B_2O_3$.

In some embodiments, the glass of the glass container has a glass composition comprising aluminosilicate, optionally comprising 55 to 75 wt. % $SiO_2$, and 11.0 to 25.0 wt. % $Al_2O_3$.

In some embodiments, the glass of the glass container has a glass composition comprising 70 to 81 wt. % $SiO_2$, 1 to 10 wt. % $Al_2O_3$, 6 to 14 wt. $B_2O_3$, 3 to 10 wt. % $Na_2O$, 0 to 3 wt. % $K_2O$, 0 to 1 wt. % $Li_2O$, 0 to 3 wt. % MgO, 0 to 3 wt. % CaO, and 0 to 5 wt. % BaO.

In some embodiments, the glass of the glass container has a glass composition comprising 72 to 82 wt. % $SiO_2$, 5 to 8 wt. % $Al_2O_3$, 3 to 6 wt. $B_2O_3$, 2 to 6 wt. % $Na_2O$, 3 to 9 wt. % $K_2O$, 0 to 1 wt. % $Li_2O$, 0 to 1 wt. % MgO, and 0 to 1 wt. % CaO.

In some embodiments, the glass of the glass container has a glass composition comprising 60 to 78 wt. % $SiO_2$, 7 to 15 wt. $B_2O_3$, 0 to 4 wt. % $Na_2O$, 3 to 12 wt. % $K_2O$, 0 to 2 wt.

% $Li_2O$, 0 to 2 wt. % MgO, 0 to 2 wt. % CaO, 0 to 3 wt. % BaO, and 4 to 9 wt. % $ZrO_2$.

In some embodiments, the glass of the glass container has a glass composition comprising 50 to 70 wt. % $SiO_2$, 10 to 26 wt. % $Al_2O_3$, 1 to 14 wt. $B_2O_3$, 0 to 15 wt. % MgO, 2 to 12 wt. % CaO, 0 to 10 wt. % BaO, 0 to 2 wt. % SrO, 0 to 8 wt. % ZnO, and 0 to 2 wt. % $ZrO_2$.

In some embodiments, the glass of the glass container has a glass composition comprising 55 to 70 wt. % $SiO_2$, 11 to 25 wt. % $Al_2O_3$, 0 to 10 wt. % MgO, 1 to 20 wt. % CaO, 0 to 10 wt. % BaO, 0 to 8.5 wt. % SrO, 0 to 5 wt. % ZnO, 0 to 5 wt. % $ZrO_2$, and 0 to 5 wt. % $TiO_2$.

In some embodiments, the glass of the glass container has a glass composition comprising 65 to 72 wt. % $SiO_2$, 11 to 17 wt. % $Al_2O_3$, 0.1 to 8 wt. % $Na_2O$, 0 to 8 wt. % $K_2O$, 3 to 8 wt. % MgO, 4 to 12 wt. % CaO, and 0 to 10 wt. % ZnO.

In some embodiments, the glass of the glass container has a glass composition comprising 64 to 78 wt. % $SiO_2$, 4 to 14 wt. % $Al_2O_3$, 0 to 4 wt. % $B_2O_3$, 6 to 14 wt. % $Na_2O$, 0 to 3 wt. % $K_2O$, 0 to 10 wt. % MgO, 0 to 15 wt. % CaO, 0 to 2 wt. % $ZrO_2$, and 0 to 2 wt. % $TiO_2$.

In some embodiments, the glass of the glass container has an average linear coefficient of thermal expansion measured in the range of 20° C. to 300° C. (CTE) between 3.0 and $8.0*10^{-6}$ $K^{-1}$, or between 3.5 and $7.0*10^{-6}$ $K^{-1}$, or between 4.0 and $6.0*10^{-6}$ $K^{-1}$. Optionally the CTE may be less than $5.2*10^{-6}$ $K^{-1}$ or less than $5.1*10^{-6}$ $K^{-1}$. In some embodiments, the CTE is limited to no more than $6.9*10^{-6}$ $K^{-1}$ or no more than $5.9*10^{-6}$ $K^{-1}$. The CTE may be measured according to DIN ISO 7991:1987.

Method of Making

A method of making glass container and/or systems of the disclosure may comprise

- melting a batch of raw materials to prepare a glass,
- forming the glass into glass containers,
- applying a coating composition and curing the composition at a curing temperature of less than 150° C.

The coating composition may contain or consist of the ingredients necessary to obtain the coating described in the disclosure. The coating composition may contain one or more silicon-organic substances, such as polymers or oligomers. For example, the coating composition may comprise polysiloxane structural units or compounds. The polysiloxane compounds of the coating composition may comprise cross-linkable polysiloxane compounds and/or non-cross-linkable polysiloxane compounds. In some embodiments, the polysiloxane compounds are polyalkylsiloxane compounds, such as polydialkylsiloxane compounds. Optionally, one or more of the alkyl groups in the polyalkylsiloxane or polydialkylsiloxane are independently selected from branched or unbranched C1 to C8 alkyl groups. Further, the coating composition may comprise a catalyst and/or a diluent.

A polysiloxane compound is considered "cross-linkable", if it comprises one or more (particularly two) groups that are polymerizable or cross-linkable under the curing conditions of the disclosure, particularly at a curing temperature below 150° C. and a curing time of less than 3000 seconds. A polysiloxane compound is considered "non-cross-linkable", if it does not comprise any chemical structures that are polymerizable or cross-linkable under the curing conditions of the disclosure, particularly at a curing temperature below 150° C. and a curing time of less than 3000 seconds.

In some embodiments, the coating composition comprises

- one or more cross-linkable polydialkylsiloxane compounds, and
- one or more non-cross-linkable polysiloxane compounds.

Optionally, the coating composition comprises

- one or more cross-linkable polydialkylsiloxane compounds,
- one or more non-cross-linkable polysiloxane compounds, and
- one or more cross-linking polysiloxane compounds.

Cross-Linking Polysiloxane Compound

The cross-linking polysiloxane compound is suitable to react with the cross-linkable polysiloxane compound under the conditions of the disclosure (particularly at a curing temperature below 150° C. and a curing time of less than 3000 seconds), optionally in a hydrosilylation reaction, forming a polysiloxane network.

The cross-linking polysiloxane compound may comprise alkylsiloxane monomeric units, such as dialkylsiloxane monomeric units. Optionally, one or more of the alkyl groups of the monomers in the cross-linking polysiloxane compound are independently selected from branched or unbranched C1 to C8 alkyl groups. The alkyl groups may be linear alkyl groups. For example, the alkyl groups may be independently selected from methyl, ethyl, propyl, butyl, pentyl, hexyl, heptyl and octyl groups. Optionally, the alkyl groups are independently selected from methyl and ethyl.

In some embodiments, the cross-linking polysiloxane compound is a polysiloxane having Si—H groups. In an exemplary embodiment the cross-linking polysiloxane compound is a copolymer having dimethylsiloxane and methylhydrosiloxane monomer units. In this case, it has been found to be advantageous to use a copolymer having the following structure (m is an integer of 1 or more and n is an integer of 1 or more; n may be 2 or more):

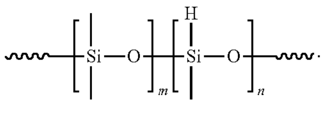

Optionally, the cross-linking polysiloxane is a copolymer, in particular having dialkylsiloxane and alkylhydrosiloxane monomeric units. The alkyl group in the alkylhydrosiloxane monomeric unit may be selected from branched or unbranched C1 to C8 alkyl groups. The alkyl groups may be linear alkyl groups. For example, the alkyl groups may be independently selected from methyl, ethyl, propyl, butyl, pentyl, hexyl, heptyl and octyl groups. Optionally, the alkyl groups are independently selected from methyl and ethyl.

The cross-linking polysiloxane may be present in the coating compositions at a concentration of from 0.10 to 1.50% by weight, from 0.10 to 1.00% by weight, or from 0.10 to 0.60% by weight. In some embodiments, the concentration of cross-linking polysiloxane in the coating composition should not exceed 1.50% by weight, 1.00% by weight, or 0.60% by weight. A minimum amount of 0.10% by weight is exemplary.

Non-Cross-Linkable Polysiloxane Compound

The coating composition may comprise more than one type of non-cross-linkable polysiloxane compounds, such as at least two types, or at least three types. The types may differ in their viscosities. In some embodiments, the coating comprises high viscosity non-cross-linkable polysiloxane compounds having a viscosity of more than 10,000 cSt, and/or low viscosity non-cross-linkable polysiloxane compounds having a viscosity of 10,000 cSt, or less. Viscosity may be determined according to DIN EN ISO 3219:1993 using a coaxial-cylinder system at 23° C. and a shear rate of 10 $s^{-1}$. Optionally, the high viscosity non-cross-linkable polysiloxane compounds have a viscosity of at least 15,000 cSt, and/or the low viscosity non-cross-linkable polysiloxane compounds have a viscosity of 5,000 cSt, or less.

A ratio of a weight amount of the low viscosity non-cross-linkable polysiloxane compounds and the high viscosity non-cross-linkable polysiloxane compounds ($mass_{high}$: $mass_{low}$) may be at least 0.10, at least 0.50, at least 1.00, at least 1.50 or at least 2.00. In some embodiments, this ratio may range up to 5.00, up to 4.00 or up to 3.00. For example, the ratio of a weight amount of the low viscosity non-cross-linkable polysiloxane compounds and the high viscosity non-cross-linkable polysiloxane compounds may range from 0.10 to 5.00, from 0.50 to 4.00, or from 1.00 to 3.00.

Optionally, the low viscosity non-cross-linkable polysiloxane compounds have a weight average molecular weight of 1,200 to 30,000 g/mol, and/or the high viscosity non-cross-linkable polysiloxane compounds have a weight average molecular weight of 15,000 to 300,000 g/mol. In some embodiments, the high viscosity non-cross-linkable polysiloxane compounds have a weight average molecular weight of 32,000 to 210,000 g/mol, or from 100,000 to 150,000 g/mol. In some embodiments, the low viscosity non-cross-linkable polysiloxane compounds have a weight average molecular weight of 5,000 to 25,000 g/mol, or from 10,000 to 20,000 g/mol.

In some embodiments, the low viscosity non-cross-linkable polysiloxane compounds have a weight average molecular weight of at least 1,200 g/mol, at least 5,000 g/mol, or at least 10,000 g/mol. The weight average molecular weight may range up to 30,000 g/mol, up to 25,000 g/mol, or up to 20,000 g/mol.

In some embodiments, the high viscosity non-cross-linkable polysiloxane compounds have a weight average molecular weight of at least 15,000 g/mol, at least 32,000 g/mol, or at least 100,000 g/mol. The weight average molecular weight may range up to 300,000 g/mol, up to 210,000 g/mol, or up to 150,000 g/mol.

Polydimethylsiloxane is particularly suitable as non-cross-linkable polysiloxane compound.

Cross-Linkable Polysiloxane Compound

The cross-linkable polysiloxane compound may be cross-linkable via one or more, optionally two, end groups. In particular, the end groups may have double bonds, making them available for a hydrosilylation reaction, e.g. under the conditions of the disclosure (particularly at a curing temperature below 150° C. and a curing time of less than 3000 seconds). The end groups may be selected from vinyl, acryl, methacryl, styrene, and combinations thereof.

In some embodiments, the cross-linkable polysiloxane compound and the cross-linking polysiloxane compound may form a hydrosilylation reaction product under the conditions provided according to the disclosure (particularly at a curing temperature below 150° C. and a curing time of less than 3000 seconds). A suitable cross-linkable polysiloxane compound is a vinyl-polysiloxane compound. The cross-linking polysiloxane may cross-link the cross-linkable polysiloxane by reaction of a plurality of Si—H groups with vinyl groups of the cross-linkable polysiloxane. The reaction may be platinum catalyzed.

The cross-linkable polysiloxane compound may comprise alkylsiloxane monomeric units, such as dialkylsiloxane monomeric units. Optionally, one or more of the alkyl groups of the monomers in the cross-linkable polysiloxane compound are independently selected from branched or unbranched C1 to C8 alkyl groups. The alkyl groups may be linear alkyl groups. For example, the alkyl groups may be independently selected from methyl, ethyl, propyl, butyl, pentyl, hexyl, heptyl and octyl groups. Optionally, the alkyl groups are independently selected from methyl and ethyl.

Diluents

The coating composition may further comprise one or more diluents. A diluent within the context of the disclosure may be an Si-containing solvent in which the cross-linkable polysiloxane compound and the non-cross-linkable polysiloxane compound are soluble. In order to ensure good solubility of the polysiloxane compounds nonpolar solvents can be used as diluents. In this case, the use of silicon-organic compounds having at most 6 silicon atoms as diluent has been found to be advantageous.

Exemplary diluents are:

- cyclic silicones, such as: octamethylcyclotetrasiloxane, decamethylcyclopentasiloxane, dodecamethylcyclohexasiloxane, tetramethylcyclotetrasiloxane, pentamethylcyclopentasiloxane,
- hexamethyldisiloxane (HMDSO),
- octamethyltrisiloxane,
- decamethyltetrasiloxane.

A mixture, especially comprising one or more of the abovementioned substances, may also be used as diluent.

Catalyst/Inhibitor

The coating composition may further comprise a catalyst for the cross-linking reaction of compounds of the multi-component system. A soluble platinum-containing catalyst, for example chloroplatinic acid, may be used. A Karstedt catalyst can be used.

In some embodiments, the coating composition comprises at least one inhibitor for preventing a spontaneous reaction of the composition. This facilitates handling of the composition up to application of the coating. The inhibitor can enter into reversible complex formation with the catalyst, with the result that a spontaneous cross-linking reaction of the composition is prevented.

Coating Compositions

In some embodiments, the coating composition comprises the high viscosity non-cross-linkable polysiloxane compound but not necessarily the low viscosity non-cross-linkable polysiloxane compound.

In some embodiments, the coating composition comprises the following components:

| |
|---|
| one or more cross-linkable polysiloxane compounds |
| one or more non-cross-linkable polysiloxane compounds |
| one or more cross-linking polysiloxane compounds |
| one or more catalysts |
| one or more diluents |

In some embodiments, the coating composition comprises the following components in percent by weight:

| | |
|---|---|
| one or more cross-linkable polysiloxane compounds | 3.0 to 20.0% |
| one or more non-cross-linkable polysiloxane compounds | 2.0 to 25.0% |
| one or more cross-linking polysiloxane compounds | 0.10 to 1.50% |
| one or more catalysts | 0.001 to 0.50% |
| one or more diluents | 55.0 to 92.0% |

In certain some embodiments, a weight ratio of cross-linking polysiloxane compound and cross-linkable polysiloxane compound is at least 0.01, at least 0.015 or at least 0.02. Optionally, this ratio should not exceed 0.5, 0.4, 0.2 or 0.1. In some embodiments, this ratio ranges from 0.01 to 0.5, from 0.015 to 0.4, or from 0.02 to 0.2. The weight ratio of cross-linking polysiloxane compound and cross-linkable polysiloxane compound are considered relevant for adjusting glass transition temperature as well as crystallization and melting properties of the coating.

Optionally, a ratio of a weight amount of cross-linkable polysiloxane compounds and a weight amount of non-cross-linkable polysiloxane compounds in the coating composition is less than 3.00, less than 2.50, less than 1.80, or less than 1.20. The ratio of a weight amount of cross-linkable polysiloxane compounds and a weight amount of non-cross-linkable polysiloxane compounds in the coating may be at least 0.40, at least 0.60, or at least 0.70. In some embodiments, this ratio ranges from 0.40 to 3.00, from 0.60 to 2.50, or from 0.70 to 1.80. The non-cross-linkable polysiloxane compounds may help achieve the desired elasticity and low temperature seal functionality that may be preferred for the containers and systems of the disclosure.

In some embodiments, the coating composition comprises the following components in percent by weight:

| | |
|---|---|
| one or more cross-linkable polysiloxane compounds | 3.0 to 20.0% |
| one or more non-cross-linkable polysiloxane compounds | 5.0 to 25.0% |
| one or more cross-linking polysiloxane compounds | 0.10 to 1.50% |
| one or more catalysts | up to 0.50%, e.g. 0.03 to 0.50% |
| one or more diluents | 55.0 to 92.0% |

In some embodiments, the coating composition comprises the following components in percent by weight:

| | |
|---|---|
| one or more cross-linkable polysiloxane compounds | 3.0 to 20.0% |
| one or more non-cross-linkable polysiloxane compounds | 8.0 to 25.0% |
| one or more cross-linking polysiloxane compounds | 0.10 to 1.50% |
| one or more catalysts | up to 0.50%, e.g. 0.03 to 0.50% |
| one or more diluents | 55.0 to 92.0% |

In some embodiments, the coating composition comprises the following components in percent by weight:

| | |
|---|---|
| one or more cross-linkable polysiloxane compounds | 7.5 to 15.0% |
| one or more non-cross-linkable polysiloxane compounds | 8.0 to 15.0% |
| one or more cross-linking polysiloxane compounds | 0.10 to 1.00% |
| one or more catalysts | up to 0.50%, e.g. 0.03 to 0.50% |
| one or more diluents | 55.0 to 82.0% |

In some embodiments, the coating composition comprises the following components in percent by weight:

| | |
|---|---|
| one or more cross-linkable polysiloxane compounds | 7.5 to 15.0% |
| one or more non-cross-linkable polysiloxane compounds | 2.0 to 8.0% |
| one or more cross-linking polysiloxane compounds | 0.10 to 1.00% |
| one or more catalysts | up to 0.50%, e.g. 0.03 to 0.50% |
| one or more diluents | 65.0 to 92.0% |

-continued

More Specific Coating Compositions

The cross-linked polysiloxane structural units, the low viscosity non-cross-linked polysiloxane structural units, and/or the high viscosity non-cross-linked polysiloxane structural units, may comprise or consist of dialkylsiloxane monomeric units, in particular dimethylsiloxane monomeric units.

In some embodiments, the cross-linkable polysiloxane is a vinyl-functionalized polysiloxane and/or the cross-linking polysiloxane compound is a polysiloxane having Si—H groups. One exemplary embodiment contains, as cross-linkable polysiloxane compound, a vinyl-functionalized polydimethylsiloxane and/or, as cross-linking polysiloxane compound, a copolymer having dimethylsiloxane and methylhydrosiloxane monomer units. In this case, it has been found to be advantageous to use a copolymer having the following structure (m is an integer of 1 or more and n is an integer of 1 or more; n may be 2 or more):

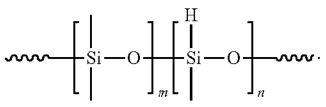

In a more specific embodiment, the coating composition comprises the following components:

| |
|---|
| a vinyl-functionalized polysiloxane as a cross-linkable polysiloxane compound |
| one or more non-cross-linkable polysiloxane compounds |
| a copolymer having dimethylsiloxane and methylhydrosiloxane monomer units as a cross-linking polysiloxane compound, |
| one or more Pt-containing catalysts |
| one or more diluents |

In a more specific embodiment, the coating composition comprises the following components in percent by weight:

| | |
|---|---|
| a vinyl-functionalized polysiloxane as a cross-linkable polysiloxane compound | 3.0 to 20.0% |
| one or more non-cross-linkable polysiloxane compounds | 2.0 to 25.0% |
| a copolymer having dimethylsiloxane and methylhydrosiloxane monomer units as a cross-linking polysiloxane compound, | 0.10 to 1.50% |
| one or more Pt-containing catalysts | up to 0.50%, e.g. 0.03 to 0.50% |
| one or more diluents | 55.0 to 92.0% |

In a more specific embodiment, the coating composition comprises the following components in percent by weight:

| | |
|---|---|
| a vinyl-functionalized polysiloxane as a cross-linkable polysiloxane compound | 3.0 to 20.0% |
| one or more non-cross-linkable polysiloxane compounds | 5.0 to 25.0% |
| a copolymer having dimethylsiloxane and methylhydrosiloxane monomer units as a cross-linking polysiloxane compound, | 0.10 to 1.50% |

-continued

| | |
|---|---|
| one or more Pt-containing catalysts | up to 0.50%, e.g. 0.03 to 0.50% |
| one or more diluents | 55.0 to 92.0% |

In a more specific embodiment, the coating composition comprises the following components in percent by weight:

| | |
|---|---|
| a vinyl-functionalized polysiloxane as a cross-linkable polysiloxane compound | 3.0 to 20.0% |
| one or more non-cross-linkable polysiloxane compounds | 8.0 to 25.0% |
| a copolymer having dimethylsiloxane and methylhydrosiloxane monomer units as a cross-linking polysiloxane compound, | 0.10 to 1.50% |
| one or more Pt-containing catalysts | up to 0.50%, e.g. 0.03 to 0.50% |
| one or more diluents | 55.0 to 92.0% |

In a more specific embodiment, the coating composition comprises the following components in percent by weight:

| | |
|---|---|
| a vinyl-functionalized polysiloxane as a cross-linkable polysiloxane compound | 7.5 to 15.0% |
| one or more non-cross-linkable polysiloxane compounds | 8.0 to 15.0% |
| a copolymer having dimethylsiloxane and methylhydrosiloxane monomer units as a cross-linking polysiloxane compound, | 0.10 to 1.00% |
| one or more Pt-containing catalysts | up to 0.50%, e.g. 0.03 to 0.50% |
| one or more diluents | 55.0 to 82.0% |

In a more specific embodiment, the coating composition comprises the following components in percent by weight:

| | |
|---|---|
| a vinyl-functionalized polysiloxane as a cross-linkable polysiloxane compound | 7.5 to 15.0% |
| one or more non-cross-linkable polysiloxane compounds | 2.0 to 8.0% |
| a copolymer having dimethylsiloxane and methylhydrosiloxane monomer units as a cross-linking polysiloxane compound, | 0.10 to 1.00% |
| one or more Pt-containing catalysts | up to 0.50%, e.g. 0.03 to 0.50% |
| one or more diluents | 65.0 to 92.0% |

Optionally, the cross-linkable polysiloxane structural units, the low viscosity non-cross-linkable polysiloxane structural units, and/or the high viscosity non-cross-linkable polysiloxane structural units, may comprise dialkylsiloxane monomeric units, in particular dimethylsiloxane monomeric units. The cross-linkable polysiloxane structural units may be cross-linkable via one or more polymerizable end groups.

Applying the coating composition may be done using conventional methods known in the art. In some embodiments, it includes coating, such as wiping, dip-coating, spray-coating (e.g. ultra sonic spray-coating), or curtain coating at least a part of the glass container with the coating composition. In an exemplary embodiment the coating composition can be applied in a wiping process.

The coating composition may be applied so as to obtain a desired coating thickness. The coating may have a thickness of 250 nm or more, 300 nm or more, or 400 nm or more, 450 nm or more, or 500 nm or more. Optionally, the coating may have a thickness of up to 1500 nm, up to 1250 nm or up to 1000 nm. A suitable coating thickness contributes to a tight seal at low temperatures. In some embodiments, coating thickness may be from 250 nm to 1500 nm, from 300 nm to 1250 nm, or from 400 nm to 1000 nm. Optionally, the indication of a coating thickness means that at least 90%, at least 95% or at least 99% of the coated area has a coating thickness in the indicated range. In some embodiments, the coating thickness is larger than 400 nm, particularly at least 450 nm or at least 500 nm. Exemplary ranges for the coating thickness are from >400 nm to 1500 nm, from 450 nm to 1250 nm, or from 500 nm to 1000 nm.

For a suitable sealing efficacy, it will often be sufficient to apply the coating composition on an area where a tight seal is desired, i.e. a contact area of inner surface and stopper, and/or of nestling surface and cap ("sealing area"). The coating composition may be applied on at least 25%, or at least 50% of the inner surface of the hollow cylindrical body (area by area). However, the coating may also have a beneficial effect on the gliding properties of a stopper on the inner surface of the hollow cylindrical body. Therefore, in some embodiments, the coating composition is applied on at least 65%, or at least 85% of the inner surface of said hollow cylindrical body (area by area). Optionally, the coating composition is applied on at least 90%, or essentially all of the inner surface of said hollow cylindrical body. Alternatively or additionally, the coating composition is applied on at least 65%, or at least 85% of the nestling surface of the glass container (area by area). Optionally, the coating composition is applied on at least 90%, or essentially all of the nestling surface.

The "curing temperature" as used herein relates to the effective temperature of the coating in order for it to cure. The curing temperature is not the nominal temperature in an oven, which may be higher than the effective temperature of the coating during curing. Curing may include polymerizing polymerizable groups, such as polymerizable end groups. The coating may be cured at a curing temperature below 150° C., below 125° C., or below 110° C. Too high a curing temperature may yield a coating having a low elasticity. On the other hand, too low a curing temperature may not be sufficient for a good sealing performance either. Thus, in some embodiments, the curing temperature may be 50° C. or more, 60° C. or more, or 70° C. or more. Notably, the curing temperature is the effective temperature at the coating composition. It must not be confused with a nominal oven temperature. The oven temperature may be much higher than the curing temperature because there may be insufficient time for the whole oven to equilibrate at the nominal temperature during curing time. Optionally, the coating may be cured at 50° C. to below 150° C., from 60° C. to below 125° C., or from 70° C. to below 110° C. An exemplary range is from 50° C. to <110° C. In some embodiments, curing does not involve the application of a plasma.

The curing temperature is held for a time sufficient to achieve the desired degree of curing. Optionally, the curing temperature may be held for at least 10 seconds, 30 seconds, at least 45 seconds or at least 60 seconds. In some embodiments, the curing temperature is held for up to 3000 seconds, up to 300 seconds, or up to 180 seconds.

The disclosure further relates to a use of a coating composition as disclosed hereinabove for preparing a coating on a surface of a glass container, wherein the coated glass container is subsequently stored at a low temperature within a range of −60° C. or below, particularly at about −80° C., for at least 150 h. Optionally, the coated glass container is stored for at least 600 hours, or at least 1200 hours. In some embodiments, the glass container is stored for at least 1500 hours, or at least 6000 hours. Depending on the shelf-life necessary for a pharmaceutical product, the glass container is stored for up to 12000 hours, up to 10000 hours, or up to 8000 hours. Optionally, the glass container is a glass container provided according to the disclosure.

The coating as described in detail herein is obtainable by the method described previously.

Specific Exemplary Embodiments

The following embodiments are a more specific disclosure that are expected to perform particularly well.

In an exemplary embodiment, the glass container for pharmaceutical compositions of the disclosure, comprises a hollow cylindrical body having at least one open end wherein the glass container comprises a coating on at least 90% of the inner surface of the hollow cylindrical body, the coating having a glass transition temperature at −60° C. or below, wherein the coating has a thickness of at least 450 nm and comprises cross-linked polysiloxane structural units and non-cross-linked polysiloxane structural units, wherein optionally a ratio of a total inner diameter variation along the coated part of the inner surface of the hollow cylindrical body relative to a thickness of the coating is less than 250, and wherein an average linear coefficient of thermal expansion of the glass measured in the range of 20° C. to 300° C. (CTE) is less than $5.2*10^{-6}$ $K^{-1}$.

In an exemplary embodiment, the glass container for pharmaceutical compositions of the disclosure, comprises a hollow cylindrical body having at least one open end wherein the glass container comprises a coating on at least 90% of the inner surface of the hollow cylindrical body, the coating having a hardness such that a hardness value measured on the coated surface according to DIN EN ISO 14577-1:2015-11 and DIN EN ISO 14577-4:2017-04 differs from the hardness value measured on an uncoated surface of the glass container by less than 10%, wherein the coating has a thickness of at least 450 nm and comprises cross-linked polysiloxane structural units and non-cross-linked polysiloxane structural units, wherein optionally a ratio of a total inner diameter variation along the coated part of the inner surface of the hollow cylindrical body relative to a thickness of the coating is less than 250, and wherein an average linear coefficient of thermal expansion of the glass measured in the range of 20° C. to 300° C. (CTE) is less than $5.2*10^{-6}$ $K^{-1}$.

In an exemplary embodiment, the glass container for pharmaceutical compositions of the disclosure, comprises a hollow cylindrical body having at least one open end wherein the glass container comprises a coating on at least 90% of the inner surface of the hollow cylindrical body, the container having a standard ethanol-modified dye-ingress tested container closure integrity of at least 150 hours at −80° C., wherein the coating has a thickness of at least 450 nm and comprises cross-linked polysiloxane structural units and non-cross-linked polysiloxane structural units, wherein optionally a ratio of a total inner diameter variation along the coated part of the inner surface of the hollow cylindrical body relative to a thickness of the coating is less than 250, and wherein an average linear coefficient of thermal expansion of the glass measured in the range of 20° C. to 300° C. (CTE) is less than $5.2*10^{-6}$ $K^{-1}$.

In an exemplary embodiment, the glass container for pharmaceutical compositions of the disclosure, comprises a hollow cylindrical body having at least one open end wherein the glass container comprises a coating on at least 90% of the inner surface of the hollow cylindrical body, wherein the coating was cured at less than 150° C., particularly at from 50 to 110° C., wherein the coating has a thickness of at least 450 nm and comprises cross-linked polysiloxane structural units and non-cross-linked polysiloxane structural units, wherein optionally a ratio of a total inner diameter variation along the coated part of the inner surface of the hollow cylindrical body relative to a thickness of the coating is less than 250, and wherein an average linear coefficient of thermal expansion of the glass measured in the range of 20° C. to 300° C. (CTE) is less than $5.2*10^{-6}$ $K^{-1}$.

In an exemplary embodiment, the glass container for pharmaceutical compositions of the disclosure, comprises a hollow cylindrical body having at least one open end wherein the glass container comprises a coating on at least 90% of the inner surface of the hollow cylindrical body, wherein the coating has a crystallization temperature range and a melting temperature range determined using differential scanning calorimetry at temperature change rate of 10° C./min, wherein the crystallization temperature range and the melting temperature range overlap at a temperature of from −75° C. to −100° C., particularly at −80° C., wherein the coating has a thickness of at least 450 nm and comprises cross-linked polysiloxane structural units and non-cross-linked polysiloxane structural units, wherein optionally a ratio of a total inner diameter variation along the coated part of the inner surface of the hollow cylindrical body relative to a thickness of the coating is less than 250, and wherein an average linear coefficient of thermal expansion of the glass measured in the range of 20° C. to 300° C. (CTE) is less than $5.2*10^{-6}$ $K^{-1}$.

In an exemplary embodiment, the glass container for pharmaceutical compositions of the disclosure, comprises a hollow cylindrical body having at least one open end wherein at least a part of a surface of the glass container comprises a coating, the coating comprising one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00, and optionally at least 0.40, wherein the coating has a thickness of at least 450 nm, wherein optionally a ratio of a total inner diameter variation along the coated part of the inner surface of the hollow cylindrical body relative to a thickness of the coating is less than 250, and wherein an average linear coefficient of thermal expansion of the glass measured in the range of 20° C. to 300° C. (CTE) is less than $5.2*10^{-6}$ $K^{-1}$.

In an exemplary embodiment, the glass container for pharmaceutical compositions of the disclosure, comprises a hollow cylindrical body having at least one open end wherein at least a part of a sealing surface of the glass container comprises a coating, the coating having a glass transition temperature at −60° C. or below, wherein the coating has a thickness of at least 450 nm and comprises cross-linked polysiloxane structural units and non-cross-linked polysiloxane structural units, wherein a ratio of a weight amount of cross-linked polysiloxane structural units and a weight amount of non-cross-linked polysiloxane structural units in the coating is at least 0.70 and less than 3.00, the costing comprising high viscosity non-cross-linked polysiloxane structural units having a viscosity of more than 10,000 cSt, wherein optionally the coating cured at 150° C. or below, particularly at from 50° C. to <110° C.

In an exemplary embodiment, the glass container for pharmaceutical compositions of the disclosure, comprises a hollow cylindrical body having at least one open end wherein at least a part of a sealing surface of the glass container comprises a coating, the coating having a hardness such that a hardness value measured on the coated surface according to DIN EN ISO 14577-1:2015-11 and DIN EN ISO 14577-4:2017-04 differs from the hardness value measured on an uncoated surface of the glass container by less than 10%, wherein the coating has a thickness of at least 450 nm and comprises cross-linked polysiloxane structural units and non-cross-linked polysiloxane structural units, wherein a ratio of a weight amount of cross-linked polysiloxane structural units and a weight amount of non-cross-linked polysiloxane structural units in the coating is at least 0.70 and less than 3.00, the costing comprising high viscosity non-cross-linked polysiloxane structural units having a viscosity of more than 10,000 cSt, wherein optionally the coating cured at 150° C. or below, particularly at from 50° C. to <110° C.

In an exemplary embodiment, the glass container for pharmaceutical compositions of the disclosure, comprises a hollow cylindrical body having at least one open end wherein at least a part of a sealing surface of the glass container comprises a coating, the container having a standard ethanol-modified dye-ingress tested container closure integrity of at least 150 hours at −80° C., wherein the coating has a thickness of at least 450 nm and comprises cross-linked polysiloxane structural units and non-cross-linked polysiloxane structural units, wherein a ratio of a weight amount of cross-linked polysiloxane structural units and a weight amount of non-cross-linked polysiloxane structural units in the coating is at least 0.70 and less than 3.00, the costing comprising high viscosity non-cross-linked polysiloxane structural units having a viscosity of more than 10,000 cSt, wherein optionally the coating cured at 150° C. or below, particularly at from 50° C. to <110° C.

In an exemplary embodiment, the glass container for pharmaceutical compositions of the disclosure, comprises a hollow cylindrical body having at least one open end wherein at least a part of a sealing surface of the glass container comprises a coating, wherein the coating has a crystallization temperature range and a melting temperature range determined using differential scanning calorimetry at temperature change rate of 10° C./min, wherein the crystallization temperature range and the melting temperature range overlap at a temperature of from −75° C. to −100° C., particularly at −80° C., wherein the coating has a thickness of at least 450 nm and comprises cross-linked polysiloxane structural units and non-cross-linked polysiloxane structural units, wherein a ratio of a weight amount of cross-linked polysiloxane structural units and a weight amount of non-cross-linked polysiloxane structural units in the coating is at least 0.70 and less than 3.00, the costing comprising high viscosity non-cross-linked polysiloxane structural units having a viscosity of more than 10,000 cSt, wherein optionally the coating cured at 150° C. or below, particularly at from 50° C. to <110° C.

In an exemplary embodiment, the glass container for pharmaceutical compositions comprises a hollow cylindrical body having at least one open end wherein at least a part of a surface of the glass container comprises a coating, the coating having a glass transition temperature at −60° C. or below; the coating having a hardness such that a hardness value measured on the coated surface according to DIN EN ISO 14577-1:2015-11 and DIN EN ISO 14577-4:2017-04 differs from the hardness value measured on an uncoated surface of the glass container by less than 10%; the container having a standard ethanol-modified dye-ingress tested container closure integrity of at least 150 hours at −80° C.; wherein a thickness of the coating is at least 400 nm and the coating was cured at less than 150° C., particularly at from 50 to 110° C.; wherein the coating has a crystallization temperature range and a melting temperature range determined using differential scanning calorimetry at temperature change rate of 10° C./min, wherein the crystallization temperature range and the melting temperature range overlap at a temperature of from −75° C. to −100° C., particularly at −80° C.; wherein the coating comprises one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00, and optionally at least 0.40.

Optionally, the coating of the specific embodiments is obtainable by curing the following coating compositions at curing temperatures below 150° C., optionally at from 50° C. to <110° C., for less than 180 seconds:

| | |
|---|---|
| one or more cross-linkable polysiloxane compounds | 3.0 to 20.0% |
| one or more non-cross-linkable polysiloxane compounds | 2.0 to 25.0% |
| one or more cross-linking polysiloxane compounds | 0.10 to 1.50% |
| one or more catalysts | 0.03 to 0.50% |
| one or more diluents | 55.0 to 92.0% |

Optionally, the coating of the specific embodiments is obtainable by curing the following coating compositions at curing temperatures below 150° C., optionally at from 50° C. to <110° C., for less than 180 seconds:

| | |
|---|---|
| a vinyl-functionalized polysiloxane as a cross-linkable polysiloxane compound | 3.0 to 20.0% |
| one or more non-cross-linkable polysiloxane compounds | 2.0 to 25.0% |
| a copolymer having dimethylsiloxane and methylhydrosiloxane monomer units as a cross-linking polysiloxane compound, | 0.10 to 1.50% |
| one or more Pt-containing catalysts | 0.03 to 0.50% |
| one or more diluents | 55.0 to 92.0% |

In an exemplary embodiment, the system provided according to the disclosure comprises the glass container—particularly a glass container according to one of the specific embodiments—, a stopper and/or a cap wherein the system has a specific ethanol-modified dye-ingress tested container closure integrity of at least 150 hours at −80° C.

In an exemplary embodiment, the system provided according to the disclosure comprises the glass container—particularly a glass container according to one of the specific embodiments—and a stopper, wherein a ratio of (I) a difference of an average linear coefficient of thermal expansion of the material of the stopper and of the glass container, and (II) a thickness of the coating is less than 0.5 ppm/nm, wherein the system has a specific ethanol-modified dye-ingress tested container closure integrity of at least 150 hours at −80° C.

Ethanol-Modified Dye-Ingress Tested Container Closure Integrity

The ethanol-modified dye-ingress container closure integrity test will now be explained with reference to FIG. 2.

Figure 2:
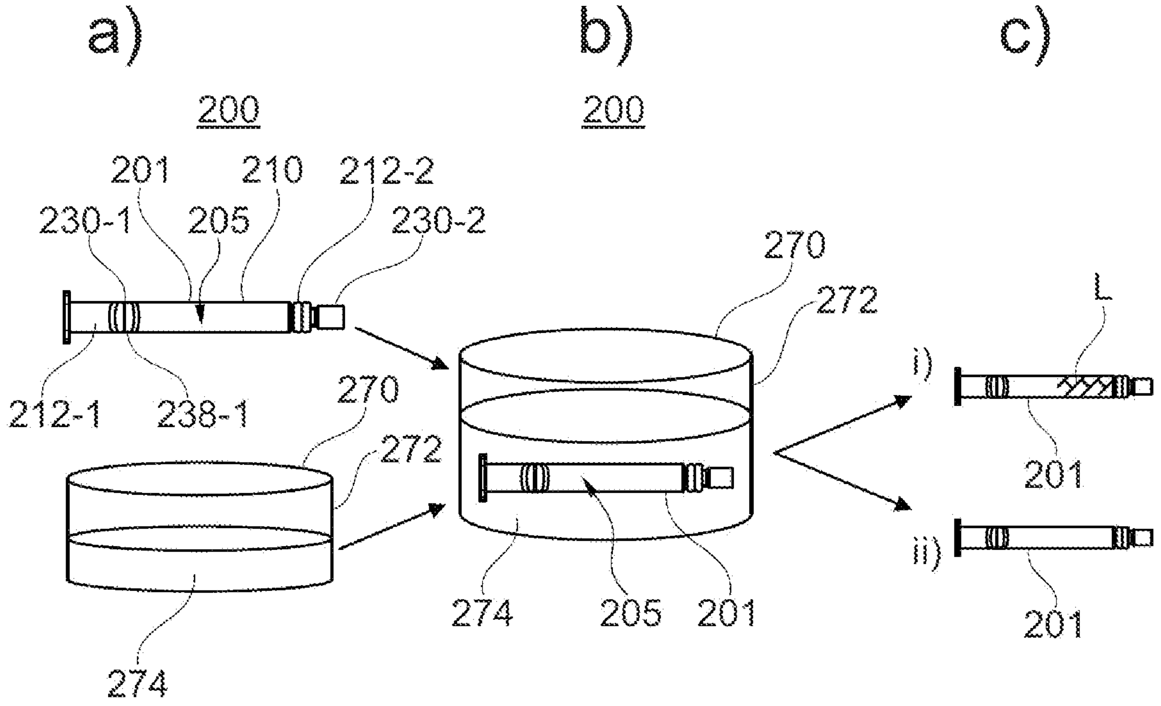
FIG. 2 illustrates an ethanol-modified dye ingress container closure integrity test.

FIG. 2 shows schematically and exemplarily a setup 200 for determining the ethanol-modified dye-ingress closure integrity of a container, at different stages. The setup 200 comprises an immersion arrangement 270 and a container 201 for use with the immersion arrangement 270.

The container 201 is a glass container, e.g. a glass container according to the disclosure, comprising a hollow cylindrical body 210 having two openings, open end A 212-1 and open end B 212-2 arranged on different sides of the glass container. Each of the openings 212-1, 212-2 is sealed by means of a closure device, namely a stopper 230-1, or a cap 230-2, respectively. A container volume 205 of glass container 201 is defined by a portion of the inner wall of the container body 210 and an inner surface of each of the closure devices 230-1, 230-2.

In case of the standard ethanol-modified dye-ingress container closure integrity test the stopper is a Datwyler FM257, and the cap is a West W7025 in a Luer Lock SRC rigid cap (as disclosed for example in EP 3 569 272 A1). In case of the specific ethanol-modified dye-ingress container closure integrity test the stopper is the stopper of the system in question, and the cap, if any, is the cap of the system in question.

In the shown example, glass container 201 is a medical syringe or a pharmaceutical cartridge. The test can be performed on other types of glass containers in the same way. Open end A 212-1 at a proximal end of the container is sealed by a closure device 230-1 in the form of a stopper. Open end B 212-2 at a distal end of the container is arranged in a tip of the container 201, and it is sealed by a closure device 230-2 in the form of a cap.

For the purpose of this test, container volume 205 is filled with air at 1 atm pressure and sealed using the appropriate closure device. The immersion arrangement 270 comprises an immersion device 272. In the immersion device 272, a reservoir is provided which contains an ambient liquid 274. The immersion device 272 further includes conditioning facilities for adjusting and holding a temperature of the ambient liquid 274 in accordance with the testing protocol.

At the beginning of the test, the container volume 205 is entirely filled with air. In addition, the container 201, including the gas inside the container volume 205, is conditioned at 20° C. The ambient liquid 274 is conditioned at −80° C. The ambient liquid 274 is ethanol with a fluorescein dye (fluorescein disodium at 1 g/l).

As shown in FIG. 2, stage b), in a next step the container 201 is entirely submerged in the ambient liquid 274. Whilst submerged in the ambient liquid 274, the container 201 will gradually adopt a temperature at least close to −80° C. The absolute heat capacity of the container 201 is small relative to the absolute heat capacity of the ambient liquid 274. In this way, temperature variations of the ambient liquid 274 due to the immersion of the container 201 are minimal. When the temperature of the container 201 sinks due to the immersion in the ambient liquid 274, a temperature of the gas in the container volume 205 will sink correspondingly. Hence, the gas in the container volume 205 will contract, and a gas pressure within the container volume 205 will drop below the ambient pressure.

The container 201 remains in the ambient liquid 274 during at least a predetermined period of time, starting from the moment the container is fully immersed in the ambient liquid 274, and ending when the container 201 is taken out of the ambient liquid 274 and allowed to equilibrate at ambient temperature (optionally 20° C.).

FIG. 2, stage c) shows schematically two possible outcomes once the container 201 has been removed from the ambient liquid 274. In the upper example, i), an amount L of the ambient liquid is detected inside the container volume 205. In particular, an amount L of ambient liquid 274 has transgressed a boundary of the container 201 in the region of the tip. This indicates the presence of a leak in the region of the tip of the container 201 under the conditions applied in previous stages a) and b). In the lower example, ii), no parts of the ambient liquid 274 are detected inside the container 201. This indicates tightness of the container 201 under the conditions applied in previous stages a) and b).

A container is considered to have passed the test, if no ambient liquid is detected inside the container, which includes that no ambient liquid is found between annular protrusions of the stopper, or otherwise between closure device and coated surface.

EXAMPLES

Exemplary Container

Referring now to FIG. 1, FIG. 1 illustrates a glass container 1 in an exemplary embodiment of a syringe 3 for administering pharmaceuticals or cosmetics. The syringe 3 is made of glass and comprises a glass wall 5 surrounding a lumen. The container comprises a hollow cylindrical body 7 and a nestling surface 18 onto which, for example, an injection needle or a cap can be placed. A stopper 12 is inserted in the cylindrical portion and is slidable in the axial direction by pressure on a push rod 13. The cylindrical portion has a flange 15 for handling purposes at the end of the introduction opening for the stopper 12, i.e. open end A.

The glass container 1 is provided with a coating 10 on an inner surface, here specifically on the inner surface of the hollow cylindrical body 7. In this example, the coating 10 covers that region of the inner surface of the hollow cylindrical body 7 over which the stopper 12 can slide when the syringe is being emptied or used for drawing up.

Coating Compositions

Sets of glass syringes (Schott syriQ 1.0 ml long, Fiolax clear) were coated with coating compositions. The following coating compositions were used.

| Component | Function | Composition A | Composition B |
|---|---|---|---|
| vinyl-terminated polydimethylsiloxane | cross-linkable polysiloxane structural units | 9.59 wt. % | 10.59 wt. % |
| methylhydrosiloxane/dimethylsiloxane copolymer | crosslinking polysiloxane | 0.24 wt. % | 0.26 wt. % |
| Pt complex | catalyst | 0.13 wt. % | 0.15 wt. % |
| silicone oil 20,000 cSt | non-cross-linkable polysiloxane structural units | 3.84 wt. % | 4.24 wt. % |
| silicone oil 1,000 cSt. | non-cross-linkable polysiloxane structural units | 9.46 wt. % | 0.00 wt. % |
| HMDSO | diluent | ad 100 wt. % | ad 100 wt. % |

Glass syringes were coated using spray coating. Afterwards, the coating was cured at elevated temperatures in an oven. During curing, the diluent evaporated and the cross-linkable polysiloxane formed a network in a hydrosilylation reaction.

Coating Thickness

Coatings of various thicknesses were applied to glass syringes and cured at 70° C. curing temperature for 60 seconds. The coating was applied to the inner surface of the syringe barrel and the nestling surface at the tip of the syringe. Then, both open ends were closed. Open end A was closed using Datwyler FM257 stopper, open end B was closed using a West W7025 tip cap. The samples were tested in an ethanol-modified dye ingress container closure integrity test as described previously. Samples F and G are a state-of-the art silicone oils (DuPont Liveo® D360) with a viscosity of 1,000 cSt and 12,500 cSt, respectively.

| | Sample A | Sample B | Sample C | Sample D | Sample E | Sample F | Sample G |
|---|---|---|---|---|---|---|---|
| coating thickness | 1000 nm | 800 nm | 500 nm | 400 nm | 200 nm | 800 nm | 800 nm |
| CCI test | passed | passed | passed | failed | failed | failed | failed |

Curing Temperature

Coatings of compositions A (samples H and I) and B (samples J and K) were cured at different curing temperatures for 60 seconds and tested for standardized break loose and glide force. Coating thickness was 800 nm.

| | Sample H | Sample I | Sample J | Sample K |
|---|---|---|---|---|
| Curing temperature | 40° C. | 70° C. | 40° C. | 70° C. |
| BLF | 7.4 ± 0.29N | 7.6 ± 0.21N | 7.4 ± 0.32N | 4.9 ± 0.41N |
| GF | 1.0 ± 0.08N | 1.0 ± 0.03N | 3.5 ± 0.79N | 2.8 ± 0.33N |

DSC Measurements

Differential scanning calorimetry was performed on samples of the coatings after curing and scraping of the cured coating from the glass (in accordance with DIN 51007:2019). The experiments were run on a DSC Q2000 (TA Instruments) at a temperature ramp of 10° C./min in a range of −120° C. to −60° C. Measurements were confirmed by two repetitions.

Figure 3:
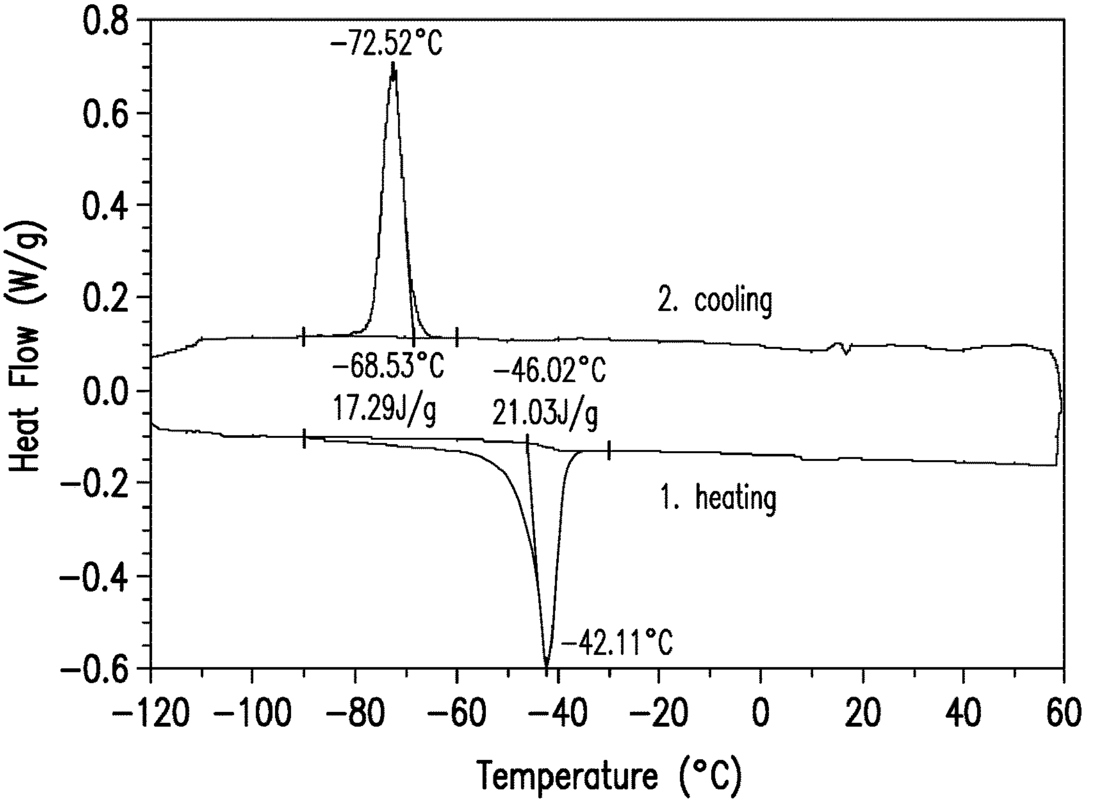
FIG. 3 illustrates a DSC diagram of a coating provided according to the disclosure.

The results for composition A are shown in FIG. 3. The exothermal crystallization peak is at −72.52° C. It extends from −90 to −60° C. The endothermal melting peak is at −42.11° C. and extends from −90 to −30° C. There is an overlap between the two peaks in a temperature range that includes −80° C.

Figure 4:
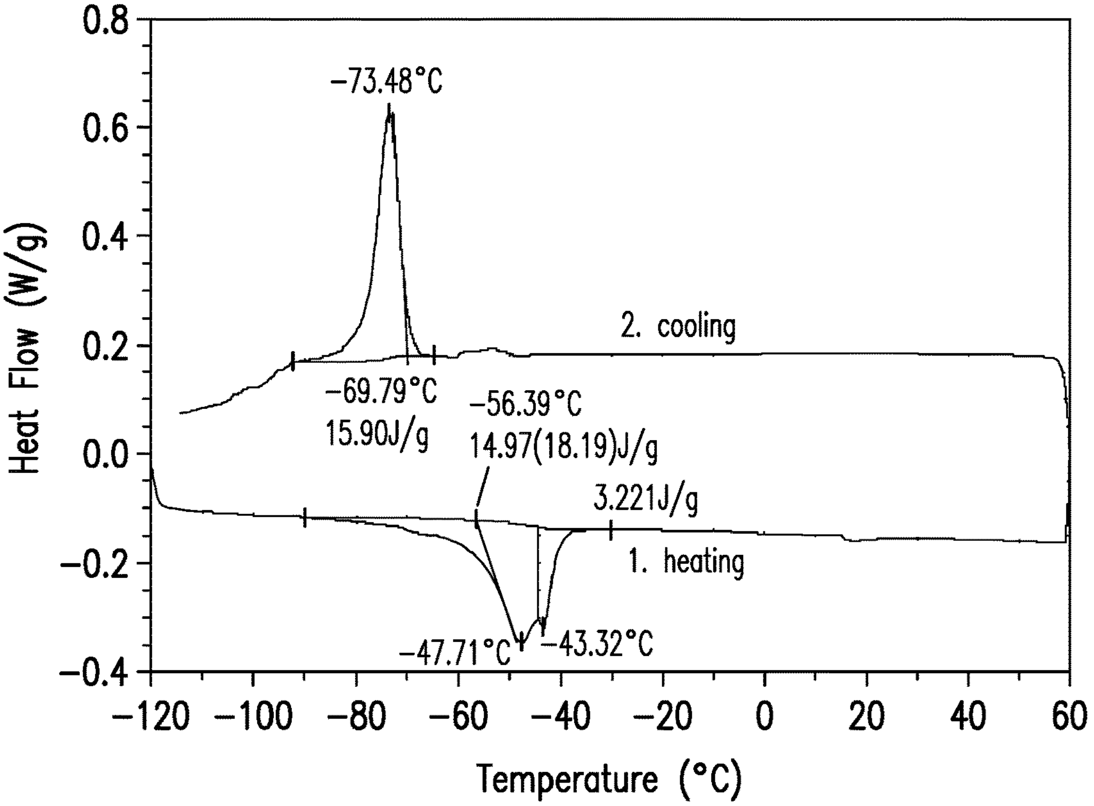
FIG. 4 illustrates a DSC diagram of a coating provided according to the disclosure.

The results for composition B are shown in FIG. 4. The exothermal crystallization peak is at −73.48° C. It extends from −93 to −65° C. An endothermal melting peak extends from − 90 to −50° C. and beyond. There is an overlap between the two peaks in a temperature range that includes −80° C.

Figure 5:
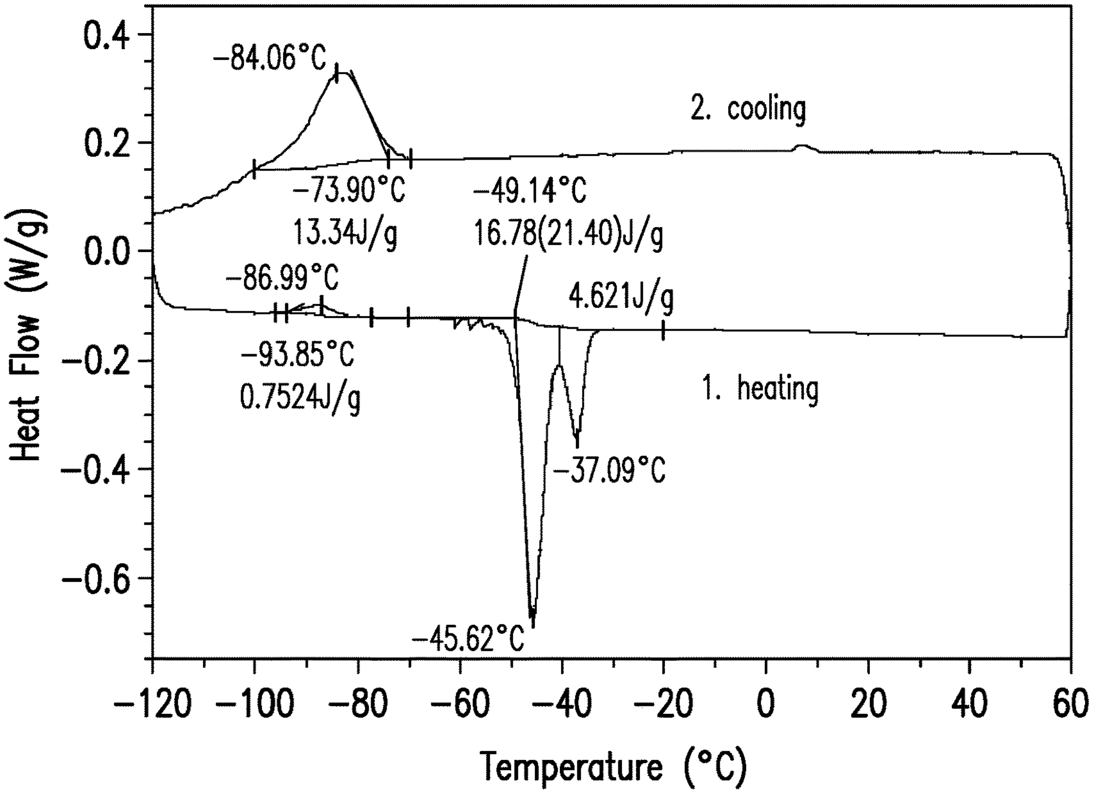
FIG. 5 illustrates a DSC diagram of a prior art coating.

The results for a state-of-the art silicone oil with a viscosity of 1,000 cSt are shown in FIG. 5. The exothermal crystallization peak is at −84.06° C. It extends from −100 to −70° C. An endothermal melting peak extends from −70 to −50° C. and beyond. There is no overlap between the two peaks in a temperature range that includes −80° C.

Figure 6:
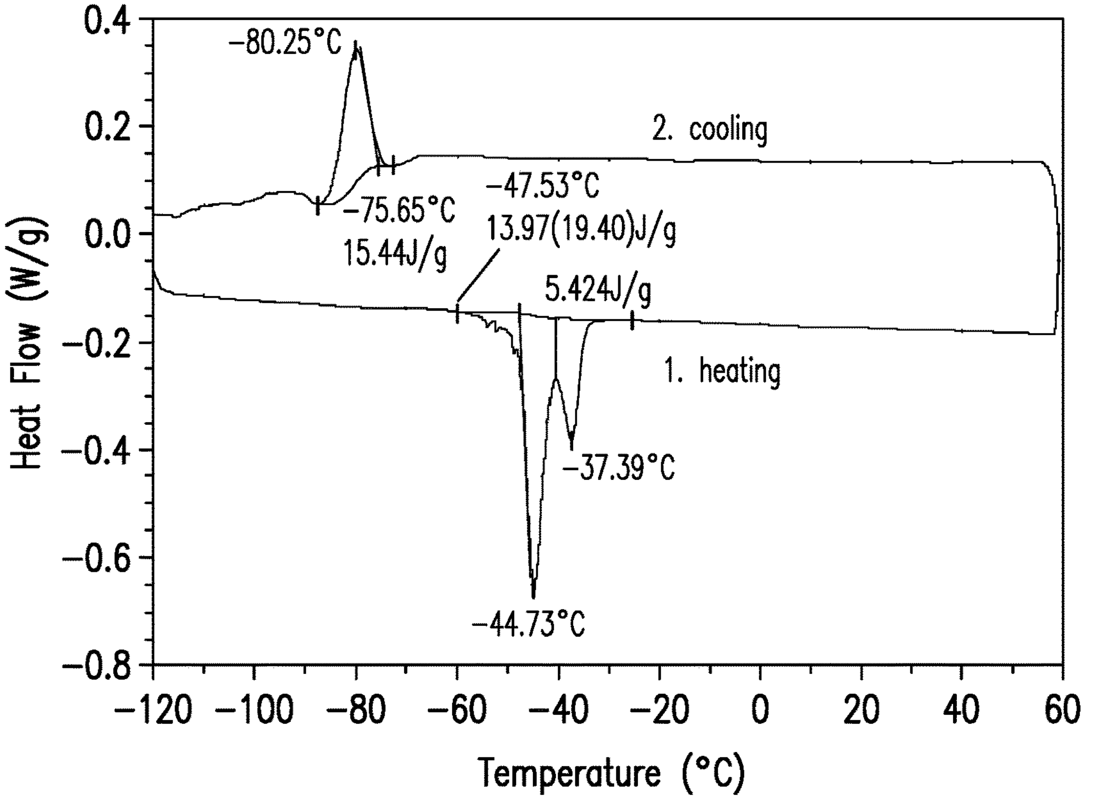
FIG. 6 illustrates a DSC diagram of a prior art coating.

The results for a state-of-the art silicone oil with a viscosity of 12,500 cSt are shown in FIG. 6. The exothermal crystallization peak is at −80.25° C. It extends from −88 to −73° C. An endothermal melting peak extends from −60 to −40° C. and beyond. There is no overlap between the two peaks in a temperature range that includes −80° C.

Glass Transition Temperatures

Figure 7:
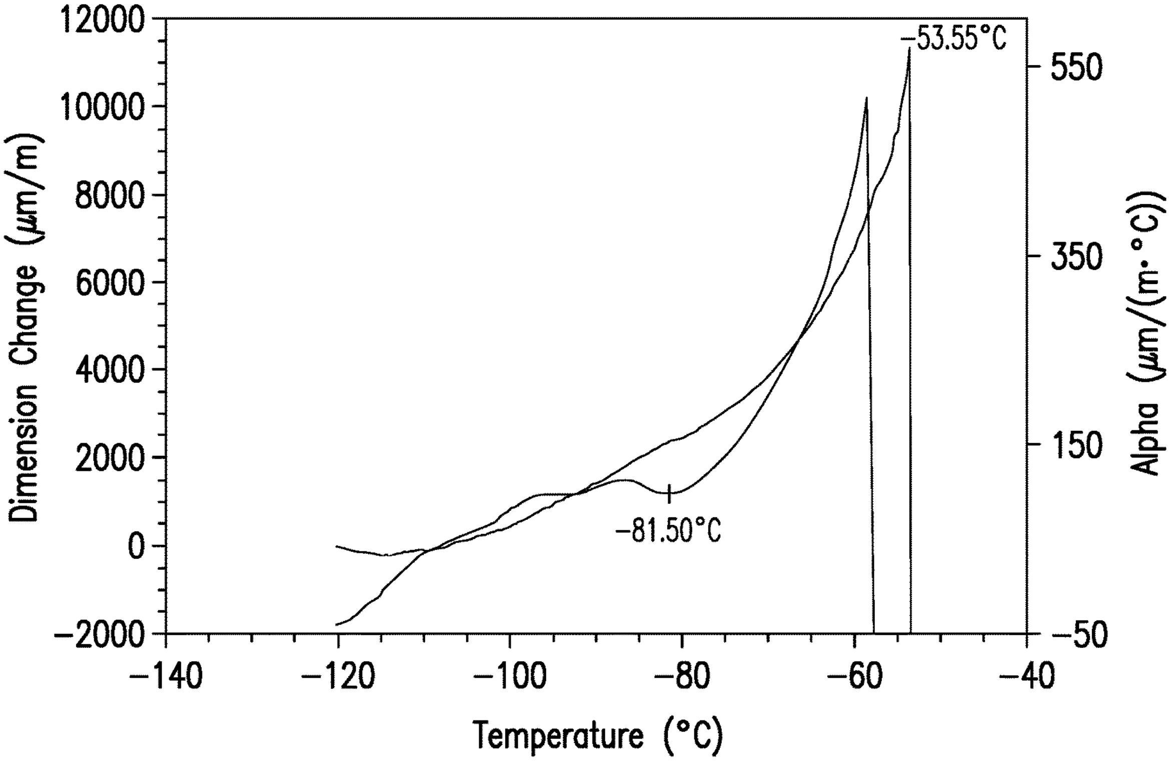
FIG. 7 illustrates a diagram of a TMA analysis on a coating provided according to the disclosure.
Figure 8:
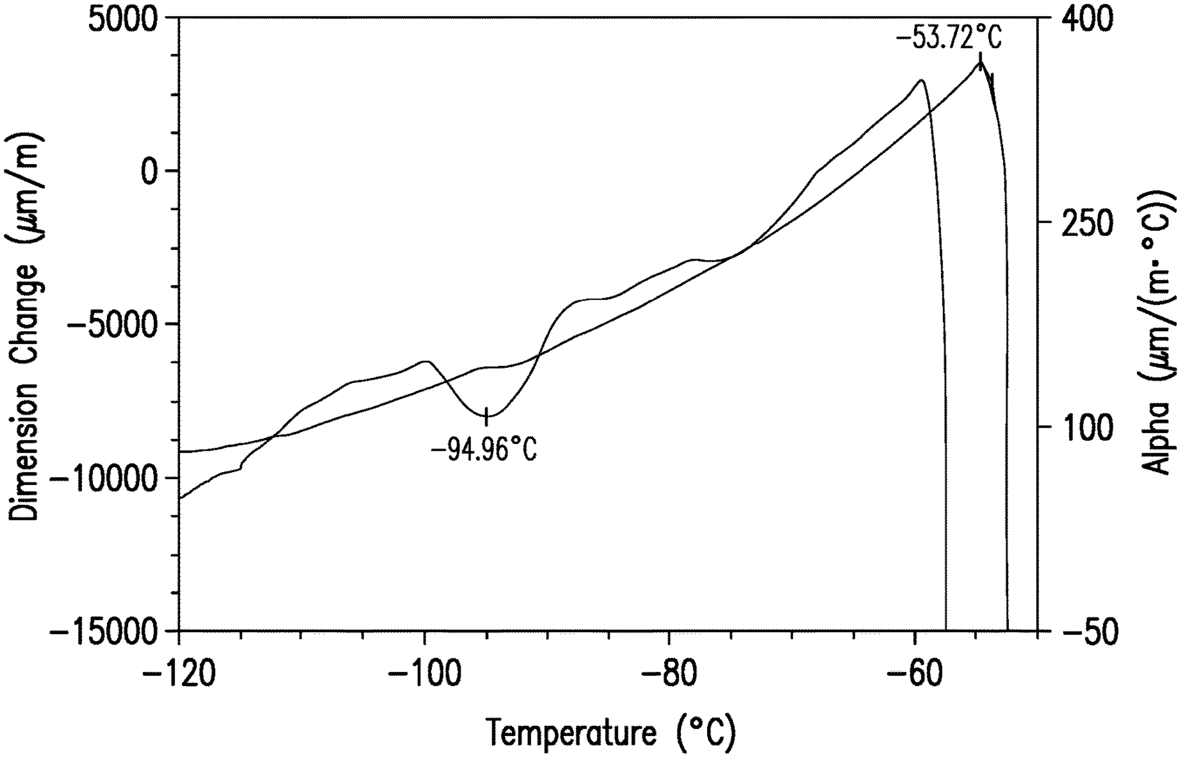
FIG. 8 illustrates a diagram of a TMA analysis on a coating provided according to the disclosure.

To determine the glass transition temperatures, thermomechanical analysis was performed in expansion mode, using a Q400 thermomechanical analyzer by TA Instruments. The sample was prepared in the same way as for the DSC measurements. Composition A had a glass transition temperature of −81.50° C., and composition B of −94.96° C. The results are shown in FIGS. 7 and 8, respectively.

Items

The following items describe exemplary embodiments provided according to the disclosure. The items and their features are combinable with all the other features and embodiments described in the disclosure.

According to item 1, the disclosure relates to a glass container for pharmaceutical compositions, comprising a hollow cylindrical body having at least one open end, wherein at least a part of a surface of the glass container comprises a coating, the coating having a crystallization temperature range and a melting temperature range determined using differential scanning calorimetry at a temperature change rate of 10° C./min, wherein the crystallization temperature range and the melting temperature range overlap at a temperature of from −75° C. to −100° C., particularly at −80° C.

2. Glass container according to item 1, wherein the coating has a thickness of 250 nm or more, 300 nm or more, or 400 nm or more, 450 nm or more, or 500 nm or more.

3. Glass container according to item 1 or 2, wherein the coating has a glass transition temperature at −60° C. or below, optionally at −70° C. or below, such as at −75° C. or below, or at −80° C. or below.

4. Glass container according to one or more of the preceding items, wherein the coating has a hardness such that a hardness value measured on the coated surface according to DIN EN ISO 14577-1:2015-11 and DIN EN ISO 14577-4:2017-04 differs from the hardness value measured on an uncoated surface of the glass container by less than 10%, less than 7.0%, less than 5.0% or less than 3.0%, and/or by at least 0.1%, at least 0.5%, at least 1.0% or at least 2.0%.

5. Glass container according to one or more of the preceding items, wherein the container has a standard ethanol-modified dye-ingress tested container closure integrity of at least 150 hours at −80° C., or at least 600 hours at −80° C.

6. Glass container according to one or more of the preceding items, wherein the coating was cured at a temperature of less than 150° C., or less than 110° C., and/or was cured at a temperature of 50° C. or more, or 60° C. or more.

7. Glass container according to one or more of the preceding items, wherein the hollow cylindrical body has an open end A, open end A being configured for receiving a stopper that is slidable relative to the hollow cylindrical body from open end A; wherein at least a part of an inner surface of the hollow cylindrical body has the coating.

8. Glass container according to one or more of the preceding items, wherein the container has an open end B, open end B being configured for being closed by a cap, open end B having a nestling surface, configured to fit snugly against a surface of a cap, wherein at least a part of the nestling surface comprises the coating.

9. Glass container according to one or more of the preceding items, wherein the coating comprises one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00, and optionally at least 0.40.

10. Glass container according to one or more of the preceding items, wherein the coating comprises at least two non-cross-linked polysiloxane structural units that differ in their viscosities.

11. Glass container according to one or more of the preceding items, wherein at least a part of an inner surface of the hollow cylindrical body has the coating, wherein a ratio of a total inner diameter variation along the coated part of the inner surface relative to a thickness of the coating is less than 500.

12. Glass container according to one or more of the preceding items, wherein the container is a syringe, or a cartridge, such as a pre-filled syringe or cartridge.

13. Glass container according to one or more of the preceding items, wherein the coating has a thickness up to 1500 nm, up to 1250 nm or up to 1000 nm.

14. Glass container according to one or more of the preceding items, wherein the coating has a thickness of from >400 nm to 1500 nm, from 450 nm to 1250 nm, or from 500 nm to 1000 nm.

15. Glass container according to one or more of the preceding items, wherein the coating comprises polyalkylsiloxane structural units, such as polydialkylsiloxane structural units.

16. Glass container according to item 15, wherein one or more of the alkyl groups in the polyalkylsiloxane or polydialkylsiloxane are independently selected from branched or unbranched C1 to C8 alkyl groups.

17. Glass container according to one or more of the preceding items, wherein a ratio of a weight amount of cross-linked polysiloxane structural units and a weight amount of non-cross-linked polysiloxane structural units in the coating is less than 3.00, less than 2.50, less than 1.80, or less than 1.20.

18. Glass container according to one or more of the preceding items, wherein a ratio of a weight amount of cross-linked polysiloxane structural units and a weight amount of non-cross-linked polysiloxane structural units in the coating is at least 0.40, at least 0.60, or at least 0.70.

19. Glass container according to one or more of the preceding items, wherein a ratio of a weight amount of cross-linked polysiloxane structural units and a weight amount of non-cross-linked polysiloxane structural units in the coating is from 0.40 to 3.00, from 0.60 to 2.50, or from 0.70 to 1.80.

20. Glass container according to one or more of the preceding items, wherein the coating comprises high viscosity non-cross-linked polysiloxane structural units having a viscosity of more than 10,000 cSt, and/or low viscosity non-cross-linked polysiloxane structural units having a viscosity of 10,000 cSt, or less.

21. Glass container according to item 20, wherein the high viscosity non-cross-linked polysiloxane structural units have a viscosity of at least 15,000 cSt, and/or the low viscosity non-cross-linked polysiloxane structural units have a viscosity of 5,000 cSt, or less.

22. Glass container according to item 20 or 21, wherein a ratio of a weight amount of the low viscosity non-cross-linked polysiloxane structural units and the high viscosity non-cross-linked polysiloxane structural units ($mass_{high}$:$mass_{low}$) is at least 0.10, at least 0.50, at least 1.00, at least 1.50 or at least 2.00.

23. Glass container according to item 20, 21 or 22, wherein a ratio of a weight amount of the low viscosity non-cross-linked polysiloxane structural units and the high viscosity non-cross-linked polysiloxane structural units ($mass_{high}$:$mass_{low}$) is up to 5.00, up to 4.00 or up to 3.00.

24. Glass container according to one or more of items 20 to 23, wherein a ratio of a weight amount of the low viscosity non-cross-linked polysiloxane structural units and the high viscosity non-cross-linked polysiloxane structural units ($mass_{high}$:$mass_{low}$) is from 0.10 to 5.00, from 0.50 to 4.00, or from 1.00 to 3.00.

25. Glass container according to one or more of items 20 to 24, wherein the cross-linked polysiloxane structural units, the low viscosity non-cross-linked polysiloxane structural units, and/or the high viscosity non-cross-linked polysiloxane structural units, comprise dialkylsiloxane monomeric units, in particular dimethylsiloxane monomeric units.

26. Glass container according to one or more of items 9 to 25, wherein the cross-linked polysiloxane structural units are cross-linked via one or more polymerized end groups.

27. Glass container according to one or more of items 9 to 26, wherein the polymerized endgroups are selected from vinyl, acryl, methacryl, styrene and combinations thereof.

28. Glass container according to one or more of the preceding items, wherein the coating is obtainable or obtained by applying a coating composition to at least parts of a surface of the container, curing the coating composition on the surface, wherein a curing temperature of the coating composition is less than 150° C., or less than 125° C., and wherein optionally the curing temperature is held for at least 10 seconds and up to 3000 seconds.

29. Glass container according to item 28, wherein the curing temperature is held for at least 45 seconds and at most 180 seconds.

30. Glass container according to item 28 or 29, wherein the coating composition has the following composition in percent by weight

| | |
|---|---|
| one or more cross-linkable polysiloxane compounds | 3.0 to 20.0% |
| one or more non-cross-linkable polysiloxane compounds | 2.0 to 25.0% |
| one or more cross-linking polysiloxane compounds | 0.10 to 1.50% |
| one or more catalysts | 0.03 to 0.50% |
| one or more diluents | 55.0 to 92.0% |

31. Glass container according to item 28 or 29, wherein the coating composition has the following composition in percent by weight

| | |
|---|---|
| one or more cross-linkable polysiloxane compounds | 7.5 to 15.0% |
| one or more non-cross-linkable polysiloxane compounds | 8.0 to 15.0% |
| one or more cross-linking polysiloxane compounds | 0.10 to 1.00% |
| one or more catalysts | 0.03 to 0.50% |
| one or more diluents | 55.0 to 82.0% |

32. Glass container according to item 28 or 29, wherein the coating composition has the following composition in percent by weight

| | |
|---|---|
| a vinyl-functionalized polysiloxane as a cross-linkable polysiloxane compound | 3.0 to 20.0% |
| one or more non-cross-linkable polysiloxane compounds | 2.0 to 25.0% |

-continued

| | |
|---|---|
| a copolymer having dimethylsiloxane and methylhydrosiloxane monomer units as a cross-linking polysiloxane compound, | 0.10 to 1.50% |
| one or more Pt-containing catalysts | 0.03 to 0.50% |
| one or more diluents | 55.0 to 92.0% |

33. Glass container according to one or more of the preceding items, wherein the glass of the glass container comprises 50 to 90 wt. % $SiO_2$, and 3 to 25 wt. % $B_2O_3$.

34. Glass container according to one or more of the preceding items, wherein the glass of the glass container comprises 55 to 75 wt. % $SiO_2$, and 11.0 to 25.0 wt. % $Al_2O_3$.

35. Glass container according to item 33, wherein the glass of the glass container comprises 70 to 81 wt. % $SiO_2$, 1 to 10 wt. % $Al_2O_3$, 6 to 14 wt. $B_2O_3$, 3 to 10 wt. % $Na_2O$, 0 to 3 wt. % $K_2O$, 0 to 1 wt. % $Li_2O$, 0 to 3 wt. % MgO, 0 to 3 wt. % CaO, and 0 to 5 wt. % BaO.

36. Glass container according to item 33, wherein the glass of the glass container comprises 72 to 82 wt. % $SiO_2$, 5 to 8 wt. % $Al_2O_3$, 3 to 6 wt. $B_2O_3$, 2 to 6 wt. % $Na_2O$, 3 to 9 wt. % $K_2O$, 0 to 1 wt. % $Li_2O$, 0 to 1 wt. % MgO, and 0 to 1 wt. % CaO.

37. Glass container according to item 33, wherein the glass of the glass container comprises 60 to 78 wt. % $SiO_2$, 7 to 15 wt. $B_2O_3$, 0 to 4 wt. % $Na_2O$, 3 to 12 wt. % $K_2O$, 0 to 2 wt. % $Li_2O$, 0 to 2 wt. % MgO, 0 to 2 wt. % CaO, 0 to 3 wt. % BaO, and 4 to 9 wt. % $ZrO_2$.

38. Glass container according to one or more of items 1 to 32, wherein the glass of the glass container comprises 50 to 70 wt. % $SiO_2$, 10 to 26 wt. % $Al_2O_3$, 1 to 14 wt. $B_2O_3$, 0 to 15 wt. % MgO, 2 to 12 wt. % CaO, 0 to 10 wt. % BaO, 0 to 2 wt. % SrO, 0 to 8 wt. % ZnO, and 0 to 2 wt. % $ZrO_2$.

39. Glass container according to item 34, wherein the glass of the glass container comprises 55 to 70 wt. % $SiO_2$, 11 to 25 wt. % $Al_2O_3$, 0 to 10 wt. % MgO, 1 to 20 wt. % CaO, 0 to 10 wt. % BaO, 0 to 8.5 wt. % SrO, 0 to 5 wt. % ZnO, 0 to 5 wt. % $ZrO_2$, and 0 to 5 wt. % $TiO_2$.

40. Glass container according to item 34, wherein the glass of the glass container comprises 65 to 72 wt. % $SiO_2$, 11 to 17 wt. % $Al_2O_3$, 0.1 to 8 wt. % $Na_2O$, 0 to 8 wt. % $K_2O$, 3 to 8 wt. % MgO, 4 to 12 wt. % CaO, and 0 to 10 wt. % ZnO.

41. Glass container according to one or more of items 1 to 32, wherein the glass of the glass container comprises 64 to 78 wt. % $SiO_2$, 4 to 14 wt. % $Al_2O_3$, 0 to 4 wt. % $B_2O_3$, 6 to 14 wt. % $Na_2O$, 0 to 3 wt. % $K_2O$, 0 to 10 wt. % MgO, 0 to 15 wt. % CaO, 0 to 2 wt. % $ZrO_2$, and 0 to 2 wt. % $TiO_2$.

42. Glass container according to at least one of the preceding items, wherein the coating is disposed on at least 25%, or at least 50% of the inner surface of said hollow cylindrical body.

43. Glass container according to at least one of the preceding items, wherein the coating is disposed on at least 65%, or at least 85% of the inner surface of said hollow cylindrical body.

44. Glass container according to at least one of the preceding items, wherein the coating is disposed on essentially all of the inner surface of said hollow cylindrical body.

45. Glass container according to one or more of items 8 to 44, wherein the coating is disposed on at least 25%, or at least 50% of the nestling surface.

46. Glass container according to one or more of items 8 to 45, wherein the coating is disposed on at least 65%, or at least 85% of the nestling surface.

47. Glass container according to one or more of items 8 to 46, wherein the coating is disposed on essentially all of the nestling surface.

48. Glass container according to one or more of items 8 to 47, wherein the nestling surface has a conical shape.

49. Glass container according to at least one of the preceding items, wherein the hollow cylindrical body encloses a volume of from 0.1 to 1,000 ml.

50. Glass container according to at least one of the preceding items, wherein the hollow cylindrical body encloses a volume of less than 10.0 ml.

51. Glass container according to at least one of the preceding items, wherein the hollow cylindrical body has a lumen surrounded by a glass wall, the glass wall having a wall thickness between 0.50 and 10.0 mm.

52. Glass container according to at least one of the preceding items, wherein the hollow cylindrical body has a lumen surrounded by a glass wall, the glass wall having a wall thickness between 1.00 and 4.00 mm.

53. Glass container according to at least one of the preceding items, wherein a ratio of a total inner diameter variation along the coated part of the inner surface relative to a thickness of the coating is less than 250, or less than 150.

54. Glass container according to at least one of the preceding items, wherein a total inner diameter variation of the hollow cylindrical body is less than 200 μm, less than 100 μm, or less than 50 μm.

55. Glass container according to at least one of the preceding items, wherein the coating has a crystallinity of less than 20% at 20° C.

57. Glass container according to at least one of the preceding items, having a standardized glide force (GF) of <7.5 N, <6.5 N, <5.5 N, <4.5 N, <3.5 N, or <2.5 N.

58. Glass container according to at least one of the preceding items, having a standardized glide force (GF) of at least 0.5 N.

59. Glass container according to at least one of the preceding items, having a ratio of the standardized break loose force (BLF) relative to the standardized GF of BLF/GF>1.30, >1.40, >1.50 or >1.60.

60. Glass container according to at least one of the preceding items, having a ratio of the standardized break loose force (BLF) relative to the standardized GF of BLF/GF<3.0.

61. Glass container according to at least one of the preceding items, having a standardized break loose force that exceeds the container's standardized glide force by at least 30%, at least 60%, at least 100%, or at least 200%.

62. Glass container according to at least one of the preceding items, wherein the coating comprises low viscosity non-cross-linked polysiloxane structural units having a weight average molecular weight of 1,200 to 30,000 g/mol, from 5,000 to 25,000 g/mol, or from 10,000 to 20,000 g/mol.

63. Glass container according to at least one of the preceding items, wherein the coating comprises low viscosity non-cross-linked polysiloxane structural units having a weight average molecular weight of at least 1,200 g/mol, at least 5,000 g/mol, or at least 10,000 g/mol.

64. Glass container according to at least one of the preceding items, wherein the coating comprises low viscosity non-cross-linked polysiloxane structural units having a weight average molecular weight of up to 30,000 g/mol, up to 25,000 g/mol, or up to 20,000 g/mol.

65. Glass container according to at least one of the preceding items, wherein the coating comprises high viscosity non-cross-linked polysiloxane structural units having a weight average molecular weight of 15,000 to 300,000 g/mol, 32,000 to 210,000 g/mol, or from 100,000 to 150,000 g/mol.

66. Glass container according to at least one of the preceding items, wherein the coating comprises high viscosity non-cross-linked polysiloxane structural units having a weight average molecular weight of at least 15,000 g/mol, at least 32,000 g/mol, or at least 100,000 g/mol.

67. Glass container according to at least one of the preceding items, wherein the coating comprises high viscosity non-cross-linked polysiloxane structural units having a weight average molecular weight of up to 300,000 g/mol, up to 210,000 g/mol, or up to 150,000 g/mol.

According to item 68, the disclosure relates to a glass container for pharmaceutical compositions, comprising a hollow cylindrical body having at least one open end; wherein at least a part of a surface of the glass container comprises a coating, the coating having a hardness such that a hardness value measured on the coated surface according to DIN EN ISO 14577-1:2015-11 and DIN EN ISO 14577-4:2017-04 differs from the hardness value measured on an uncoated surface of the glass container by less than 10%.

69. Glass container according to item 68, wherein the coating has a hardness such that a hardness value measured on the coated surface according to DIN EN ISO 14577-1:2015-11 and DIN EN ISO 14577-4:2017-04 differs from the hardness value measured on an uncoated surface of the glass container by less than 7.0%, less than 5.0% or less than 3.0%, and/or by at least 0.1%, at least 0.5%, at least 1.0% or at least 2.0%.

70. Glass container according to item 68 or 69, wherein the coating has a thickness of 250 nm or more, 300 nm or more, or 400 nm or more, 450 nm or more, or 500 nm or more.

71. Glass container according to one or more of the preceding items 68 to 70, wherein the coating has a glass transition temperature at −60° C. or below, optionally at −70° C. or below, such as at −75° C. or below, or at −80° C. or below.

72. Glass container according to one or more of the preceding items 68 to 71, wherein the container has a standard ethanol-modified dye-ingress tested container closure integrity of at least 150 hours at −80° C., or at least 600 hours at −80° C.

73. Glass container according to one or more of the preceding items 68 to 72, wherein the coating was cured at a temperature of less than 150° C., or less than 110° C., and/or was cured at a temperature of 50° C. or more, or 60° C. or more.

74. Glass container according to one or more of the preceding items 68 to 73, wherein the hollow cylindrical body has an open end A, open end A being configured for receiving a stopper that is slidable relative to the hollow cylindrical body from open end A; wherein at least a part of an inner surface of the hollow cylindrical body has the coating.

75. Glass container according to one or more of the preceding items 68 to 74, wherein the container has an open end B, open end B being configured for being closed by a cap, open end B having a nestling surface, configured to fit snugly against a surface of a cap, wherein at least a part of the nestling surface comprises the coating.

76. Glass container according to one or more of the preceding items 68 to 75, wherein the coating comprises one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00, and optionally at least 0.40.

77. Glass container according to one or more of the preceding items 68 to 76, wherein the coating comprises at least two non-cross-linked polysiloxane structural units that differ in their viscosities.

78. Glass container according to one or more of the preceding items 68 to 77, wherein at least a part of an inner surface of the hollow cylindrical body has the coating, wherein a ratio of a total inner diameter variation along the coated part of the inner surface relative to a thickness of the coating is less than 500.

79. Glass container according to one or more of the preceding items 68 to 78, wherein the container is a syringe, or a cartridge, such as a pre-filled syringe or cartridge.

80. Glass container according to one or more of the preceding items 68 to 79, wherein the coating has a thickness up to 1500 nm, up to 1250 nm or up to 1000 nm.

81. Glass container according to one or more of the preceding items 68 to 80, wherein the coating has a thickness of from >400 nm to 1500 nm, from 450 nm to 1250 nm, or from 500 nm to 1000 nm.

82. Glass container according to one or more of the preceding items 68 to 81, wherein the coating comprises polyalkylsiloxane structural units, such as polydialkylsiloxane structural units.

83. Glass container according to item 82, wherein one or more of the alkyl groups in the polyalkylsiloxane or polydialkylsiloxane are independently selected from branched or unbranched C1 to C8 alkyl groups.

84. Glass container according to one or more of the preceding items 68 to 83, wherein a ratio of a weight amount of cross-linked polysiloxane structural units and a weight amount of non-cross-linked polysiloxane structural units in the coating is less than 3.00, less than 2.50, less than 1.80, or less than 1.20.

85. Glass container according to one or more of the preceding items 68 to 84, wherein a ratio of a weight amount of cross-linked polysiloxane structural units and a weight amount of non-cross-linked polysiloxane structural units in the coating is at least 0.40, at least 0.60, or at least 0.70.

86. Glass container according to one or more of the preceding items 68 to 85, wherein a ratio of a weight amount of cross-linked polysiloxane structural units and a weight amount of non-cross-linked polysiloxane structural units in the coating is from 0.40 to 3.00, from 0.60 to 2.50, or from 0.70 to 1.80.

87. Glass container according to one or more of the preceding items 68 to 86, wherein the coating comprises
- high viscosity non-cross-linked polysiloxane structural units having a viscosity of more than 10,000 cSt, and/or
- low viscosity non-cross-linked polysiloxane structural units having a viscosity of 10,000 cSt, or less.

88. Glass container according to item 87, wherein
- the high viscosity non-cross-linked polysiloxane structural units have a viscosity of at least 15,000 cSt, and/or
- the low viscosity non-cross-linked polysiloxane structural units have a viscosity of 5,000 cSt, or less.

89. Glass container according to item 87 or 88, wherein a ratio of a weight amount of the low viscosity non-cross-linked polysiloxane structural units and the high viscosity non-cross-linked polysiloxane structural units ($mass_{high}$: $mass_{low}$) is at least 0.10, at least 0.50, at least 1.00, at least 1.50 or at least 2.00.

90. Glass container according to item 87, 88 or 89, wherein a ratio of a weight amount of the low viscosity non-cross-linked polysiloxane structural units and the high viscosity non-cross-linked polysiloxane structural units ($mass_{high}$:$mass_{low}$) is up to 5.00, up to 4.00 or up to 3.00.

91. Glass container according to one or more of items 87 to 90, wherein a ratio of a weight amount of the low viscosity non-cross-linked polysiloxane structural units and the high viscosity non-cross-linked polysiloxane structural units ($mass_{high}$:$mass_{low}$) is from 0.10 to 5.00, from 0.50 to 4.00, or from 1.00 to 3.00.

92. Glass container according to one or more of items 87 to 91, wherein
- the cross-linked polysiloxane structural units,
- the low viscosity non-cross-linked polysiloxane structural units, and/or
- the high viscosity non-cross-linked polysiloxane structural units,
  - comprise dialkylsiloxane monomeric units, in particular dimethylsiloxane monomeric units.

93. Glass container according to one or more of items 76 to 92, wherein the cross-linked polysiloxane structural units are cross-linked via one or more polymerized end groups.

94. Glass container according to one or more of items 76 to 93, wherein the polymerized endgroups are selected from vinyl, acryl, methacryl, styrene and combinations thereof.

95. Glass container according to one or more of the preceding items 68 to 94, wherein the coating is obtainable or obtained by
- applying a coating composition to at least parts of a surface of the container,
- curing the coating composition on the surface,
- wherein a curing temperature of the coating composition is less than 150° C., or less than 125° C., and wherein optionally the curing temperature is held for at least 10 seconds and up to 3000 seconds.

96. Glass container according to item 95, wherein the curing temperature is held for at least 45 seconds and at most 180 seconds.

97. Glass container according to item 95 or 96, wherein the coating composition has the following composition in percent by weight

| | |
|---|---|
| one or more cross-linkable polysiloxane compounds | 3.0 to 20.0% |
| one or more non-cross-linkable polysiloxane compounds | 2.0 to 25.0% |
| one or more cross-linking polysiloxane compounds | 0.10 to 1.50% |
| one or more catalysts | 0.03 to 0.50% |
| one or more diluents | 55.0 to 92.0% |

98. Glass container according to item 95 or 96, wherein the coating composition has the following composition in percent by weight

| | |
|---|---|
| one or more cross-linkable polysiloxane compounds | 7.5 to 15.0% |
| one or more non-cross-linkable polysiloxane compounds | 8.0 to 15.0% |
| one or more cross-linking polysiloxane compounds | 0.10 to 1.00% |
| one or more catalysts | 0.03 to 0.50% |
| one or more diluents | 55.0 to 82.0% |

99. Glass container according to item 95 or 96, wherein the coating composition has the following composition in percent by weight

| | |
|---|---|
| a vinyl-functionalized polysiloxane as a cross-linkable polysiloxane compound | 3.0 to 20.0% |
| one or more non-cross-linkable polysiloxane compounds | 2.0 to 25.0% |
| a copolymer having dimethylsiloxane and methylhydrosiloxane monomer units as a cross-linking polysiloxane compound, | 0.10 to 1.50% |
| one or more Pt-containing catalysts | 0.03 to 0.50% |
| one or more diluents | 55.0 to 92.0% |

100. Glass container according to one or more of the preceding items 68 to 99, wherein the glass of the glass container comprises 50 to 90 wt. % $SiO_2$, and 3 to 25 wt. % $B_2O_3$.

101. Glass container according to one or more of the preceding items 68 to 100, wherein the glass of the glass container comprises 55 to 75 wt. % $SiO_2$, and 11.0 to 25.0 wt. % $Al_2O_3$.

102. Glass container according to item 100, wherein the glass of the glass container comprises 70 to 81 wt. % $SiO_2$, 1 to 10 wt. % $Al_2O_3$, 6 to 14 wt. $B_2O_3$, 3 to 10 wt. % $Na_2O$, 0 to 3 wt. % $K_2O$, 0 to 1 wt. % $Li_2O$, 0 to 3 wt. % MgO, 0 to 3 wt. % CaO, and 0 to 5 wt. % BaO.

103. Glass container according to item 100, wherein the glass of the glass container comprises 72 to 82 wt. % $SiO_2$, 5 to 8 wt. % $Al_2O_3$, 3 to 6 wt. $B_2O_3$, 2 to 6 wt. % $Na_2O$, 3 to 9 wt. % $K_2O$, 0 to 1 wt. % $Li_2O$, 0 to 1 wt. % MgO, and 0 to 1 wt. % CaO.

104. Glass container according to item 100, wherein the glass of the glass container comprises 60 to 78 wt. % $SiO_2$, 7 to 15 wt. $B_2O_3$, 0 to 4 wt. % $Na_2O$, 3 to 12 wt. % $K_2O$, 0 to 2 wt. % $Li_2O$, 0 to 2 wt. % MgO, 0 to 2 wt. % CaO, 0 to 3 wt. % BaO, and 4 to 9 wt. % $ZrO_2$.

105. Glass container according to one or more of items 68 to 99, wherein the glass of the glass container comprises 50 to 70 wt. % $SiO_2$, 10 to 26 wt. % $Al_2O_3$, 1 to 14 wt. $B_2O_3$, 0 to 15 wt. % MgO, 2 to 12 wt. % CaO, 0 to 10 wt. % BaO, 0 to 2 wt. % SrO, 0 to 8 wt. % ZnO, and 0 to 2 wt. % $ZrO_2$.

106. Glass container according to item 101, wherein the glass of the glass container comprises 55 to 70 wt. % $SiO_2$, 11 to 25 wt. % $Al_2O_3$, 0 to 10 wt. % MgO, 1 to 20 wt. % CaO, 0 to 10 wt. % BaO, 0 to 8.5 wt. % SrO, 0 to 5 wt. % ZnO, 0 to 5 wt. % $ZrO_2$, and 0 to 5 wt. % $TiO_2$.

107. Glass container according to item 101, wherein the glass of the glass container comprises 65 to 72 wt. % $SiO_2$, 11 to 17 wt. % $Al_2O_3$, 0.1 to 8 wt. % $Na_2O$, 0 to 8 wt. % $K_2O$, 3 to 8 wt. % MgO, 4 to 12 wt. % CaO, and 0 to 10 wt. % ZnO.

108. Glass container according to one or more of items 68 to 99, wherein the glass of the glass container comprises 64 to 78 wt. % $SiO_2$, 4 to 14 wt. % $Al_2O_3$, 0 to 4 wt. % $B_2O_3$, 6 to 14 wt. % $Na_2O$, 0 to 3 wt. % $K_2O$, 0 to 10 wt. % MgO, 0 to 15 wt. % CaO, 0 to 2 wt. % $ZrO_2$, and 0 to 2 wt. % $TiO_2$.

109. Glass container according to at least one of the preceding items 68 to 108, wherein the coating is disposed on at least 25%, or at least 50% of the inner surface of said hollow cylindrical body.

110. Glass container according to at least one of the preceding items 68 to 109, wherein the coating is disposed on at least 65%, or at least 85% of the inner surface of said hollow cylindrical body.

111. Glass container according to at least one of the preceding items 68 to 110, wherein the coating is disposed on essentially all of the inner surface of said hollow cylindrical body.

112. Glass container according to one or more of items 75 to 111, wherein the coating is disposed on at least 25%, or at least 50% of the nestling surface.

113. Glass container according to one or more of items 75 to 112, wherein the coating is disposed on at least 65%, or at least 85% of the nestling surface.

114. Glass container according to one or more of items 75 to 113, wherein the coating is disposed on essentially all of the nestling surface.

115. Glass container according to one or more of items 75 to 114, wherein the nestling surface has a conical shape.

116. Glass container according to at least one of the preceding items 68 to 115, wherein the hollow cylindrical body encloses a volume of from 0.1 to 1,000 ml.

117. Glass container according to at least one of the preceding items 68 to 116, wherein the hollow cylindrical body encloses a volume of less than 10.0 ml.

118. Glass container according to at least one of the preceding items 68 to 117, wherein the hollow cylindrical body has a lumen surrounded by a glass wall, the glass wall having a wall thickness between 0.50 and 10.0 mm.

119. Glass container according to at least one of the preceding items 68 to 118. wherein the hollow cylindrical body has a lumen surrounded by a glass wall, the glass wall having a wall thickness between 1.00 and 4.00 mm.

120. Glass container according to at least one of the preceding items 68 to 119, wherein a ratio of a total inner diameter variation along the coated part of the inner surface relative to a thickness of the coating is less than 250, or less than 150.

121. Glass container according to at least one of the preceding items 68 to 120, wherein a total inner diameter variation of the hollow cylindrical body is less than 200 μm, less than 100 μm, or less than 50 μm.

122. Glass container according to at least one of the preceding items 68 to 121, wherein the coating has a crystallinity of less than 20% at 20° C.

123. Glass container according to at least one of the preceding items 68 to 122, having a standardized glide force (GF) of <7.5 N, <6.5 N, <5.5 N, <4.5 N, <3.5 N, or <2.5 N.

124. Glass container according to at least one of the preceding items 68 to 123, having a standardized glide force (GF) of at least 0.5 N.

125. Glass container according to at least one of the preceding items 68 to 124, having a ratio of the standardized break loose force (BLF) relative to the standardized GF of BLF/GF>1.30, >1.40, >1.50 or >1.60.

126. Glass container according to at least one of the preceding items 68 to 125, having a ratio of the standardized break loose force (BLF) relative to the standardized GF of BLF/GF<3.0.

127. Glass container according to at least one of the preceding items 68 to 126, having a standardized break loose force that exceeds the container's standardized glide force by at least 30%, at least 60%, at least 100%, or at least 200%.

128. Glass container according to at least one of the preceding items 68 to 127, wherein the coating comprises low viscosity non-cross-linked polysiloxane structural units having a weight average molecular weight of 1,200 to 30,000 g/mol, from 5,000 to 25,000 g/mol, or from 10,000 to 20,000 g/mol.

129. Glass container according to at least one of the preceding items 68 to 128, wherein the coating comprises low viscosity non-cross-linked polysiloxane structural units having a weight average molecular weight of at least 1,200 g/mol, at least 5,000 g/mol, or at least 10,000 g/mol.

130. Glass container according to at least one of the preceding items 68 to 129, wherein the coating comprises low viscosity non-cross-linked polysiloxane structural units having a weight average molecular weight of up to 30,000 g/mol, up to 25,000 g/mol, or up to 20,000 g/mol.

131. Glass container according to at least one of the preceding items 68 to 130, wherein the coating comprises high viscosity non-cross-linked polysiloxane structural units having a weight average molecular weight of 15,000 to 300,000 g/mol, 32,000 to 210,000 g/mol, or from 100,000 to 150,000 g/mol.

132. Glass container according to at least one of the preceding items 68 to 131, wherein the coating comprises high viscosity non-cross-linked polysiloxane structural units having a weight average molecular weight of at least 15,000 g/mol, at least 32,000 g/mol, or at least 100,000 g/mol.

133. Glass container according to at least one of the preceding items 68 to 132, wherein the coating comprises high viscosity non-cross-linked polysiloxane structural units having a weight average molecular weight of up to 300,000 g/mol, up to 210,000 g/mol, or up to 150,000 g/mol.

134. Glass container according to at least one of the preceding items 68 to 133, the coating having a crystallization temperature range and a melting temperature range determined using differential scanning calorimetry at a temperature change rate of 10° C./min, wherein the crystallization temperature range and the melting temperature range overlap at a temperature of from −75° C. to −100° C., particularly at −80° C.

According to item 135, the disclosure relates to a glass container for pharmaceutical compositions, comprising a hollow cylindrical body having at least one open end; wherein at least a part of a surface of the glass container comprises a coating, the container has a standard ethanol-modified dye-ingress tested container closure integrity of at least 150 hours at −80° C.

136. Glass container according to item 135, wherein the coating has a hardness such that a hardness value measured on the coated surface according to DIN EN ISO 14577-1: 2015-11 and DIN EN ISO 14577-4:2017-04 differs from the hardness value measured on an uncoated surface of the glass container by less than 10%, less than 7.0%, less than 5.0% or less than 3.0%, and/or by at least 0.1%, at least 0.5%, at least 1.0% or at least 2.0%.

137. Glass container according to item 135 or 136, wherein the coating has a thickness of 250 nm or more, 300 nm or more, or 400 nm or more, 450 nm or more, or 500 nm or more.

138. Glass container according to one or more of the preceding items 135 to 137, wherein the coating has a glass transition temperature at −60° C. or below, optionally at −70° C. or below, such as at −75° C. or below, or at −80° C. or below.

139. Glass container according to one or more of the preceding items 135 to 138, wherein the container has a standard ethanol-modified dye-ingress tested container closure integrity of at least 600 hours at −80° C.

140. Glass container according to one or more of the preceding items 135 to 139, wherein the coating was cured at a temperature of less than 150° C., or less than 110° C., and/or was cured at a temperature of 50° C. or more, or 60° C. or more.

141. Glass container according to one or more of the preceding items 135 to 140, wherein the hollow cylindrical body has an open end A, open end A being configured for receiving a stopper that is slidable relative to the hollow cylindrical body from open end A; wherein at least a part of an inner surface of the hollow cylindrical body has the coating.

142. Glass container according to one or more of the preceding items 135 to 141, wherein the container has an open end B, open end B being configured for being closed by a cap, open end B having a nestling surface, configured to fit snugly against a surface of a cap, wherein at least a part of the nestling surface comprises the coating.

143. Glass container according to one or more of the preceding items 135 to 142, wherein the coating comprises one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00, and optionally at least 0.40.

144. Glass container according to one or more of the preceding items 135 to 143, wherein the coating comprises at least two non-cross-linked polysiloxane structural units that differ in their viscosities.

145. Glass container according to one or more of the preceding items 135 to 144, wherein at least a part of an inner surface of the hollow cylindrical body has the coating, wherein a ratio of a total inner diameter variation along the coated part of the inner surface relative to a thickness of the coating is less than 500.

146. Glass container according to one or more of the preceding items 135 to 145, wherein the container is a syringe, or a cartridge, such as a pre-filled syringe or cartridge.

147. Glass container according to one or more of the preceding items 135 to 146, wherein the coating has a thickness up to 1500 nm, up to 1250 nm or up to 1000 nm.

148. Glass container according to one or more of the preceding items 135 to 147, wherein the coating has a thickness of from >400 nm to 1500 nm, from 450 nm to 1250 nm, or from 500 nm to 1000 nm.

149. Glass container according to one or more of the preceding items 135 to 148, wherein the coating comprises polyalkylsiloxane structural units, such as polydialkylsiloxane structural units.

150. Glass container according to item 149, wherein one or more of the alkyl groups in the polyalkylsiloxane or polydialkylsiloxane are independently selected from branched or unbranched C1 to C8 alkyl groups.

151. Glass container according to one or more of the preceding items 135 to 150, wherein a ratio of a weight amount of cross-linked polysiloxane structural units and a weight amount of non-cross-linked polysiloxane structural units in the coating is less than 3.00, less than 2.50, less than 1.80, or less than 1.20.

152. Glass container according to one or more of the preceding items 135 to 151, wherein a ratio of a weight amount of cross-linked polysiloxane structural units and a weight amount of non-cross-linked polysiloxane structural units in the coating is at least 0.40, at least 0.60, or at least 0.70.

153. Glass container according to one or more of the preceding items 135 to 152, wherein a ratio of a weight amount of cross-linked polysiloxane structural units and a weight amount of non-cross-linked polysiloxane structural units in the coating is from 0.40 to 3.00, from 0.60 to 2.50, or from 0.70 to 1.80.

154. Glass container according to one or more of the preceding items 135 to 153, wherein the coating comprises high viscosity non-cross-linked polysiloxane structural units having a viscosity of more than 10,000 cSt, and/or low viscosity non-cross-linked polysiloxane structural units having a viscosity of 10,000 cSt, or less.

155. Glass container according to item 154, wherein the high viscosity non-cross-linked polysiloxane structural units have a viscosity of at least 15,000 cSt, and/or the low viscosity non-cross-linked polysiloxane structural units have a viscosity of 5,000 cSt, or less.

156. Glass container according to item 154 or 155, wherein a ratio of a weight amount of the low viscosity non-cross-linked polysiloxane structural units and the high viscosity non-cross-linked polysiloxane structural units ($mass_{high}$:$mass_{low}$) is at least 0.10, at least 0.50, at least 1.00, at least 1.50 or at least 2.00.

157. Glass container according to item 154, 155 or 156, wherein a ratio of a weight amount of the low viscosity non-cross-linked polysiloxane structural units and the high viscosity non-cross-linked polysiloxane structural units ($mass_{high}$:$mass_{low}$) is up to 5.00, up to 4.00 or up to 3.00.

158. Glass container according to one or more of items 154 to 157, wherein a ratio of a weight amount of the low viscosity non-cross-linked polysiloxane structural units and the high viscosity non-cross-linked polysiloxane structural units ($mass_{high}$:$mass_{low}$) is from 0.10 to 5.00, from 0.50 to 4.00, or from 1.00 to 3.00.

159. Glass container according to one or more of items 154 to 158, wherein the cross-linked polysiloxane structural units, the low viscosity non-cross-linked polysiloxane structural units, and/or the high viscosity non-cross-linked polysiloxane structural units, comprise dialkylsiloxane monomeric units, in particular dimethylsiloxane monomeric units.

160. Glass container according to one or more of items 143 to 159, wherein the cross-linked polysiloxane structural units are cross-linked via one or more polymerized end groups.

161. Glass container according to one or more of items 143 to 160, wherein the polymerized endgroups are selected from vinyl, acryl, methacryl, styrene and combinations thereof.

162. Glass container according to one or more of the preceding items 135 to 161, wherein the coating is obtainable or obtained by applying a coating composition to at least parts of a surface of the container, curing the coating composition on the surface, wherein a curing temperature of the coating composition is less than 150° C., or less than 125° C., and wherein optionally the curing temperature is held for at least 10 seconds and up to 3000 seconds.

163. Glass container according to item 162, wherein the curing temperature is held for at least 45 seconds and at most 180 seconds.

164. Glass container according to item 162 or 163, wherein the coating composition has the following composition in percent by weight

| | |
|---|---|
| one or more cross-linkable polysiloxane compounds | 3.0 to 20.0% |
| one or more non-cross-linkable polysiloxane compounds | 2.0 to 25.0% |
| one or more cross-linking polysiloxane compounds | 0.10 to 1.50% |
| one or more catalysts | 0.03 to 0.50% |
| one or more diluents | 55.0 to 92.0% |

165. Glass container according to item 162 or 163, wherein the coating composition has the following composition in percent by weight

| | |
|---|---|
| one or more cross-linkable polysiloxane compounds | 7.5 to 15.0% |
| one or more non-cross-linkable polysiloxane compounds | 8.0 to 15.0% |
| one or more cross-linking polysiloxane compounds | 0.10 to 1.00% |
| one or more catalysts | 0.03 to 0.50% |
| one or more diluents | 55.0 to 82.0% |

166. Glass container according to item 162 or 163, wherein the coating composition has the following composition in percent by weight

| | |
|---|---|
| a vinyl-functionalized polysiloxane as a cross-linkable polysiloxane compound | 3.0 to 20.0% |
| one or more non-cross-linkable polysiloxane compounds | 2.0 to 25.0% |
| a copolymer having dimethylsiloxane and methylhydrosiloxane monomer units as a cross-linking polysiloxane compound, | 0.10 to 1.50% |
| one or more Pt-containing catalysts | 0.03 to 0.50% |
| one or more diluents | 55.0 to 92.0% |

167. Glass container according to one or more of the preceding items 135 to 166, wherein the glass of the glass container comprises 50 to 90 wt. % $SiO_2$, and 3 to 25 wt. % $B_2O_3$.

168. Glass container according to one or more of the preceding items 135 to 167, wherein the glass of the glass container comprises 55 to 75 wt. % $SiO_2$, and 11.0 to 25.0 wt. % $Al_2O_3$.

169. Glass container according to item 167, wherein the glass of the glass container comprises 70 to 81 wt. % $SiO_2$, 1 to 10 wt. % $Al_2O_3$, 6 to 14 wt. $B_2O_3$, 3 to 10 wt. % $Na_2O$, 0 to 3 wt. % $K_2O$, 0 to 1 wt. % $Li_2O$, 0 to 3 wt. % MgO, 0 to 3 wt. % CaO, and 0 to 5 wt. % BaO.

170. Glass container according to item 167, wherein the glass of the glass container comprises 72 to 82 wt. % $SiO_2$, 5 to 8 wt. % $Al_2O_3$, 3 to 6 wt. $B_2O_3$, 2 to 6 wt. % $Na_2O$, 3 to 9 wt. % $K_2O$, 0 to 1 wt. % $Li_2O$, 0 to 1 wt. % MgO, and 0 to 1 wt. % CaO.

171. Glass container according to item 167, wherein the glass of the glass container comprises 60 to 78 wt. % $SiO_2$, 7 to 15 wt. $B_2O_3$, 0 to 4 wt. % $Na_2O$, 3 to 12 wt. % $K_2O$, 0 to 2 wt. % $Li_2O$, 0 to 2 wt. % MgO, 0 to 2 wt. % CaO, 0 to 3 wt. % BaO, and 4 to 9 wt. % $ZrO_2$.

172. Glass container according to one or more of items 135 to 166, wherein the glass of the glass container comprises 50 to 70 wt. % $SiO_2$, 10 to 26 wt. % $Al_2O_3$, 1 to 14 wt. $B_2O_3$, 0 to 15 wt. % MgO, 2 to 12 wt. % CaO, 0 to 10 wt. % BaO, 0 to 2 wt. % SrO, 0 to 8 wt. % ZnO, and 0 to 2 wt. % $ZrO_2$.

173. Glass container according to item 168, wherein the glass of the glass container comprises 55 to 70 wt. % $SiO_2$, 11 to 25 wt. % $Al_2O_3$, 0 to 10 wt. % MgO, 1 to 20 wt. % CaO, 0 to 10 wt. % BaO, 0 to 8.5 wt. % SrO, 0 to 5 wt. % ZnO, 0 to 5 wt. % $ZrO_2$, and 0 to 5 wt. % $TiO_2$.

174. Glass container according to item 168, wherein the glass of the glass container comprises 65 to 72 wt. % $SiO_2$, 11 to 17 wt. % $Al_2O_3$, 0.1 to 8 wt. % $Na_2O$, 0 to 8 wt. % $K_2O$, 3 to 8 wt. % MgO, 4 to 12 wt. % CaO, and 0 to 10 wt. % ZnO.

175. Glass container according to one or more of items 135 to 166, wherein the glass of the glass container comprises 64 to 78 wt. % $SiO_2$, 4 to 14 wt. % $Al_2O_3$, 0 to 4 wt. % $B_2O_3$, 6 to 14 wt. % $Na_2O$, 0 to 3 wt. % $K_2O$, 0 to 10 wt. % MgO, 0 to 15 wt. % CaO, 0 to 2 wt. % $ZrO_2$, and 0 to 2 wt. % $TiO_2$.

176. Glass container according to at least one of the preceding items 135 to 175, wherein the coating is disposed on at least 25%, or at least 50% of the inner surface of said hollow cylindrical body.

177. Glass container according to at least one of the preceding items 135 to 176, wherein the coating is disposed on at least 65%, or at least 85% of the inner surface of said hollow cylindrical body.

178. Glass container according to at least one of the preceding items 135 to 177, wherein the coating is disposed on essentially all of the inner surface of said hollow cylindrical body.

179. Glass container according to one or more of items 142 to 178, wherein the coating is disposed on at least 25%, or at least 50% of the nestling surface.

180. Glass container according to one or more of items 142 to 179, wherein the coating is disposed on at least 65%, or at least 85% of the nestling surface.

181. Glass container according to one or more of items 142 to 180, wherein the coating is disposed on essentially all of the nestling surface.

182. Glass container according to one or more of items 142 to 181, wherein the nestling surface has a conical shape.

183. Glass container according to at least one of the preceding items 135 to 182, wherein the hollow cylindrical body encloses a volume of from 0.1 to 1,000 ml.

184. Glass container according to at least one of the preceding items 135 to 183, wherein the hollow cylindrical body encloses a volume of less than 10.0 ml.

185. Glass container according to at least one of the preceding items 135 to 184, wherein the hollow cylindrical body has a lumen surrounded by a glass wall, the glass wall having a wall thickness between 0.50 and 10.0 mm.

186. Glass container according to at least one of the preceding items 135 to 185, wherein the hollow cylindrical body has a lumen surrounded by a glass wall, the glass wall having a wall thickness between 1.00 and 4.00 mm.

187. Glass container according to at least one of the preceding items 135 to 186, wherein a ratio of a total inner diameter variation along the coated part of the inner surface relative to a thickness of the coating is less than 250, or less than 150.

188. Glass container according to at least one of the preceding items 135 to 187, wherein a total inner diameter variation of the hollow cylindrical body is less than 200 μm, less than 100 μm, or less than 50 μm.

189. Glass container according to at least one of the preceding items 135 to 188, wherein the coating has a crystallinity of less than 20% at 20° C.

190. Glass container according to at least one of the preceding items 135 to 189, having a standardized glide force (GF) of <7.5 N, <6.5 N, <5.5 N, <4.5 N, <3.5 N, or <2.5 N.

191. Glass container according to at least one of the preceding items 135 to 190, having a standardized glide force (GF) of at least 0.5 N.

192. Glass container according to at least one of the preceding items 135 to 191, having a ratio of the standardized break loose force (BLF) relative to the standardized GF of BLF/GF>1.30, >1.40, >1.50 or >1.60.

193. Glass container according to at least one of the preceding items 135 to 192, having a ratio of the standardized break loose force (BLF) relative to the standardized GF of BLF/GF<3.0.

194. Glass container according to at least one of the preceding items 135 to 193, having a standardized break loose force that exceeds the container's standardized glide force by at least 30%, at least 60%, at least 100%, or at least 200%.

195. Glass container according to at least one of the preceding items 135 to 194, wherein the coating comprises low viscosity non-cross-linked polysiloxane structural units having a weight average molecular weight of 1,200 to 30,000 g/mol, from 5,000 to 25,000 g/mol, or from 10,000 to 20,000 g/mol.

196. Glass container according to at least one of the preceding items 135 to 195, wherein the coating comprises low viscosity non-cross-linked polysiloxane structural units having a weight average molecular weight of at least 1,200 g/mol, at least 5,000 g/mol, or at least 10,000 g/mol.

197. Glass container according to at least one of the preceding items 135 to 196, wherein the coating comprises low viscosity non-cross-linked polysiloxane structural units having a weight average molecular weight of up to 30,000 g/mol, up to 25,000 g/mol, or up to 20,000 g/mol.

198. Glass container according to at least one of the preceding items 135 to 197, wherein the coating comprises high viscosity non-cross-linked polysiloxane structural units having a weight average molecular weight of 15,000 to 300,000 g/mol, 32,000 to 210,000 g/mol, or from 100,000 to 150,000 g/mol.

199. Glass container according to at least one of the preceding items 135 to 198, wherein the coating comprises high viscosity non-cross-linked polysiloxane structural units having a weight average molecular weight of at least 15,000 g/mol, at least 32,000 g/mol, or at least 100,000 g/mol.

200. Glass container according to at least one of the preceding items 135 to 199, wherein the coating comprises high viscosity non-cross-linked polysiloxane structural units having a weight average molecular weight of up to 300,000 g/mol, up to 210,000 g/mol, or up to 150,000 g/mol.

201. Glass container according to at least one of the preceding items 135 to 200, the coating having a crystallization temperature range and a melting temperature range determined using differential scanning calorimetry at a temperature change rate of 10° C./min, wherein the crystallization temperature range and the melting temperature range overlap at a temperature of from −75° C. to −100° C., particularly at −80° C.

According to item 202, the disclosure relates to a glass container for pharmaceutical compositions, comprising a hollow cylindrical body having at least one open end; wherein at least a part of a surface of the glass container comprises a coating, wherein the coating has a glass transition temperature at −60° C. or below.

203. Glass container according to item 202, wherein the coating has a hardness such that a hardness value measured on the coated surface according to DIN EN ISO 14577-1:2015-11 and DIN EN ISO 14577-4:2017-04 differs from the hardness value measured on an uncoated surface of the glass container by less than 10%, less than 7.0%, less than 5.0% or less than 3.0%, and/or by at least 0.1%, at least 0.5%, at least 1.0% or at least 2.0%.

204. Glass container according to item 202 or 203, wherein the coating has a thickness of 250 nm or more, 300 nm or more, or 400 nm or more, 450 nm or more, or 500 nm or more.

205. Glass container according to one or more of the preceding items 202 to 204, wherein the coating has a glass transition temperature at −70° C. or below, such as at −75° C. or below, or at −80° C. or below.

206. Glass container according to one or more of the preceding items 202 to 205, wherein the container has a standard ethanol-modified dye-ingress tested container closure integrity of at least 150 hours at −80° C., or of at least 600 hours at −80° C.

207. Glass container according to one or more of the preceding items 202 to 206, wherein the coating was cured at a temperature of less than 150° C., or less than 110° C., and/or was cured at a temperature of 50° C. or more, or 60° C. or more.

208. Glass container according to one or more of the preceding items 202 to 207, wherein the hollow cylindrical body has an open end A, open end A being configured for receiving a stopper that is slidable relative to the hollow cylindrical body from open end A; wherein at least a part of an inner surface of the hollow cylindrical body has the coating.

209. Glass container according to one or more of the preceding items 202 to 208, wherein the container has an open end B, open end B being configured for being closed by a cap, open end B having a nestling surface, configured to fit snugly against a surface of a cap, wherein at least a part of the nestling surface comprises the coating.

210. Glass container according to one or more of the preceding items 202 to 209, wherein the coating comprises one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00, and optionally at least 0.40.

211. Glass container according to one or more of the preceding items 202 to 210, wherein the coating comprises at least two non-cross-linked polysiloxane structural units that differ in their viscosities.

212. Glass container according to one or more of the preceding items 202 to 211, wherein at least a part of an inner surface of the hollow cylindrical body has the coating, wherein a ratio of a total inner diameter variation along the coated part of the inner surface relative to a thickness of the coating is less than 500.

213. Glass container according to one or more of the preceding items 202 to 212, wherein the container is a syringe, or a cartridge, such as a pre-filled syringe or cartridge.

214. Glass container according to one or more of the preceding items 202 to 213, wherein the coating has a thickness up to 1500 nm, up to 1250 nm or up to 1000 nm.

215. Glass container according to one or more of the preceding items 202 to 214, wherein the coating has a thickness of from >400 nm to 1500 nm, from 450 nm to 1250 nm, or from 500 nm to 1000 nm.

216. Glass container according to one or more of the preceding items 202 to 215, wherein the coating comprises polyalkylsiloxane structural units, such as polydialkylsiloxane structural units.

217. Glass container according to item 216, wherein one or more of the alkyl groups in the polyalkylsiloxane or polydialkylsiloxane are independently selected from branched or unbranched C1 to C8 alkyl groups.

218. Glass container according to one or more of the preceding items 202 to 217, wherein a ratio of a weight amount of cross-linked polysiloxane structural units and a weight amount of non-cross-linked polysiloxane structural units in the coating is less than 3.00, less than 2.50, less than 1.80, or less than 1.20.

219. Glass container according to one or more of the preceding items 202 to 218, wherein a ratio of a weight amount of cross-linked polysiloxane structural units and a weight amount of non-cross-linked polysiloxane structural units in the coating is at least 0.40, at least 0.60, or at least 0.70.

220. Glass container according to one or more of the preceding items 202 to 219, wherein a ratio of a weight amount of cross-linked polysiloxane structural units and a weight amount of non-cross-linked polysiloxane structural units in the coating is from 0.40 to 3.00, from 0.60 to 2.50, or from 0.70 to 1.80.

221. Glass container according to one or more of the preceding items 202 to 220, wherein the coating comprises

- high viscosity non-cross-linked polysiloxane structural units having a viscosity of more than 10,000 cSt, and/or
- low viscosity non-cross-linked polysiloxane structural units having a viscosity of 10,000 cSt, or less.

222. Glass container according to item 221, wherein

- the high viscosity non-cross-linked polysiloxane structural units have a viscosity of at least 15,000 cSt, and/or
- the low viscosity non-cross-linked polysiloxane structural units have a viscosity of 5,000 cSt, or less.

223. Glass container according to item 221 or 222, wherein a ratio of a weight amount of the low viscosity non-cross-linked polysiloxane structural units and the high viscosity non-cross-linked polysiloxane structural units ($mass_{high}$:$mass_{low}$) is at least 0.10, at least 0.50, at least 1.00, at least 1.50 or at least 2.00.

224. Glass container according to item 221, 222 or 223, wherein a ratio of a weight amount of the low viscosity non-cross-linked polysiloxane structural units and the high viscosity non-cross-linked polysiloxane structural units ($mass_{high}$:$mass_{low}$) is up to 5.00, up to 4.00 or up to 3.00.

225. Glass container according to one or more of items 221 to 224, wherein a ratio of a weight amount of the low viscosity non-cross-linked polysiloxane structural units and the high viscosity non-cross-linked polysiloxane structural units ($mass_{high}$:$mass_{low}$) is from 0.10 to 5.00, from 0.50 to 4.00, or from 1.00 to 3.00.

226. Glass container according to one or more of items 221 to 225, wherein

- the cross-linked polysiloxane structural units,
- the low viscosity non-cross-linked polysiloxane structural units, and/or
- the high viscosity non-cross-linked polysiloxane structural units,
- comprise dialkylsiloxane monomeric units, in particular dimethylsiloxane monomeric units.

227. Glass container according to one or more of items 210 to 226, wherein the cross-linked polysiloxane structural units are cross-linked via one or more polymerized end groups.

228. Glass container according to one or more of items 210 to 227, wherein the polymerized endgroups are selected from vinyl, acryl, methacryl, styrene and combinations thereof.

229. Glass container according to one or more of the preceding items 202 to 228, wherein the coating is obtainable or obtained by

- applying a coating composition to at least parts of a surface of the container,
- curing the coating composition on the surface,
- wherein a curing temperature of the coating composition is less than 150° C., or less than 125° C., and wherein optionally the curing temperature is held for at least 10 seconds and up to 3000 seconds.

230. Glass container according to item 229, wherein the curing temperature is held for at least 45 seconds and at most 180 seconds.

231. Glass container according to item 229 or 230, wherein the coating composition has the following composition in percent by weight

| | |
|---|---|
| one or more cross-linkable polysiloxane compounds | 3.0 to 20.0% |
| one or more non-cross-linkable polysiloxane compounds | 2.0 to 25.0% |
| one or more cross-linking polysiloxane compounds | 0.10 to 1.50% |
| one or more catalysts | 0.03 to 0.50% |
| one or more diluents | 55.0 to 92.0% |

232. Glass container according to item 229 or 230, wherein the coating composition has the following composition in percent by weight

| | |
|---|---|
| one or more cross-linkable polysiloxane compounds | 7.5 to 15.0% |
| one or more non-cross-linkable polysiloxane compounds | 8.0 to 15.0% |
| one or more cross-linking polysiloxane compounds | 0.10 to 1.00% |
| one or more catalysts | 0.03 to 0.50% |
| one or more diluents | 55.0 to 82.0% |

233. Glass container according to item 229 or 230, wherein the coating composition has the following composition in percent by weight

| | |
|---|---|
| a vinyl-functionalized polysiloxane as a cross-linkable polysiloxane compound | 3.0 to 20.0% |
| one or more non-cross-linkable polysiloxane compounds | 2.0 to 25.0% |
| a copolymer having dimethylsiloxane and methylhydrosiloxane monomer units as a cross-linking polysiloxane compound, | 0.10 to 1.50% |
| one or more Pt-containing catalysts | 0.03 to 0.50% |
| one or more diluents | 55.0 to 92.0% |

234. Glass container according to one or more of the preceding items 202 to 233, wherein the glass of the glass container comprises 50 to 90 wt. % $SiO_2$, and 3 to 25 wt. % $B_2O_3$.

235. Glass container according to one or more of the preceding items 202 to 234, wherein the glass of the glass container comprises 55 to 75 wt. % $SiO_2$, and 11.0 to 25.0 wt. % $Al_2O_3$.

236. Glass container according to item 234, wherein the glass of the glass container comprises 70 to 81 wt. % $SiO_2$, 1 to 10 wt. % $Al_2O_3$, 6 to 14 wt. $B_2O_3$, 3 to 10 wt. % $Na_2O$, 0 to 3 wt. % $K_2O$, 0 to 1 wt. % $Li_2O$, 0 to 3 wt. % MgO, 0 to 3 wt. % CaO, and 0 to 5 wt. % BaO.

237. Glass container according to item 234, wherein the glass of the glass container comprises 72 to 82 wt. % $SiO_2$, 5 to 8 wt. % $Al_2O_3$, 3 to 6 wt. $B_2O_3$, 2 to 6 wt. % $Na_2O$, 3 to 9 wt. % $K_2O$, 0 to 1 wt. % $Li_2O$, 0 to 1 wt. % MgO, and 0 to 1 wt. % CaO.

238. Glass container according to item 234, wherein the glass of the glass container comprises 60 to 78 wt. % $SiO_2$, 7 to 15 wt. $B_2O_3$, 0 to 4 wt. % $Na_2O$, 3 to 12 wt. % $K_2O$, 0 to 2 wt. % $Li_2O$, 0 to 2 wt. % MgO, 0 to 2 wt. % CaO, 0 to 3 wt. % BaO, and 4 to 9 wt. % $ZrO_2$.

239. Glass container according to one or more of items 202 to 233, wherein the glass of the glass container comprises 50 to 70 wt. % $SiO_2$, 10 to 26 wt. % $Al_2O_3$, 1 to 14 wt. $B_2O_3$, 0 to 15 wt. % MgO, 2 to 12 wt. % CaO, 0 to 10 wt. % BaO, 0 to 2 wt. % SrO, 0 to 8 wt. % ZnO, and 0 to 2 wt. % $ZrO_2$.

240. Glass container according to item 235, wherein the glass of the glass container comprises 55 to 70 wt. % $SiO_2$, 11 to 25 wt. % $Al_2O_3$, 0 to 10 wt. % MgO, 1 to 20 wt. % CaO, 0 to 10 wt. % BaO, 0 to 8.5 wt. % SrO, 0 to 5 wt. % ZnO, 0 to 5 wt. % $ZrO_2$, and 0 to 5 wt. % $TiO_2$.

241. Glass container according to item 235, wherein the glass of the glass container comprises 65 to 72 wt. % $SiO_2$, 11 to 17 wt. % $Al_2O_3$, 0.1 to 8 wt. % $Na_2O$, 0 to 8 wt. % $K_2O$, 3 to 8 wt. % MgO, 4 to 12 wt. % CaO, and 0 to 10 wt. % ZnO.

242. Glass container according to one or more of items 202 to 233, wherein the glass of the glass container comprises 64 to 78 wt. % $SiO_2$, 4 to 14 wt. % $Al_2O_3$, 0 to 4 wt. % $B_2O_3$, 6 to 14 wt. % $Na_2O$, 0 to 3 wt. % $K_2O$, 0 to 10 wt. % MgO, 0 to 15 wt. % CaO, 0 to 2 wt. % $ZrO_2$, and 0 to 2 wt. % $TiO_2$.

243. Glass container according to at least one of the preceding items 202 to 242, wherein the coating is disposed on at least 25%, or at least 50% of the inner surface of said hollow cylindrical body.

244. Glass container according to at least one of the preceding items 202 to 243, wherein the coating is disposed on at least 65%, or at least 85% of the inner surface of said hollow cylindrical body.

245. Glass container according to at least one of the preceding items 202 to 244, wherein the coating is disposed on essentially all of the inner surface of said hollow cylindrical body.

246. Glass container according to one or more of items 210 to 245, wherein the coating is disposed on at least 25%, or at least 50% of the nestling surface.

247. Glass container according to one or more of items 210 to 246, wherein the coating is disposed on at least 65%, or at least 85% of the nestling surface.

248. Glass container according to one or more of items 210 to 247, wherein the coating is disposed on essentially all of the nestling surface.

249. Glass container according to one or more of items 210 to 248, wherein the nestling surface has a conical shape.

250. Glass container according to at least one of the preceding items 202 to 249, wherein the hollow cylindrical body encloses a volume of from 0.1 to 1,000 ml.

251. Glass container according to at least one of the preceding items 202 to 250, wherein the hollow cylindrical body encloses a volume of less than 10.0 ml.

252. Glass container according to at least one of the preceding items 202 to 251, wherein the hollow cylindrical body has a lumen surrounded by a glass wall, the glass wall having a wall thickness between 0.50 and 10.0 mm.

253. Glass container according to at least one of the preceding items 202 to 252, wherein the hollow cylindrical body has a lumen surrounded by a glass wall, the glass wall having a wall thickness between 1.00 and 4.00 mm.

254. Glass container according to at least one of the preceding items 202 to 253, wherein a ratio of a total inner diameter variation along the coated part of the inner surface relative to a thickness of the coating is less than 250, or less than 150.

255. Glass container according to at least one of the preceding items 202 to 254, wherein a total inner diameter variation of the hollow cylindrical body is less than 200 μm, less than 100 μm, or less than 50 μm.

256. Glass container according to at least one of the preceding items 202 to 255, wherein the coating has a crystallinity of less than 20% at 20° C.

257. Glass container according to at least one of the preceding items 202 to 256, having a standardized glide force (GF) of <7.5 N, <6.5 N, <5.5 N, <4.5 N, <3.5 N, or <2.5 N.

258. Glass container according to at least one of the preceding items 202 to 257, having a standardized glide force (GF) of at least 0.5 N.

259. Glass container according to at least one of the preceding items 202 to 258, having a ratio of the standardized break loose force (BLF) relative to the standardized GF of BLF/GF>1.30, >1.40, >1.50 or >1.60.

260. Glass container according to at least one of the preceding items 202 to 259, having a ratio of the standardized break loose force (BLF) relative to the standardized GF of BLF/GF<3.0.

261. Glass container according to at least one of the preceding items 202 to 260, having a standardized break loose force that exceeds the container's standardized glide force by at least 30%, at least 60%, at least 100%, or at least 200%.

262. Glass container according to at least one of the preceding items 202 to 261, wherein the coating comprises low viscosity non-cross-linked polysiloxane structural units having a weight average molecular weight of 1,200 to 30,000 g/mol, from 5,000 to 25,000 g/mol, or from 10,000 to 20,000 g/mol.

263. Glass container according to at least one of the preceding items 202 to 262, wherein the coating comprises low viscosity non-cross-linked polysiloxane structural units having a weight average molecular weight of at least 1,200 g/mol, at least 5,000 g/mol, or at least 10,000 g/mol.

264. Glass container according to at least one of the preceding items 202 to 263, wherein the coating comprises low viscosity non-cross-linked polysiloxane structural units having a weight average molecular weight of up to 30,000 g/mol, up to 25,000 g/mol, or up to 20,000 g/mol.

265. Glass container according to at least one of the preceding items 202 to 264, wherein the coating comprises high viscosity non-cross-linked polysiloxane structural units having a weight average molecular weight of 15,000 to 300,000 g/mol, 32,000 to 210,000 g/mol, or from 100,000 to 150,000 g/mol.

266. Glass container according to at least one of the preceding items 202 to 265, wherein the coating comprises high viscosity non-cross-linked polysiloxane structural units having a weight average molecular weight of at least 15,000 g/mol, at least 32,000 g/mol, or at least 100,000 g/mol.

267. Glass container according to at least one of the preceding items 202 to 266, wherein the coating comprises high viscosity non-cross-linked polysiloxane structural units having a weight average molecular weight of up to 300,000 g/mol, up to 210,000 g/mol, or up to 150,000 g/mol.

268. Glass container according to at least one of the preceding items 202 to 267, the coating having a crystallization temperature range and a melting temperature range determined using differential scanning calorimetry at a temperature change rate of 10° C./min, wherein the crystallization temperature range and the melting temperature range overlap at a temperature of from −75° C. to −100° C., particularly at −80° C.

According to item 269, the disclosure relates to a glass container for pharmaceutical compositions, comprising a hollow cylindrical body having at least one open end; wherein at least a part of a surface of the glass container comprises a coating, wherein a thickness of the coating is at least 400 nm and the coating was cured at less than 150° C., particularly at from 50 to <110° C.

270. Glass container according to item 269, wherein the coating has a hardness such that a hardness value measured on the coated surface according to DIN EN ISO 14577-1: 2015-11 and DIN EN ISO 14577-4:2017-04 differs from the hardness value measured on an uncoated surface of the glass container

- by less than 10%, less than 7.0%, less than 5.0% or less than 3.0%, and/or
- by at least 0.1%, at least 0.5%, at least 1.0% or at least 2.0%.

271. Glass container according to item 269 or 270, wherein the coating has a thickness of 250 nm or more, 300 nm or more, or 400 nm or more, 450 nm or more, or 500 nm or more.

272. Glass container according to one or more of the preceding items 269 to 271, wherein the coating has a glass transition temperature at −60° C. or below, at −70° C. or below, such as at −75° C. or below, or at −80° C. or below.

273. Glass container according to one or more of the preceding items 269 to 272, wherein the container has a standard ethanol-modified dye-ingress tested container closure integrity of at least 150 hours at −80° C., or of at least 600 hours at −80° C.

274. Glass container according to one or more of the preceding items 269 to 273, wherein the coating

- was cured at a temperature of less than 150° C., or less than 110° C., and/or
- was cured at a temperature of 50° C. or more, or 60° C. or more.

275. Glass container according to one or more of the preceding items 269 to 274, wherein the hollow cylindrical body has an open end A, open end A being configured for receiving a stopper that is slidable relative to the hollow cylindrical body from open end A; wherein at least a part of an inner surface of the hollow cylindrical body has the coating.

276. Glass container according to one or more of the preceding items 269 to 275, wherein the container has an open end B, open end B being configured for being closed by a cap, open end B having a nestling surface, configured to fit snugly against a surface of a cap, wherein at least a part of the nestling surface comprises the coating.

277. Glass container according to one or more of the preceding items 269 to 276, wherein the coating comprises one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00, and optionally at least 0.40.

278. Glass container according to one or more of the preceding items 269 to 277, wherein the coating comprises at least two non-cross-linked polysiloxane structural units that differ in their viscosities.

279. Glass container according to one or more of the preceding items 269 to 278, wherein at least a part of an inner surface of the hollow cylindrical body has the coating, wherein a ratio of a total inner diameter variation along the coated part of the inner surface relative to a thickness of the coating is less than 500.

280. Glass container according to one or more of the preceding items 269 to 279, wherein the container is a syringe, or a cartridge, such as a pre-filled syringe or cartridge.

281. Glass container according to one or more of the preceding items 269 to 280, wherein the coating has a thickness up to 1500 nm, up to 1250 nm or up to 1000 nm.

282. Glass container according to one or more of the preceding items 269 to 281, wherein the coating has a thickness of from >400 nm to 1500 nm, from 450 nm to 1250 nm, or from 500 nm to 1000 nm.

283. Glass container according to one or more of the preceding items 269 to 282, wherein the coating comprises polyalkylsiloxane structural units, such as polydialkylsiloxane structural units.

284. Glass container according to item 283, wherein one or more of the alkyl groups in the polyalkylsiloxane or polydialkylsiloxane are independently selected from branched or unbranched C1 to C8 alkyl groups.

285. Glass container according to one or more of the preceding items 269 to 284, wherein a ratio of a weight amount of cross-linked polysiloxane structural units and a weight amount of non-cross-linked polysiloxane structural units in the coating is less than 3.00, less than 2.50, less than 1.80, or less than 1.20.

286. Glass container according to one or more of the preceding items 269 to 285, wherein a ratio of a weight amount of cross-linked polysiloxane structural units and a weight amount of non-cross-linked polysiloxane structural units in the coating is at least 0.40, at least 0.60, or at least 0.70.

287. Glass container according to one or more of the preceding items 269 to 286, wherein a ratio of a weight amount of cross-linked polysiloxane structural units and a weight amount of non-cross-linked polysiloxane structural units in the coating is from 0.40 to 3.00, from 0.60 to 2.50, or from 0.70 to 1.80.

288. Glass container according to one or more of the preceding items 269 to 287, wherein the coating comprises

- high viscosity non-cross-linked polysiloxane structural units having a viscosity of more than 10,000 cSt, and/or
- low viscosity non-cross-linked polysiloxane structural units having a viscosity of 10,000 cSt, or less.

289. Glass container according to item 288, wherein

- the high viscosity non-cross-linked polysiloxane structural units have a viscosity of at least 15,000 cSt, and/or
- the low viscosity non-cross-linked polysiloxane structural units have a viscosity of 5,000 cSt, or less.

290. Glass container according to item 288 or 299, wherein a ratio of a weight amount of the low viscosity non-cross-linked polysiloxane structural units and the high viscosity non-cross-linked polysiloxane structural units ($mass_{high}$:$mass_{low}$) is at least 0.10, at least 0.50, at least 1.00, at least 1.50 or at least 2.00.

291. Glass container according to item 287, 289 or 290, wherein a ratio of a weight amount of the low viscosity non-cross-linked polysiloxane structural units and the high viscosity non-cross-linked polysiloxane structural units ($mass_{high}$:$mass_{low}$) is up to 5.00, up to 4.00 or up to 3.00.

292. Glass container according to one or more of items 287 to 291, wherein a ratio of a weight amount of the low viscosity non-cross-linked polysiloxane structural units and the high viscosity non-cross-linked polysiloxane structural units ($mass_{high}$:$mass_{low}$) is from 0.10 to 5.00, from 0.50 to 4.00, or from 1.00 to 3.00.

293. Glass container according to one or more of items 287 to 292, wherein the cross-linked polysiloxane structural units, the low viscosity non-cross-linked polysiloxane structural units, and/or the high viscosity non-cross-linked polysiloxane structural units, comprise dialkylsiloxane monomeric units, in particular dimethylsiloxane monomeric units.

294. Glass container according to one or more of items 277 to 293, wherein the cross-linked polysiloxane structural units are cross-linked via one or more polymerized end groups.

295. Glass container according to one or more of items 277 to 294, wherein the polymerized endgroups are selected from vinyl, acryl, methacryl, styrene and combinations thereof.

296. Glass container according to one or more of the preceding items 269 to 295, wherein the coating is obtainable or obtained by applying a coating composition to at least parts of a surface of the container, curing the coating composition on the surface, wherein a curing temperature of the coating composition is less than 150° C., or less than 125° C., and wherein optionally the curing temperature is held for at least 10 seconds and up to 3000 seconds.

297. Glass container according to item 298, wherein the curing temperature is held for at least 45 seconds and at most 180 seconds.

298. Glass container according to item 296 or 297, wherein the coating composition has the following composition in percent by weight

| | |
|---|---|
| one or more cross-linkable polysiloxane compounds | 3.0 to 20.0% |
| one or more non-cross-linkable polysiloxane compounds | 2.0 to 25.0% |
| one or more cross-linking polysiloxane compounds | 0.10 to 1.50% |
| one or more catalysts | 0.03 to 0.50% |
| one or more diluents | 55.0 to 92.0% |

299. Glass container according to item 296 or 297, wherein the coating composition has the following composition in percent by weight -continued

| | |
|---|---|
| one or more cross-linkable polysiloxane compounds | 7.5 to 15.0% |
| one or more non-cross-linkable polysiloxane compounds | 8.0 to 15.0% |
| one or more cross-linking polysiloxane compounds | 0.10 to 1.00% |
| one or more catalysts | 0.03 to 0.50% |
| one or more diluents | 55.0 to 82.0% |

300. Glass container according to item 296 or 297, wherein the coating composition has the following composition in percent by weight

| | |
|---|---|
| a vinyl-functionalized polysiloxane as a cross-linkable polysiloxane compound | 3.0 to 20.0% |
| one or more non-cross-linkable polysiloxane compounds | 2.0 to 25.0% |
| a copolymer having dimethylsiloxane and methylhydrosiloxane monomer units as a cross-linking polysiloxane compound, | 0.10 to 1.50% |
| one or more Pt-containing catalysts | 0.03 to 0.50% |
| one or more diluents | 55.0 to 92.0% |

301. Glass container according to one or more of the preceding items 269 to 300, wherein the glass of the glass container comprises 50 to 90 wt. % $SiO_2$, and 3 to 25 wt. % $B_2O_3$.

302. Glass container according to one or more of the preceding items 269 to 301, wherein the glass of the glass container comprises 55 to 75 wt. % $SiO_2$, and 11.0 to 25.0 wt. % $Al_2O_3$.

303. Glass container according to item 301, wherein the glass of the glass container comprises 70 to 81 wt. % $SiO_2$, 1 to 10 wt. % $Al_2O_3$, 6 to 14 wt. $B_2O_3$, 3 to 10 wt. % $Na_2O$, 0 to 3 wt. % $K_2O$, 0 to 1 wt. % $Li_2O$, 0 to 3 wt. % MgO, 0 to 3 wt. % CaO, and 0 to 5 wt. % BaO.

304. Glass container according to item 301, wherein the glass of the glass container comprises 72 to 82 wt. % $SiO_2$, 5 to 8 wt. % $Al_2O_3$, 3 to 6 wt. $B_2O_3$, 2 to 6 wt. % $Na_2O$, 3 to 9 wt. % $K_2O$, 0 to 1 wt. % $Li_2O$, 0 to 1 wt. % MgO, and 0 to 1 wt. % CaO.

305. Glass container according to item 301, wherein the glass of the glass container comprises 60 to 78 wt. % $SiO_2$, 7 to 15 wt. $B_2O_3$, 0 to 4 wt. % $Na_2O$, 3 to 12 wt. % $K_2O$, 0 to 2 wt. % $Li_2O$, 0 to 2 wt. % MgO, 0 to 2 wt. % CaO, 0 to 3 wt. % BaO, and 4 to 9 wt. % $ZrO_2$.

306. Glass container according to one or more of items 269 to 300, wherein the glass of the glass container comprises 50 to 70 wt. % $SiO_2$, 10 to 26 wt. % $Al_2O_3$, 1 to 14 wt. $B_2O_3$, 0 to 15 wt. % MgO, 2 to 12 wt. % CaO, 0 to 10 wt. % BaO, 0 to 2 wt. % SrO, 0 to 8 wt. % ZnO, and 0 to 2 wt. % $ZrO_2$.

307. Glass container according to item 302, wherein the glass of the glass container comprises 55 to 70 wt. % $SiO_2$, 11 to 25 wt. % $Al_2O_3$, 0 to 10 wt. % MgO, 1 to 20 wt. % CaO, 0 to 10 wt. % BaO, 0 to 8.5 wt. % SrO, 0 to 5 wt. % ZnO, 0 to 5 wt. % $ZrO_2$, and 0 to 5 wt. % $TiO_2$.

308. Glass container according to item 302, wherein the glass of the glass container comprises 65 to 72 wt. % $SiO_2$, 11 to 17 wt. % $Al_2O_3$, 0.1 to 8 wt. % $Na_2O$, 0 to 8 wt. % $K_2O$, 3 to 8 wt. % MgO, 4 to 12 wt. % CaO, and 0 to 10 wt. % ZnO.

309. Glass container according to one or more of items 269 to 300, wherein the glass of the glass container comprises 64 to 78 wt. % $SiO_2$, 4 to 14 wt. % $Al_2O_3$, 0 to 4 wt. % $B_2O_3$, 6 to 14 wt. % $Na_2O$, 0 to 3 wt. % $K_2O$, 0 to 10 wt. % MgO, 0 to 15 wt. % CaO, 0 to 2 wt. % $ZrO_2$, and 0 to 2 wt. % $TiO_2$.

310. Glass container according to at least one of the preceding items 269 to 309, wherein the coating is disposed on at least 25%, or at least 50% of the inner surface of said hollow cylindrical body.

311. Glass container according to at least one of the preceding items 269 to 310, wherein the coating is disposed on at least 65%, or at least 85% of the inner surface of said hollow cylindrical body.

312. Glass container according to at least one of the preceding items 269 to 311, wherein the coating is disposed on essentially all of the inner surface of said hollow cylindrical body.

313. Glass container according to one or more of items 277 to 312, wherein the coating is disposed on at least 25%, or at least 50% of the nestling surface.

314. Glass container according to one or more of items 277 to 313, wherein the coating is disposed on at least 65%, or at least 85% of the nestling surface.

315. Glass container according to one or more of items 277 to 313, wherein the coating is disposed on essentially all of the nestling surface.

316. Glass container according to one or more of items 277 to 315, wherein the nestling surface has a conical shape.

317. Glass container according to at least one of the preceding items 269 to 316, wherein the hollow cylindrical body encloses a volume of from 0.1 to 1,000 ml.

318. Glass container according to at least one of the preceding items 269 to 317, wherein the hollow cylindrical body encloses a volume of less than 10.0 ml.

319. Glass container according to at least one of the preceding items 269 to 318, wherein the hollow cylindrical body has a lumen surrounded by a glass wall, the glass wall having a wall thickness between 0.50 and 10.0 mm.

320. Glass container according to at least one of the preceding items 269 to 319, wherein the hollow cylindrical body has a lumen surrounded by a glass wall, the glass wall having a wall thickness between 1.00 and 4.00 mm.

321. Glass container according to at least one of the preceding items 269 to 320, wherein a ratio of a total inner diameter variation along the coated part of the inner surface relative to a thickness of the coating is less than 250, or less than 150.

322. Glass container according to at least one of the preceding items 269 to 321, wherein a total inner diameter variation of the hollow cylindrical body is less than 200 μm, less than 100 μm, or less than 50 μm.

323. Glass container according to at least one of the preceding items 269 to 322, wherein the coating has a crystallinity of less than 20% at 20° C.

324. Glass container according to at least one of the preceding items 269 to 323, having a standardized glide force (GF) of <7.5 N, <6.5 N, <5.5 N, <4.5 N, <3.5 N, or <2.5 N.

325. Glass container according to at least one of the preceding items 269 to 324, having a standardized glide force (GF) of at least 0.5 N.

326. Glass container according to at least one of the preceding items 269 to 325, having a ratio of the standardized break loose force (BLF) relative to the standardized GF of BLF/GF>1.30, >1.40, >1.50 or >1.60.

327. Glass container according to at least one of the preceding items 269 to 326, having a ratio of the standardized break loose force (BLF) relative to the standardized GF of BLF/GF<3.0.

328. Glass container according to at least one of the preceding items 269 to 327, having a standardized break loose force that exceeds the container's standardized glide force by at least 30%, at least 60%, at least 100%, or at least 200%.

329. Glass container according to at least one of the preceding items 269 to 328, wherein the coating comprises low viscosity non-cross-linked polysiloxane structural units having a weight average molecular weight of 1,200 to 30,000 g/mol, from 5,000 to 25,000 g/mol, or from 10,000 to 20,000 g/mol.

330. Glass container according to at least one of the preceding items 269 to 329, wherein the coating comprises low viscosity non-cross-linked polysiloxane structural units having a weight average molecular weight of at least 1,200 g/mol, at least 5,000 g/mol, or at least 10,000 g/mol.

331. Glass container according to at least one of the preceding items 269 to 330, wherein the coating comprises low viscosity non-cross-linked polysiloxane structural units having a weight average molecular weight of up to 30,000 g/mol, up to 25,000 g/mol, or up to 20,000 g/mol.

332. Glass container according to at least one of the preceding items 269 to 331, wherein the coating comprises high viscosity non-cross-linked polysiloxane structural units having a weight average molecular weight of 15,000 to 300,000 g/mol, 32,000 to 210,000 g/mol, or from 100,000 to 150,000 g/mol.

333. Glass container according to at least one of the preceding items 269 to 332, wherein the coating comprises high viscosity non-cross-linked polysiloxane structural units having a weight average molecular weight of at least 15,000 g/mol, at least 32,000 g/mol, or at least 100,000 g/mol.

334. Glass container according to at least one of the preceding items 269 to 333, wherein the coating comprises high viscosity non-cross-linked polysiloxane structural units having a weight average molecular weight of up to 300,000 g/mol, up to 210,000 g/mol, or up to 150,000 g/mol.

335. Glass container according to at least one of the preceding items 269 to 334, the coating having a crystallization temperature range and a melting temperature range determined using differential scanning calorimetry at a temperature change rate of 10° C./min, wherein the crystallization temperature range and the melting temperature range overlap at a temperature of from −75° C. to −100° C., particularly at −80° C.

According to item 336, the disclosure relates to a glass container for pharmaceutical compositions, comprising a hollow cylindrical body having at least one open end; wherein at least a part of a surface of the glass container comprises a coating, the coating comprising one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00, and optionally at least 0.40.

337. Glass container according to item 336, wherein the coating has a hardness such that a hardness value measured on the coated surface according to DIN EN ISO 14577-1:2015-11 and DIN EN ISO 14577-4:2017-04 differs from the hardness value measured on an uncoated surface of the glass container by less than 10%, less than 7.0%, less than 5.0% or less than 3.0%, and/or by at least 0.1%, at least 0.5%, at least 1.0% or at least 2.0%.

338. Glass container according to item 336 or 337, wherein the coating has a thickness of 250 nm or more, 300 nm or more, or 400 nm or more, 450 nm or more, or 500 nm or more.

339. Glass container according to one or more of the preceding items 336 to 338, wherein the coating has a glass transition temperature at −60° C. or below, at −70° C. or below, such as at −75° C. or below, or at −80° C. or below.

340. Glass container according to one or more of the preceding items 336 to 339, wherein the container has a standard ethanol-modified dye-ingress tested container closure integrity of at least 150 hours at −80° C., or of at least 600 hours at −80° C.

341. Glass container according to one or more of the preceding items 336 to 340, wherein the coating was cured at a temperature of less than 150° C., or less than 110° C., and/or was cured at a temperature of 50° C. or more, or 60° C. or more.

342. Glass container according to one or more of the preceding items 336 to 341, wherein the hollow cylindrical body has an open end A, open end A being configured for receiving a stopper that is slidable relative to the hollow cylindrical body from open end A; wherein at least a part of an inner surface of the hollow cylindrical body has the coating.

343. Glass container according to one or more of the preceding items 336 to 342, wherein the container has an open end B, open end B being configured for being closed by a cap, open end B having a nestling surface, configured to fit snugly against a surface of a cap, wherein at least a part of the nestling surface comprises the coating.

344. Glass container according to one or more of the preceding items 336 to 343, wherein the coating comprises one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00, and optionally at least 0.40.

345. Glass container according to one or more of the preceding items 336 to 344, wherein the coating comprises at least two non-cross-linked polysiloxane structural units that differ in their viscosities.

346. Glass container according to one or more of the preceding items 336 to 345, wherein at least a part of an inner surface of the hollow cylindrical body has the coating, wherein a ratio of a total inner diameter variation along the coated part of the inner surface relative to a thickness of the coating is less than 500.

347. Glass container according to one or more of the preceding items 336 to 346, wherein the container is a syringe, or a cartridge, such as a pre-filled syringe or cartridge.

348. Glass container according to one or more of the preceding items 336 to 347, wherein the coating has a thickness up to 1500 nm, up to 1250 nm or up to 1000 nm.

349. Glass container according to one or more of the preceding items 336 to 348, wherein the coating has a thickness of from >400 nm to 1500 nm, from 450 nm to 1250 nm, or from 500 nm to 1000 nm.

350. Glass container according to one or more of the preceding items 336 to 349, wherein the coating comprises polyalkylsiloxane structural units, such as polydialkylsiloxane structural units.

351. Glass container according to item 350, wherein one or more of the alkyl groups in the polyalkylsiloxane or polydialkylsiloxane are independently selected from branched or unbranched C1 to C8 alkyl groups.

352. Glass container according to one or more of the preceding items 336 to 351, wherein a ratio of a weight amount of cross-linked polysiloxane structural units and a weight amount of non-cross-linked polysiloxane structural units in the coating is less than 3.00, less than 2.50, less than 1.80, or less than 1.20.

353. Glass container according to one or more of the preceding items 336 to 352, wherein a ratio of a weight amount of cross-linked polysiloxane structural units and a weight amount of non-cross-linked polysiloxane structural units in the coating is at least 0.40, at least 0.60, or at least 0.70.

354. Glass container according to one or more of the preceding items 336 to 353, wherein a ratio of a weight amount of cross-linked polysiloxane structural units and a weight amount of non-cross-linked polysiloxane structural units in the coating is from 0.40 to 3.00, from 0.60 to 2.50, or from 0.70 to 1.80.

355. Glass container according to one or more of the preceding items 336 to 354, wherein the coating comprises high viscosity non-cross-linked polysiloxane structural units having a viscosity of more than 10,000 cSt, and/or low viscosity non-cross-linked polysiloxane structural units having a viscosity of 10,000 cSt, or less.

356. Glass container according to item 355, wherein the high viscosity non-cross-linked polysiloxane structural units have a viscosity of at least 15,000 cSt, and/or the low viscosity non-cross-linked polysiloxane structural units have a viscosity of 5,000 cSt, or less.

357. Glass container according to one or more of items 336 to 356, wherein a ratio of a weight amount of the low viscosity non-cross-linked polysiloxane structural units and the high viscosity non-cross-linked polysiloxane structural units ($mass_{high}$:$mass_{low}$) is at least 0.10, at least 0.50, at least 1.00, at least 1.50 or at least 2.00.

358. Glass container according to one or more of items 336 to 357, wherein a ratio of a weight amount of the low viscosity non-cross-linked polysiloxane structural units and the high viscosity non-cross-linked polysiloxane structural units ($mass_{high}$:$mass_{low}$) is up to 5.00, up to 4.00 or up to 3.00.

359. Glass container according to one or more of items 336 to 358, wherein a ratio of a weight amount of the low viscosity non-cross-linked polysiloxane structural units and the high viscosity non-cross-linked polysiloxane structural units ($mass_{high}$:$mass_{low}$) is from 0.10 to 5.00, from 0.50 to 4.00, or from 1.00 to 3.00.

360. Glass container according to one or more of items 336 to 359, wherein the cross-linked polysiloxane structural units, the low viscosity non-cross-linked polysiloxane structural units, and/or the high viscosity non-cross-linked polysiloxane structural units, comprise dialkylsiloxane monomeric units, in particular dimethylsiloxane monomeric units.

361. Glass container according to one or more of items 336 to 360, wherein the cross-linked polysiloxane structural units are cross-linked via one or more polymerized end groups.

362. Glass container according to item 361, wherein the polymerized end groups are selected from vinyl, acryl, methacryl, styrene and combinations thereof.

363. Glass container according to one or more of the preceding items 336 to 362, wherein the coating is obtainable or obtained by applying a coating composition to at least parts of a surface of the container, curing the coating composition on the surface, wherein a curing temperature of the coating composition is less than 150° C., or less than 125° C., and wherein optionally the curing temperature is held for at least 10 seconds and up to 3000 seconds.

364. Glass container according to item 363, wherein the curing temperature is held for at least 45 seconds and at most 180 seconds.

365. Glass container according to item 363 or 364, wherein the coating composition has the following composition in percent by weight

| | |
|---|---|
| one or more cross-linkable polysiloxane compounds | 3.0 to 20.0% |
| one or more non-cross-linkable polysiloxane compounds | 2.0 to 25.0% |
| one or more cross-linking polysiloxane compounds | 0.10 to 1.50% |
| one or more catalysts | 0.03 to 0.50% |
| one or more diluents | 55.0 to 92.0% |

366. Glass container according to item 363 or 364, wherein the coating composition has the following composition in percent by weight

| | |
|---|---|
| one or more cross-linkable polysiloxane compounds | 7.5 to 15.0% |
| one or more non-cross-linkable polysiloxane compounds | 8.0 to 15.0% |
| one or more cross-linking polysiloxane compounds | 0.10 to 1.00% |
| one or more catalysts | 0.03 to 0.50% |
| one or more diluents | 55.0 to 82.0% |

367. Glass container according to item 363 or 364, wherein the coating composition has the following composition in percent by weight

| | |
|---|---|
| a vinyl-functionalized polysiloxane as a cross-linkable polysiloxane compound | 3.0 to 20.0% |
| one or more non-cross-linkable polysiloxane compounds | 2.0 to 25.0% |
| a copolymer having dimethylsiloxane and methylhydrosiloxane monomer units as a cross-linking polysiloxane compound, | 0.10 to 1.50% |
| one or more Pt-containing catalysts | 0.03 to 0.50% |
| one or more diluents | 55.0 to 92.0% |

368. Glass container according to one or more of the preceding items 336 to 367, wherein the glass of the glass container comprises 50 to 90 wt. % $SiO_2$, and 3 to 25 wt. % $B_2O_3$.

369. Glass container according to one or more of the preceding items 336 to 368, wherein the glass of the glass container comprises 55 to 75 wt. % $SiO_2$, and 11.0 to 25.0 wt. % $Al_2O_3$.

370. Glass container according to item 368, wherein the glass of the glass container comprises 70 to 81 wt. % $SiO_2$, 1 to 10 wt. % $Al_2O_3$, 6 to 14 wt. $B_2O_3$, 3 to 10 wt. % $Na_2O$, 0 to 3 wt. % $K_2O$, 0 to 1 wt. % $Li_2O$, 0 to 3 wt. % MgO, 0 to 3 wt. % CaO, and 0 to 5 wt. % BaO.

371. Glass container according to item 368, wherein the glass of the glass container comprises 72 to 82 wt. % $SiO_2$, 5 to 8 wt. % $Al_2O_3$, 3 to 6 wt. $B_2O_3$, 2 to 6 wt. % $Na_2O$, 3 to 9 wt. % $K_2O$, 0 to 1 wt. % $Li_2O$, 0 to 1 wt. % MgO, and 0 to 1 wt. % CaO.

372. Glass container according to item 368, wherein the glass of the glass container comprises 60 to 78 wt. % $SiO_2$, 7 to 15 wt. $B_2O_3$, 0 to 4 wt. % $Na_2O$, 3 to 12 wt. % $K_2O$, 0 to 2 wt. % $Li_2O$, 0 to 2 wt. % MgO, 0 to 2 wt. % CaO, 0 to 3 wt. % BaO, and 4 to 9 wt. % $ZrO_2$.

373. Glass container according to one or more of items 336 to 367, wherein the glass of the glass container comprises 50 to 70 wt. % $SiO_2$, 10 to 26 wt. % $Al_2O_3$, 1 to 14 wt. $B_2O_3$, 0 to 15 wt. % MgO, 2 to 12 wt. % CaO, 0 to 10 wt. % BaO, 0 to 2 wt. % SrO, 0 to 8 wt. % ZnO, and 0 to 2 wt. % $ZrO_2$.

374. Glass container according to item 369, wherein the glass of the glass container comprises 55 to 70 wt. % $SiO_2$, 11 to 25 wt. % $Al_2O_3$, 0 to 10 wt. % MgO, 1 to 20 wt. % CaO, 0 to 10 wt. % BaO, 0 to 8.5 wt. % SrO, 0 to 5 wt. % ZnO, 0 to 5 wt. % $ZrO_2$, and 0 to 5 wt. % $TiO_2$.

374. Glass container according to item 369, wherein the glass of the glass container comprises 65 to 72 wt. % $SiO_2$, 11 to 17 wt. % $Al_2O_3$, 0.1 to 8 wt. % $Na_2O$, 0 to 8 wt. % $K_2O$, 3 to 8 wt. % MgO, 4 to 12 wt. % CaO, and 0 to 10 wt. % ZnO.

375. Glass container according to one or more of items 336 to 367, wherein the glass of the glass container comprises 64 to 78 wt. % $SiO_2$, 4 to 14 wt. % $Al_2O_3$, 0 to 4 wt. % $B_2O_3$, 6 to 14 wt. % $Na_2O$, 0 to 3 wt. % $K_2O$, 0 to 10 wt. % MgO, 0 to 15 wt. % CaO, 0 to 2 wt. % $ZrO_2$, and 0 to 2 wt. % $TiO_2$.

376. Glass container according to at least one of the preceding items 336 to 375, wherein the coating is disposed on at least 25%, or at least 50% of the inner surface of said hollow cylindrical body.

377. Glass container according to at least one of the preceding items 366 to 376, wherein the coating is disposed on at least 65%, or at least 85% of the inner surface of said hollow cylindrical body.

378. Glass container according to at least one of the preceding items 336 to 377, wherein the coating is disposed on essentially all of the inner surface of said hollow cylindrical body.

379. Glass container according to one or more of items 336 to 378, wherein the coating is disposed on at least 25%, or at least 50% of the nestling surface.

380. Glass container according to one or more of items 336 to 379, wherein the coating is disposed on at least 65%, or at least 85% of the nestling surface.

381. Glass container according to one or more of items 336 to 380, wherein the coating is disposed on essentially all of the nestling surface.

382. Glass container according to one or more of items 336 to 381, wherein the nestling surface has a conical shape.

383. Glass container according to at least one of the preceding items 336 to 382, wherein the hollow cylindrical body encloses a volume of from 0.1 to 1,000 ml.

384. Glass container according to at least one of the preceding items 336 to 383, wherein the hollow cylindrical body encloses a volume of less than 10.0 ml.

385. Glass container according to at least one of the preceding items 336 to 384, wherein the hollow cylindrical body has a lumen surrounded by a glass wall, the glass wall having a wall thickness between 0.50 and 10.0 mm.

386. Glass container according to at least one of the preceding items 336 to 385, wherein the hollow cylindrical body has a lumen surrounded by a glass wall, the glass wall having a wall thickness between 1.00 and 4.00 mm.

387. Glass container according to at least one of the preceding items 336 to 386, wherein a ratio of a total inner diameter variation along the coated part of the inner surface relative to a thickness of the coating is less than 250, or less than 150.

388. Glass container according to at least one of the preceding items 336 to 387, wherein a total inner diameter variation of the hollow cylindrical body is less than 200 μm, less than 100 μm, or less than 50 μm.

389. Glass container according to at least one of the preceding items 336 to 388, wherein the coating has a crystallinity of less than 20% at 20° C.

390. Glass container according to at least one of the preceding items 336 to 389, having a standardized glide force (GF) of <7.5 N, <6.5 N, <5.5 N, <4.5 N, <3.5 N, or <2.5 N.

391. Glass container according to at least one of the preceding items 336 to 390, having a standardized glide force (GF) of at least 0.5 N.

392. Glass container according to at least one of the preceding items 336 to 391, having a ratio of the standardized break loose force (BLF) relative to the standardized GF of BLF/GF>1.30, >1.40, >1.50 or >1.60.

393. Glass container according to at least one of the preceding items 336 to 392, having a ratio of the standardized break loose force (BLF) relative to the standardized GF of BLF/GF<3.0.

394. Glass container according to at least one of the preceding items 336 to 393, having a standardized break loose force that exceeds the container's standardized glide force by at least 30%, at least 60%, at least 100%, or at least 200%.

395. Glass container according to at least one of the preceding items 336 to 394, wherein the coating comprises low viscosity non-cross-linked polysiloxane structural units having a weight average molecular weight of 1,200 to 30,000 g/mol, from 5,000 to 25,000 g/mol, or from 10,000 to 20,000 g/mol.

396. Glass container according to at least one of the preceding items 336 to 395, wherein the coating comprises low viscosity non-cross-linked polysiloxane structural units having a weight average molecular weight of at least 1,200 g/mol, at least 5,000 g/mol, or at least 10,000 g/mol.

397. Glass container according to at least one of the preceding items 336 to 396, wherein the coating comprises low viscosity non-cross-linked polysiloxane structural units having a weight average molecular weight of up to 30,000 g/mol, up to 25,000 g/mol, or up to 20,000 g/mol.

398. Glass container according to at least one of the preceding items 336 to 397, wherein the coating comprises high viscosity non-cross-linked polysiloxane structural units having a weight average molecular weight of 15,000 to 300,000 g/mol, 32,000 to 210,000 g/mol, or from 100,000 to 150,000 g/mol.

398. Glass container according to at least one of the preceding items 336 to 397, wherein the coating comprises high viscosity non-cross-linked polysiloxane structural units having a weight average molecular weight of at least 15,000 g/mol, at least 32,000 g/mol, or at least 100,000 g/mol.

399. Glass container according to at least one of the preceding items 336 to 398, wherein the coating comprises high viscosity non-cross-linked polysiloxane structural units having a weight average molecular weight of up to 300,000 g/mol, up to 210,000 g/mol, or up to 150,000 g/mol.

400. Glass container according to at least one of the preceding items 336 to 399, the coating having a crystallization temperature range and a melting temperature range determined using differential scanning calorimetry at a temperature change rate of 10° C./min, wherein the crystallization temperature range and the melting temperature range overlap at a temperature of from −75° C. to −100° C., particularly at −80° C.

According to item 401, the disclosure relates to system comprising the glass container of at least one of the preceding items, a stopper and/or a cap, wherein the system has a specific ethanol-modified dye-ingress tested container closure integrity of at least 150 hours at −80° C.

402. System according to item 401, having a specific ethanol-modified dye-ingress tested container closure integrity of at least 600 hours at −80° C., or at least 1200 hours at −80° C.

403. System according to item 401 or 402, wherein the stopper has a Shore A hardness of not more than 70.

404. System according to at least one of items 401 to 403, wherein the stopper has a Shore A hardness of at least 40.

405. System according to at least one of items 401 to 404, wherein the stopper has a density of at least 1.200 g/cm$^3$.

406. System according to at least one of items 401 to 405, wherein the stopper has a density of at most 1.450 g/cm$^3$.

407. System according to at least one of items 401 to 406, wherein the stopper has a compression set of at least 10%.

408. System according to at least one of items 401 to 407, wherein the stopper has a compression set of at most 20%.

409. System according to at least one of items 401 to 408, wherein a ratio of (I) a difference of an average linear coefficient of thermal expansion of the material of the stopper and of the glass container, and (II) a thickness of the coating is less than 0.5 ppm/nm.

410. System according to at least one of items 401 to 409, wherein a ratio of an uncompressed outer diameter of the stopper and an inner diameter of the hollow cylindrical body is more than 1.100 or more than 1.185.

411. System according to at least one of items 401 to 410, wherein a break loose force is at least 30% larger than a glide force and the break loose force is at least 4.9.

412. System according to at least one of items 401 to 411, the glass container having an open end B, optionally disposed at an opposite end of the container relative to open end A, open end B being closed by a cap, open end B having a nestling surface, configured to fit snugly against a surface of the cap.

413. System according to item 412, wherein at least a part of the nestling surface is coated with the coating present on at least a part of the inner surface of the hollow cylindrical body.

414. System according to at least one of items 401 to 411, comprising a syringe having a rigid cap, a tip cap, or a staked needle with a rigid needle cap.

According to item 415, the disclosure relates to system comprising the glass container of at least one of the preceding items, a stopper and/or a cap, (I) a difference of an average linear coefficient of thermal expansion of the material of the stopper and of the glass container, and (II) a thickness of the coating is less than 0.5 ppm/nm.

416. System according to item 415, having a specific ethanol-modified dye-ingress tested container closure integrity of at least 150 hours, at least 600 hours at −80° C., or at least 1200 hours at −80° C.

417. System according to item 415 or 416, wherein the stopper has a Shore A hardness of not more than 70.

418. System according to at least one of items 415 to 417, wherein the stopper has a Shore A hardness of at least 40.

419. System according to at least one of items 415 to 418, wherein the stopper has a density of at least 1.200 g/cm$^3$.

420. System according to at least one of items 415 to 419, wherein the stopper has a density of at most 1.450 g/cm$^3$.

421. System according to at least one of items 415 to 420, wherein the stopper has a compression set of at least 10%.

422. System according to at least one of items 415 to 421, wherein the stopper has a compression set of at most 20%.

423. System according to at least one of items 415 to 422, wherein a ratio of (I) a difference of an average linear coefficient of thermal expansion of the material of the stopper and of the glass container, and (II) a thickness of the coating is less than 0.5 ppm/nm.

424. System according to at least one of items 415 to 423, wherein a ratio of an uncompressed outer diameter of the stopper and an inner diameter of the hollow cylindrical body is more than 1.100 or more than 1.185.

425. System according to at least one of items 415 to 424, wherein a break loose force is at least 30% larger than a glide force and the break loose force is at least 4.9.

426. System according to at least one of items 415 to 425, the glass container having an open end B, optionally disposed at an opposite end of the container relative to open end A, open end B being closed by a cap, open end B having a nestling surface, configured to fit snugly against a surface of the cap.

427. System according to item 426, wherein at least a part of the nestling surface is coated with the coating present on at least a part of the inner surface of the hollow cylindrical body.

428. System according to at least one of items 415 to 427, comprising a syringe having a rigid cap, a tip cap, or a staked needle with a rigid needle cap.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass container for pharmaceutical compositions, comprising:

a hollow cylindrical body having at least one open end, wherein at least a part of an inner surface of the glass container comprises a coating comprising polysiloxane structural units, the coating having a crystallization temperature range and a melting temperature range determined using differential scanning calorimetry at a temperature change rate of 10° C./min, wherein the crystallization temperature range and the melting temperature range overlap at a temperature of from −75° C. to −100° C., wherein the hollow cylindrical body exhibits a ratio of a standardized break loose force (BLF) relative to a standardized glide force (GF) of BLF/GF >1.30 or a standardized glide force (GF) of <3.5 N, the standardized break loose force (BLF) and the standardized glide force (GF) being measured using a standard stopper made of bromobutyl rubber having a hardness of 52 Shore A and a density of 1.355 g/cm$^3$ and the measurement being conducted on a universal testing machine with a 50 N test cup at room temperature.

2. The glass container of claim 1, wherein the crystallization temperature range and the melting temperature range overlap at −80° C.

3. The glass container of claim 1, wherein the coating has a thickness of 250 nm or more.

4. The glass container of claim 1, wherein the coating has a glass transition temperature at −60° C. or below.

5. The glass container of claim 1, wherein the coating has a hardness such that a hardness value measured on the part of the surface comprising the coating according to DIN EN ISO 14577-1:2015-11 and DIN EN ISO 14577-4:2017-04 differs from a hardness value measured on an uncoated surface of the glass container by less than 10%.

6. The glass container of claim 1, wherein the container has a standard ethanol-modified dye-ingress tested container closure integrity of at least 150 hours at −80° C.

7. The glass container of claim 1, wherein the coating was at least one of:

cured at a temperature of less than 150° C.; or cured at a temperature of 50° C. or more.

8. The glass container of claim 7, wherein the coating was cured at a temperature of 50° C. or more and less than 150° C.

9. The glass container of claim 1, wherein the hollow cylindrical body has an open end A, the open end A being configured for receiving a stopper that is slidable relative to the hollow cylindrical body from the open end A; wherein at least a part of an inner surface of the hollow cylindrical body has the coating.

10. The glass container of claim 1, wherein the container has an open end B, the open end B being configured for being closed by a cap, the open end B having a nestling surface that is configured to fit snugly against a surface of the cap, wherein at least a part of the nestling surface comprises the coating.

11. The glass container of claim 1, wherein the coating comprises one or more cross-linked polysiloxane structural units and one or more non-cross-linked polysiloxane structural units, wherein a ratio of a weight amount of cross-linked polysiloxane structural units and a weight amount of non-cross-linked polysiloxane structural units in the coating is less than 3.00.

12. The glass container of claim 11, wherein the ratio of the weight amount of cross-linked polysiloxane structural units and the weight amount of non-cross-linked polysiloxane structural units in the coating is at least 0.40.

13. The glass container of claim 1, wherein the coating comprises at least two non-cross-linked polysiloxane structural units that differ in their viscosities.

14. The glass container of claim 1, wherein at least a part of an inner surface of the hollow cylindrical body has the coating, wherein a ratio of a total inner diameter variation along the part of the inner surface having the coating relative to a thickness of the coating is less than 500.

15. The glass container of claim 1, wherein the coating is formed from a composition having the following composition in percent by weight:

| | |
|---|---|
| one or more cross-linkable polysiloxane compounds | 3.0 to 20.0%; |
| one or more non-cross-linkable polysiloxane compounds | 2.0 to 25.0%; |
| one or more cross-linking polysiloxane compounds | 0.10 to 1.50%; |

-continued

| | |
|---|---|
| one or more catalysts | 0.03 to 0.50%; and |
| one or more diluents | 55.0 to 92.0%. |

16. The glass container of claim 15, wherein the composition has the following composition in percent by weight:

| | |
|---|---|
| one or more cross-linkable polysiloxane compounds | 7.5 to 15.0%; |
| one or more non-cross-linkable polysiloxane compounds | 8.0 to 15.0%; |
| one or more cross-linking polysiloxane compounds | 0.10 to 1.00%; |
| one or more catalysts | 0.03 to 0.50%; and |
| one or more diluents | 55.0 to 82.0%. |

17. The glass container of claim 15, wherein the composition has the following composition in percent by weight:

| | |
|---|---|
| a vinyl-functionalized polysiloxane as a cross-linkable polysiloxane compound | 3.0 to 20.0%; |
| one or more non-cross-linkable polysiloxane compounds | 2.0 to 25.0%; |
| a copolymer having dimethylsiloxane and methylhydrosiloxane monomer units as a cross-linking polysiloxane compound, | 0.10 to 1.50%; |

-continued

| | |
|---|---|
| one or more Pt-containing catalysts | 0.03 to 0.50%; and |
| one or more diluents | 55.0 to 92.0%. |

18. The glass container of claim 1, wherein the coating comprises at least one of:

high viscosity non-cross-linked polysiloxane structural units having a viscosity of more than 10,000 cSt; or low viscosity non-cross-linked polysiloxane structural units having a viscosity of 10,000 cSt, or less.

19. The glass container of claim 18, wherein the coating comprises high viscosity non-cross-linked polysiloxane structural units and low viscosity non-cross-linked polysiloxane structural units, a ratio of a weight amount of the low viscosity non-cross-linked polysiloxane structural units and the high viscosity non-cross-linked polysiloxane structural units ($mass_{high}$:$mass_{low}$) being at least 0.10.

20. The glass container of claim 19, wherein the ratio of the weight amount of the low viscosity non-cross-linked polysiloxane structural units and the high viscosity non-cross-linked polysiloxane structural units ($mass_{high}$:$mass_{low}$) is up to 5.00.

21. The glass container of claim 1, further comprising the standard stopper disposed in the hollow cylindrical body and in contact with the coating.

* * * * *